US007800594B2

(12) United States Patent
Nakamura et al.

(10) Patent No.: US 7,800,594 B2
(45) Date of Patent: Sep. 21, 2010

(54) DISPLAY DEVICE INCLUDING FUNCTION TO INPUT INFORMATION FROM SCREEN BY LIGHT

(75) Inventors: Takashi Nakamura, Saitama (JP); Takayuki Imai, Fukaya (JP); Masahiro Yoshida, Fukaya (JP); Miyuki Ishikawa, Kumagaya (JP); Hirotaka Hayashi, Fukaya (JP); Toshinori Kanuma, Isesaki (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 870 days.

(21) Appl. No.: 11/300,356

(22) Filed: Dec. 15, 2005

(65) Prior Publication Data

US 2006/0170658 A1    Aug. 3, 2006

(30) Foreign Application Priority Data

Feb. 3, 2005  (JP) .............................. 2005-028178
Mar. 1, 2005  (JP) .............................. 2005-055997
Jun. 28, 2005 (JP) .............................. 2005-188744

(51) Int. Cl.
    *G09G 5/00*  (2006.01)

(52) U.S. Cl. ........................ 345/175; 345/161; 345/166; 345/173

(58) Field of Classification Search ................ 345/175, 345/173, 166, 161
See application file for complete search history.

(56) References Cited

U.S. PATENT DOCUMENTS

| 5,483,261 | A  | * | 1/1996  | Yasutake ..................... 345/173 |
| 7,129,933 | B1 | * | 10/2006 | Nishikawa et al. .......... 345/173 |
| 2005/0128319 | A1 | * | 6/2005 | Morino ..................... 348/231.7 |

FOREIGN PATENT DOCUMENTS

| JP | 4-334268    | 11/1992 |
| JP | 7-261932    | 10/1995 |
| JP | 10-177449   | 6/1998  |
| JP | 2002-032193 | 1/2002  |
| JP | 2003-532216 | 10/2003 |
| JP | 2004-70195  | 3/2004  |
| JP | 2004-93894  | 3/2004  |
| JP | 2004-261300 | 9/2004  |
| JP | 2004-318819 | 11/2004 |

OTHER PUBLICATIONS

Japanese Office Action with Translation, Notification of Reason(s) for Refusal, Apr. 20, 2010, 5 pages, in JP Application No. 2005-188744.

* cited by examiner

*Primary Examiner*—Richard Hjerpe
*Assistant Examiner*—Leonid Shapiro
(74) *Attorney, Agent, or Firm*—Oblon, Spivak, McClelland, Maier & Neustadt, L.L.P.

(57) ABSTRACT

In order to enhance accuracy of determination as to whether an object has contacted a screen and to enhance accuracy of calculation of a coordinate position of the object, edges of an imaged image are detected by an edge detection circuit 76, and by using the edges, it is determined by a contact determination circuit 77 whether or not the object has contacted the screen. Moreover, in order to appropriately control sensitivity of optical sensors in response to external light, by a calibration circuit 93, a drive condition of the optical sensors is changed based on output values of the optical sensors, which are varied in response to the external light.

10 Claims, 48 Drawing Sheets

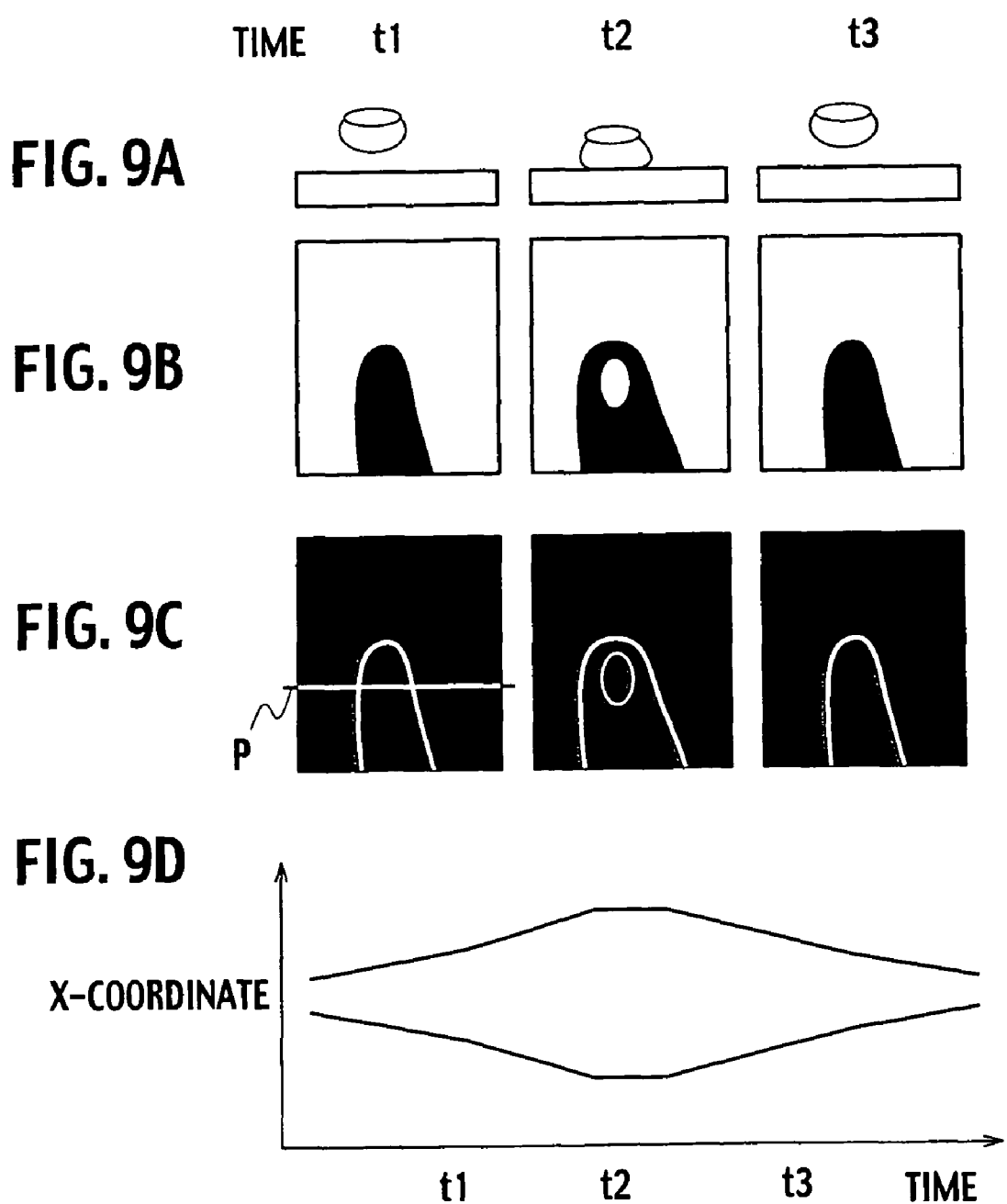

FIG. 11
BINARY IMAGE BEFORE PROCESSING
B(x,y)
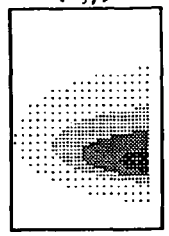
BINARY IMAGE AFTER PROCESSING
F(x,y)
AREA COVERAGE MODULATION (12 PIXELS × 12 PIXELS)
$$F(x,y) = \sum_{i=-6}^{5} \sum_{j=-6}^{5} B(x+i, y+j)$$
FIG. 12
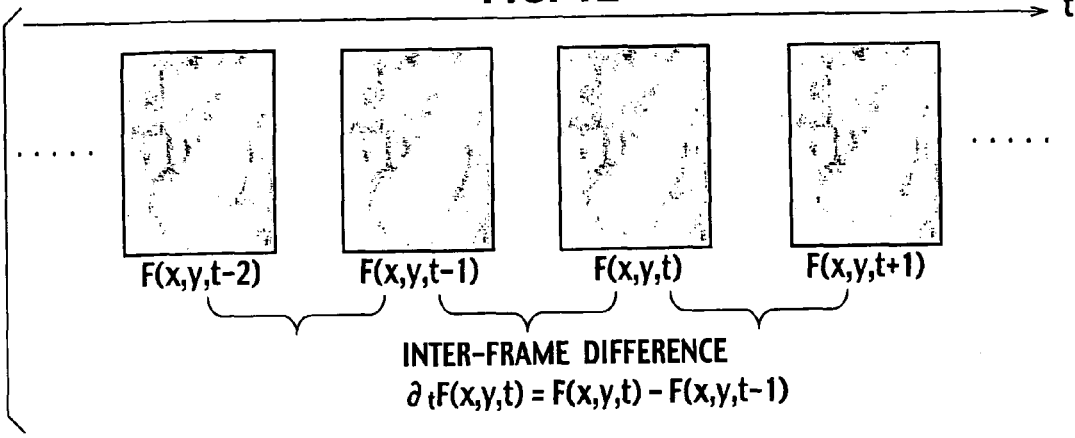
INTER-FRAME DIFFERENCE
$\partial_t F(x,y,t) = F(x,y,t) - F(x,y,t-1)$
FIG. 13
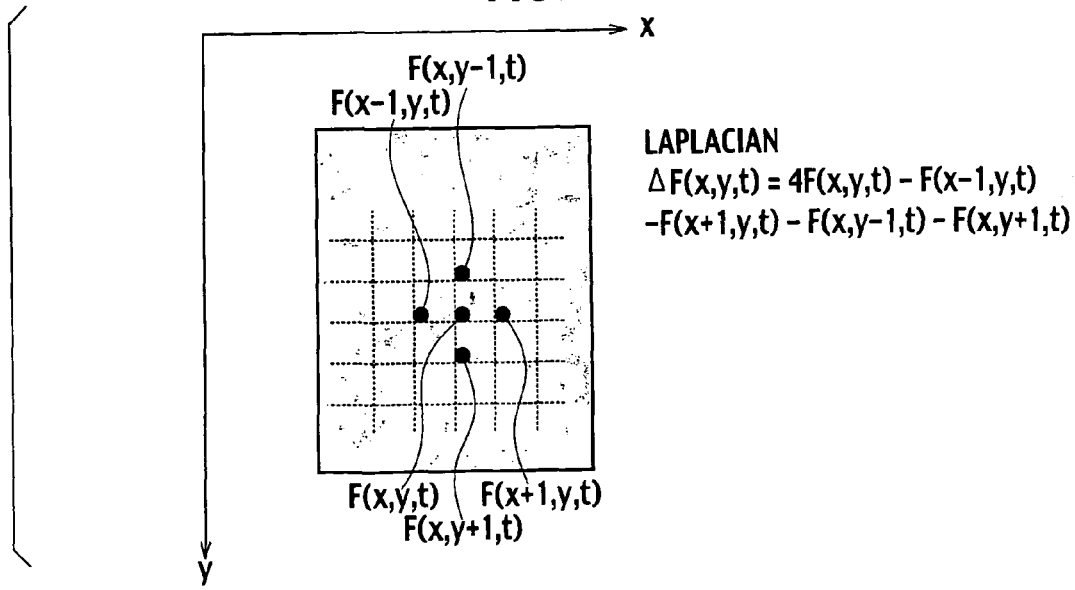
LAPLACIAN
$\Delta F(x,y,t) = 4F(x,y,t) - F(x-1,y,t)$
$- F(x+1,y,t) - F(x,y-1,t) - F(x,y+1,t)$

FIG. 71

| N | Vprc (V) | EXPOSURE TIME (H) | MEDIAN Min | MEDIAN Max |
|---|---|---|---|---|
| 00 | 3.0 | 324 | 0 | 160 |
| 01 | 3.125 | 324 | 100 | 160 |
| 02 | 3.25 | 324 | 90 | 180 |
| 03 | 3.375 | 324 | 80 | 200 |
| 04 | 3.625 | 324 | 130 | 210 |
| 05 | 3.75 | 324 | 160 | 220 |
| 06 | 4.0 | 324 | 180 | 250 |
| 07 | 4.25 | 324 | 200 | 250 |
| 08 | 4.5 | 324 | 220 | 250 |
| 09 | 4.5 | 260 | 220 | 250 |
| 10 | 4.5 | 196 | 220 | 250 |
| 11 | 4.5 | 132 | 220 | 250 |
| 12 | 4.5 | 68 | 220 | 250 |
| 13 | 4.5 | 36 | 220 | 250 |
| 14 | 4.5 | 16 | 220 | 250 |
| 15 | 4.5 | 2 | 220 | 255 |

| 5 | 7 | 3 | 5 | 7 |
|---|---|---|---|---|
| 9 | 2 | 4 | 9 | 2 |
| 1 | 6 | 8 | 1 | 6 |
| 5 | 7 | 3 | 5 | 7 |
| 9 | 2 | 4 | 9 | 2 |

DISPLAY DEVICE INCLUDING FUNCTION TO INPUT INFORMATION FROM SCREEN BY LIGHT

CROSS-REFERENCE TO RELATED APPLICATIONS

This application is based upon and claims the benefit of priority from Japanese Patent Applications No. 2005-28178 filed on 3 Feb. 2005, No. 2005-55997 filed on 1 Mar. 2005, and No. 2005-188744 filed on 28 Jun. 2005; the entire contents of which are incorporated herein by reference.

BACKGROUND OF THE INVENTION

1. Field of the Invention

The present invention relates to a display device capable of inputting information from a screen by light.

2. Description of the Related Art

In recent years, a liquid crystal display device has been widely used for various instruments such as a cellular phone and a notebook computer. The liquid crystal display device includes a display unit having pixels on respective intersections of plural scan lines and plural signal lines, which are wired so as to intersect each other, a drive circuit which drives the scan lines, and a drive circuit which drives the signal lines. Each of the pixels includes a thin-film transistor, a liquid crystal capacitor, and an auxiliary capacitor. In general, the display unit is formed on an array substrate made of glass. Owing to development of circuit integration technologies in recent years, it has become possible to also form a part of the drive circuits on the array substrate, and weight saving and miniaturization of the entire liquid crystal display device have been achieved.

Moreover, as disclosed in Japanese Patent Laid-Open Publication No. 2004-318819, there is developed a display device which arranges optical sensors in pixels, thus making it possible to input information from a screen by light.

In this type of display device, for example, photodiodes are used as the optical sensors, and in the respective pixels, capacitors are connected to the photodiodes. Then, an amount of charge of each capacitor is changed in response to a change of an amount of received light in each photodiode, a voltage between both ends of the capacitor is detected, and data of an imaged image is thus generated.

As applications of the display device as described above, ones having a touch panel function and a digitizer function have been proposed. The touch panel function is to input information by detecting a shadow made by an object such as a finger projected on the screen. The digitizer function is to input information by detecting light irradiated from a light-emitting object such as a light pen.

However, the conventional display device including the light input function has a problem that it is difficult to determine whether or not the object such as the finger and the light pen has contacted the screen, and to calculate a coordinate position of the object accurately.

In particular, in a technique of utilizing the shadow made by the object, when an ambient environment is dark, the shadow made by the object approaching the screen cannot be identified accurately. Accordingly, accuracy in the information input drops. Moreover, also when the ambient environment is too light, the accuracy in the information input drops.

Moreover, the imaged image obtained by inputting the light is an image of a binary monochrome gradation, and accordingly, there are limitations on determination accuracy in the case of determining reflected light from the object on the screen and other light in a binary manner.

It is an object of the present invention to enhance the accuracy in determining whether or not the object has contacted the screen.

It is another object of the present invention to enhance the accuracy in calculating the coordinate position of the object on the screen.

It is still another object of the present invention to determine the reflected light from the object on the screen and the other light in the binary manner accurately.

SUMMARY OF THE INVENTION

A display device according to a first aspect of the present invention includes: a display unit including a display function to display an image on a screen, and an optical input function to image an image of an object which has approached the screen; an edge detection circuit configured to detect edges of the imaged image, thereby forming an edge image; a contact determination circuit configured to determine whether or not the object has contacted the screen by using the edge image; and a coordinate calculation circuit configured to calculate a position coordinate of the object by using the edge image when it is determined that the object has contacted the screen.

In this aspect of the present invention, when the object has contacted the screen, spatial changes of a contact portion and a non-contact portion in the imaged image become apparent. Accordingly, by detecting the edges by using the imaged image, a boundary between the contact portion and the non-contact portion is identified, and is utilized in the contact determination, and accuracy of the contact determination is thus enhanced. Moreover, when it is determined that the object has contacted the screen, the position coordinate of the object is calculated by using the detected edges. In such a way, the coordinate position is adapted not to be calculated when the object is not in contact with the screen, and calculation accuracy of the position coordinate is thus enhanced.

A display device according to a second aspect of the present invention includes: a display unit including a display function to display an image on a screen, and an optical input function to image an image of an object which has approached the screen; an inter-frame difference processing circuit configured to obtain a difference image formed by taking a difference between a multi-gradation image in a current frame and a multi-gradation image in a past frame for the imaged image; a contact determination circuit configured to determine whether or not the object has contacted the screen by using the difference image; and a coordinate calculation circuit configured to calculate a position coordinate of the object by using the difference image when it is determined that the object has contacted the screen.

In this aspect of the present invention, a temporal change occurs in the imaged image when the object has contacted the screen, and accordingly, the difference image formed by taking the difference between the multi-gradation image in the current frame and the multi-gradation image in the past frame is obtained. In such a way, the boundary between the contact portion and the non-contact portion is identified based on the temporal change of the imaged image, and is utilized for the contact determination. In such a way, the accuracy of the contact determination is enhanced.

A display device according to a third aspect of the present invention includes: a display unit including a display function to display an image on a screen, and an optical input function to image an image of an object which has approached the screen; a modulation circuit configured to convert the imaged image into a multi-gradation image; an edge detection circuit configured to detect edges by using the multi-gradation image; an inter-frame difference processing circuit configured to obtain a difference image formed by taking a difference between the multi-gradation image in a current frame and the multi-gradation image in a past frame; a coordinate calculation circuit configured to calculate a position coordinate of the object by using at least one of an edge image and the difference image; and a contact determination circuit configured to determine whether or not the object has contacted the screen by using at least one of the edge image and the difference image.

In this aspect of the present invention, the edge image is suitable for the contact determination/coordinate calculation under a light environment, and the difference image is suitable for the contact determination/coordinate calculation under a dark environment. Meanwhile, it is possible to determine lightness of environmental light based on the gradation value of the multi-gradation image. Accordingly, based on the multi-gradation image, it is determined whether or not the object has contacted the screen by using at least one of the edge image and the difference image, thus making it possible to perform the contact determination in response to the environment. In such a way, the accuracy is further enhanced. Moreover, the position coordinate of the object is calculated by using at least one of the edge image and the difference image, thus making it possible to perform the coordinate calculation in response to the environment. In such a way, the accuracy is further enhanced.

A display device according to a fourth aspect of the present invention includes: a display unit including a display function to display plural switches on a screen, and an optical input function to take an image of an object which has approached the switches; a counting circuit configured to count a number of white pixels for each of the switches for the imaged image, to calculate a difference value between a counted value in a current frame and a counted value in a past frame, and to output, when a maximum one of the difference values for each of the switches is a predetermined threshold value or more, a signal indicating an effect that the object has contacted the switch; an inter-frame difference processing circuit configured to obtain a difference image formed by taking a difference between a multi-gradation image in the current frame and a multi-gradation image in the past frame, to extract a region showing the object from the difference image, to calculate a center of gravity of the region, and to output a signal indicating an affect that the object has contacted the switch located at the center of gravity; an edge detection circuit configured to detect edges from the multi-gradation images, to calculate a center of gravity of the edge in which intensity is a predetermined threshold value or more, and to output a signal indicating an effect that the object has contacted the switch located at the center of gravity; a contact probability calculation circuit configured to calculate a contact probability for each of the switches based on the signals individually outputted from the counting circuit, the inter-frame difference circuit, and the edge detection circuit.

In this aspect of the present invention, by the counting circuit, the inter-frame difference processing circuit, and the edge detection circuit, the signals indicating the switch having a high possibility to be contacted by the object are outputted by techniques different from one another. Then, by the contact probability calculation circuit, the contact probability is calculated for each switch. Thus, it is made possible to provide a highly reliable contact probability. Accordingly, highly accurate and flexible contact determination and coordinate calculation in response to reliability required for the system are made possible.

A display device according to a fifth aspect of the present invention includes: a display unit configured to display an image on a screen, and to image an object which has approached the screen by using optical sensors; and a sensor drive unit configured to change a drive condition of the optical sensors based on a statistical amount of output values of the optical sensors.

In this aspect of the present invention, the drive condition of the optical sensors is changed based on the output values of the optical sensors, which are varied in response to the external light, thus making it possible to appropriately control sensitivities of the optical sensors.

A display device according to a sixth aspect of the present invention includes: a pixel region including plural pixels; optical sensor elements provided for each of the pixels; and a determination unit configured to compare a value to be determined, the value being based on multi-gradation data of each of the pixels, and a threshold value with each other in magnitude, the multi-gradation data corresponding to intensity of light received by the optical sensor elements.

In this aspect of the present invention, the multi-gradation data of each of the pixels, which corresponds to the intensity of the light received by the optical sensor elements, is used for the binary determination for reflected light from the object on the display screen and other light, thus making it possible to set a threshold value for performing accurate determination. In such a way, the determination accuracy can be enhanced.

BRIEF DESCRIPTION OF THE DRAWINGS

FIG. 9A shows positional relationships between the finger and the screen at times t1 to t3 during the exposure time when the finger has contacted the screen. FIG. 9B shows imaged images after the modulation/binarization, FIG. 9C shows edge images, and FIG. 9D shows coordinates of edges.

FIG. 11 shows an example of processing in a modulation circuit in the sensing IC of FIG. 10.

FIG. 12 shows an example of processing in an inter-frame difference processing circuit in the sensing IC of FIG. 10.

FIG. 13 shows an example of processing in an edge detection circuit in the sensing IC of FIG. 10.

FIG. 71 shows a table in which precharge voltages, exposure times, the minimum values of the median values, and the maximum values of the median values are set.

DESCRIPTION OF THE EMBODIMENT

First Embodiment

Figure 1:
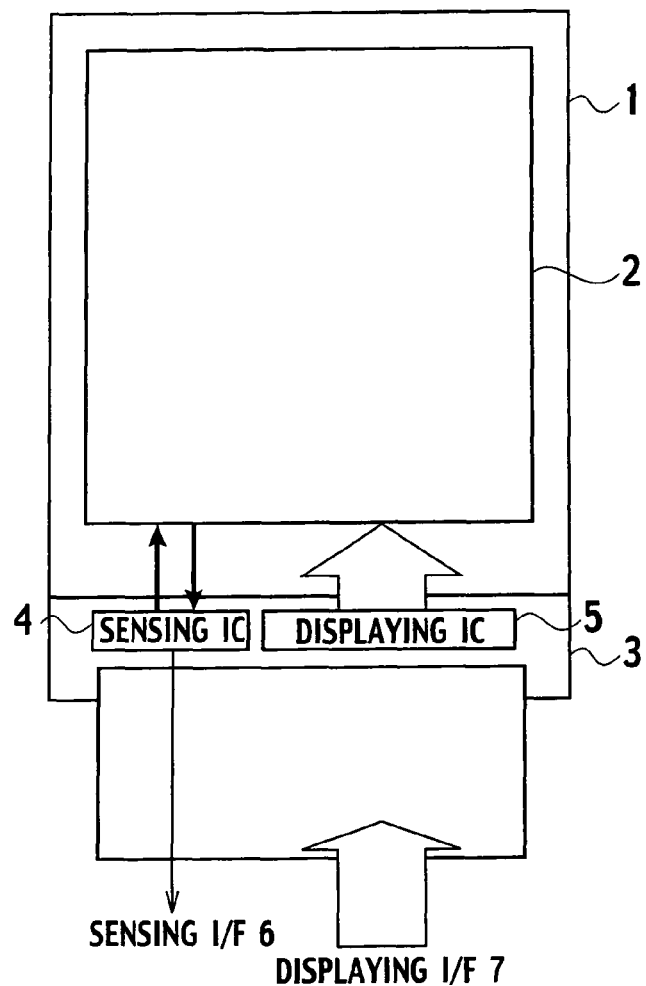
FIG. 1 is a plan view showing a configuration of a display device in a first embodiment.

FIG. 1 is a plan view showing a configuration of a display device in this embodiment. The display device in this drawing includes a display unit 2 formed on an array substrate 1 made of glass, a flexible substrate 3, a sensing integrated circuit (IC) 4 and a displaying IC 5, both of which are formed on the flexible substrate 3, an interface (I/F) 6 for the sensing IC 4, and an interface 7 for the displaying IC.

In the display unit 2, plural signal lines and plural scan lines are wired so as to intersect each other, and pixels are provided on the respective intersections. The display unit 2 includes a display function to display an image based on a video signal transmitted from a host-side CPU through the displaying interface 7 and the displaying IC 5, a light input function to image an image of an external object approaching a screen, and a function to transmit the imaged image to a host through the sensing IC 4 and the sensing interface 6. The sensing IC 4 performs processing for the imaged image, and transmits a result of the processing to the host-side CPU through the sensing interface 6. The displaying IC 5 controls display processing.

Figure 2:
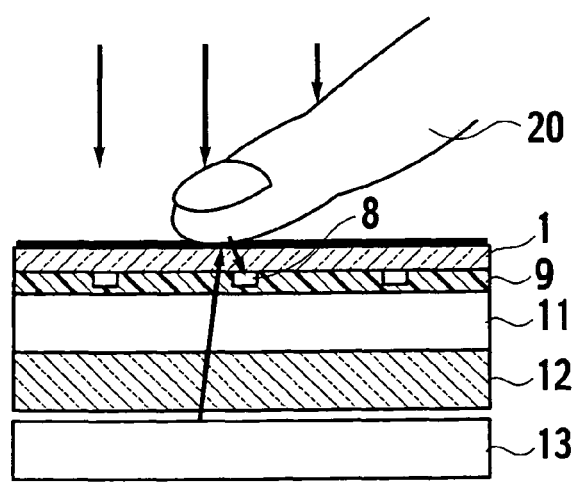
FIG. 2 is a cross-sectional view showing a configuration of a display unit of the display device.

FIG. 2 is a cross-sectional view showing a configuration of the display unit 2. In the array substrate 1, optical sensors 8 and the like are formed in the pixels, and an insulating layer 9 is formed so as to cover the optical sensors 8 and the like. A liquid crystal layer 11 is formed in a gap between the array substrate 1 and an opposite substrate 12 made of glass, which is arranged opposite thereto. A backlight 13 is arranged outside of the opposite substrate 12. Onto the optical sensors 8, external light that is not shaded by an object 20 such as a finger and light reflected on the object 20 are made incident.

Figure 3:
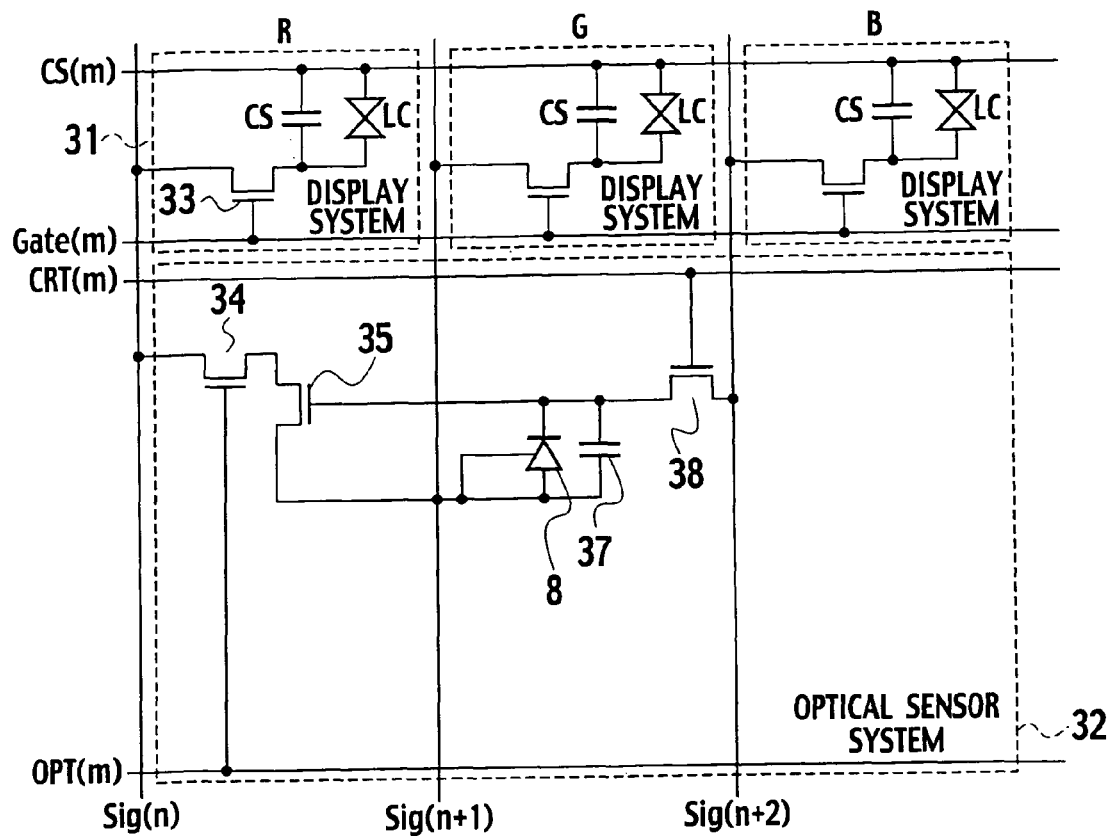
FIG. 3 is a circuit diagram showing a configuration of pixels provided in the display unit.

FIG. 3 is a circuit diagram showing a configuration of the pixels. In the display unit 2, pixels of red (R), blue (B), and green (G) are regularly arrayed. As a display system 31, each pixel includes a switching element 33, a liquid crystal capacitor LC, and an auxiliary capacitor CS. In this drawing, reference symbol Gate(m) denotes the scan line, reference symbol Sig(n) denotes the signal line, and reference symbol CS(m) denotes an auxiliary capacitor line. The switching element 33 is of a MOS type, a gate thereof is connected to the scan line, a source thereof is connected to the signal line, and a drain thereof is connected to the auxiliary capacitor CS and the liquid crystal capacitor LC. The other terminal of the auxiliary capacitor CS is connected to the auxiliary capacitor line CS(m).

When the switching element 33 is turned on by a scan signal transmitted to the scan line, the video signal transmitted from the host-side CPU through the signal line is given to the auxiliary capacitor CS and the liquid crystal capacitor LC through the switching element 33, and is used for display.

The display unit 2 includes an optical sensor system 32 for each set of three pixels of R, G and B. The optical sensor system 32 includes an optical sensor 8, a sensor capacitor 37, an output control switch 34, a source follower amplifier 35, and a precharge control switch 38. Here, a PIN-type photodiode is used as an example of the optical sensor 8.

The optical sensor 8 and the sensor capacitor 37 are connected in parallel. These optical sensor 8 and sensor capacitor 37 are connected to a signal line Sig(n) for red through the source follower amplifier 35 and the output control switch 34, and are connected to a signal line Sig(n+2) for blue through the precharge control switch 38.

ON/OFF of the output control switch 34 is controlled by a signal on a control line OPT(m), and ON/OFF of the precharge control switch 38 is controlled by a signal on a control line CRT(m).

Next, an operation of the optical sensor 8 is described. For example, a voltage of 4V is precharged to the sensor capacitor 37 from the signal line for blue through the precharge control switch 38. When a leak current is generated in the optical sensor 8 in response to a quantity of light incident onto the optical sensor during a predetermined exposure time, a potential of the sensor capacitor 37 is changed. The sensor capacitor 37 maintains the potential thereof at approximately 4V when the leak current is small, and drops the potential thereof to approximately 0V when the leak current is large. Meanwhile, after the signal line for red is precharged at 5V, the output control switch 34 is turned on, and the source follower amplifier 35 is conducted to the signal line for red. The sensor capacitor 37 is connected to a gate of the source follower amplifier 35. Accordingly, when a residual voltage of the sensor capacitor 37 is kept, for example, at 4V, the source follower amplifier 35 is turned on, and a potential of the signal line for red is changed from 5V toward 0V. When the residual voltage of the sensor capacitor 37 is 0V, the source follower amplifier 35 is turned off, and the potential of the signal line for red is hardly changed while being kept at 5V.

Figure 4:
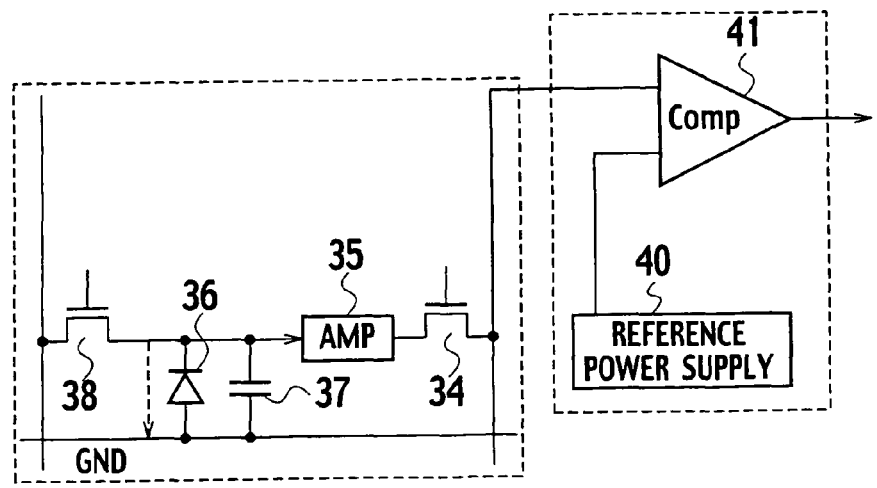
FIG. 4 is a circuit diagram showing a configuration of an optical sensor system in the pixels.

As shown in a circuit diagram of FIG. 4, a comparator 41 compares the potential of the signal line for red and a reference voltage of a reference power supply 40 with each other. When the potential of the signal line is larger than the reference voltage, the comparator 41 outputs a high-level signal, and when the potential of the signal line is smaller than the reference voltage, the comparator 41 outputs a low-level signal.

In such a way, the comparator 41 outputs the high-level signal when the optical sensor 8 has detected lighter light than a predetermined value, and outputs the low-level signal when the optical sensor 8 has detected darker light than the predetermined value. The output of the comparator 41 is transmitted to the sensing IC 4.

Figure 5:
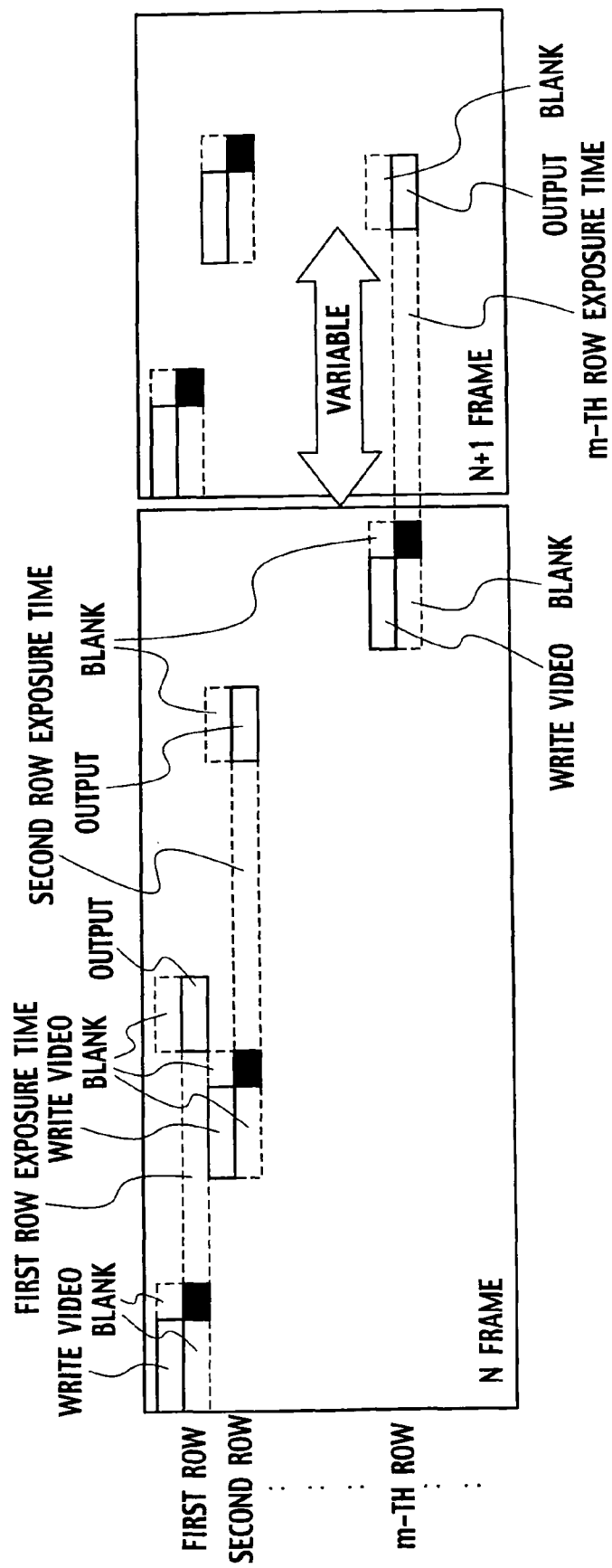
FIG. 5 is a timing chart showing operations of the display device.

FIG. 5 is a timing chart showing an operation of the display device. In this drawing, for each row (each scan line), a timing chart of the display system is shown in an upper part, and a timing chart of an imaging system is shown in a lower part. As shown in this drawing, the display device images the object on the screen for a fixed exposure time after an elapse of a fixed blank period after writing of the video signal to the pixels is completed in the display system. The exposure time is changeable. In the blank period, the sensor capacitor 37 is precharged.

Figure 6:
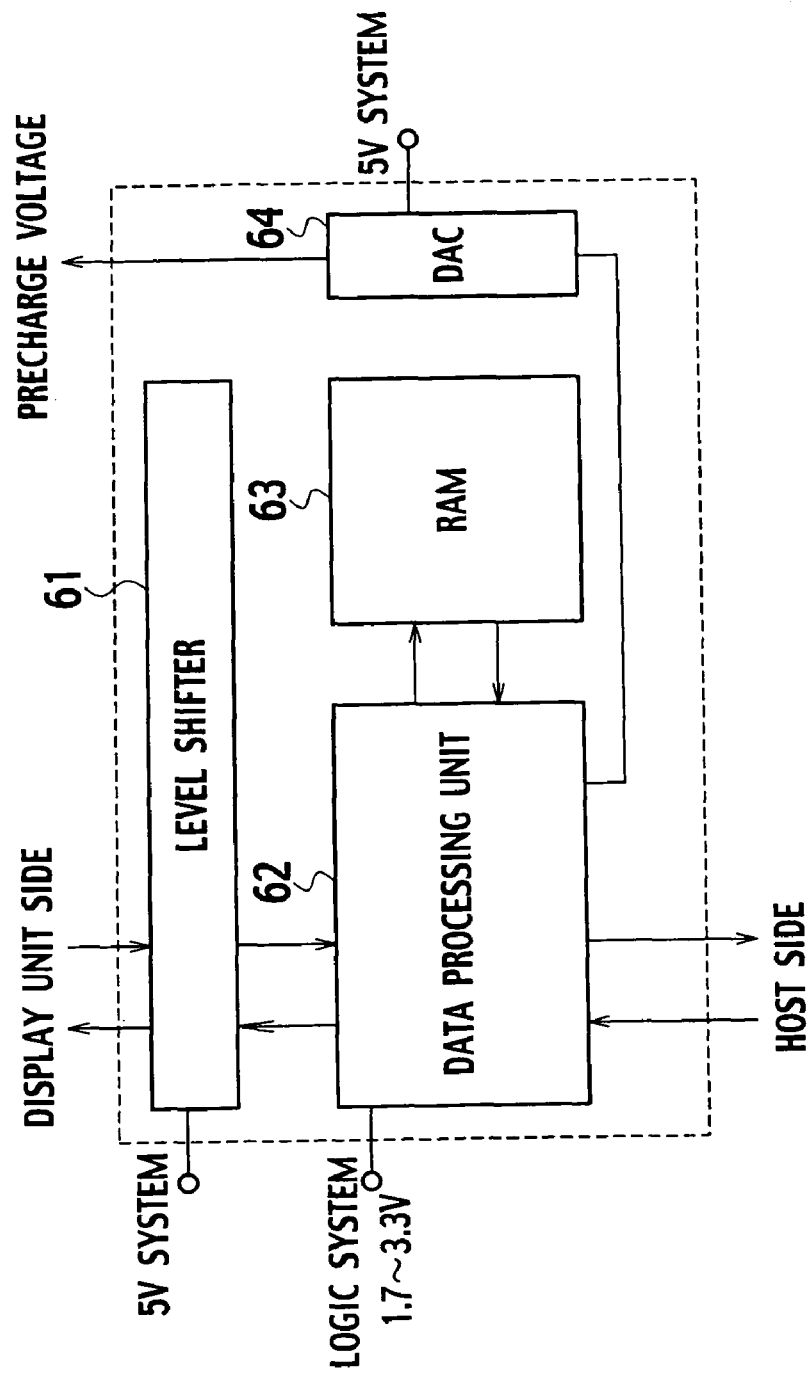
FIG. 6 is a circuit block diagram showing a configuration of a sensing IC in the display device.

FIG. 6 is a circuit block diagram showing a configuration of the sensing IC. The sensing IC in this drawing includes a level shifter 61 which adjusts the voltage of the signal for exchanging the signal with the display unit 2, a data processing unit 62 which processes the output signal from the comparator 41, a random access memory (RAM) 63 which temporarily stores data, a digital analog converter (DAC) 64 which outputs a precharge voltage in the case of precharging the signal line.

Figure 7:
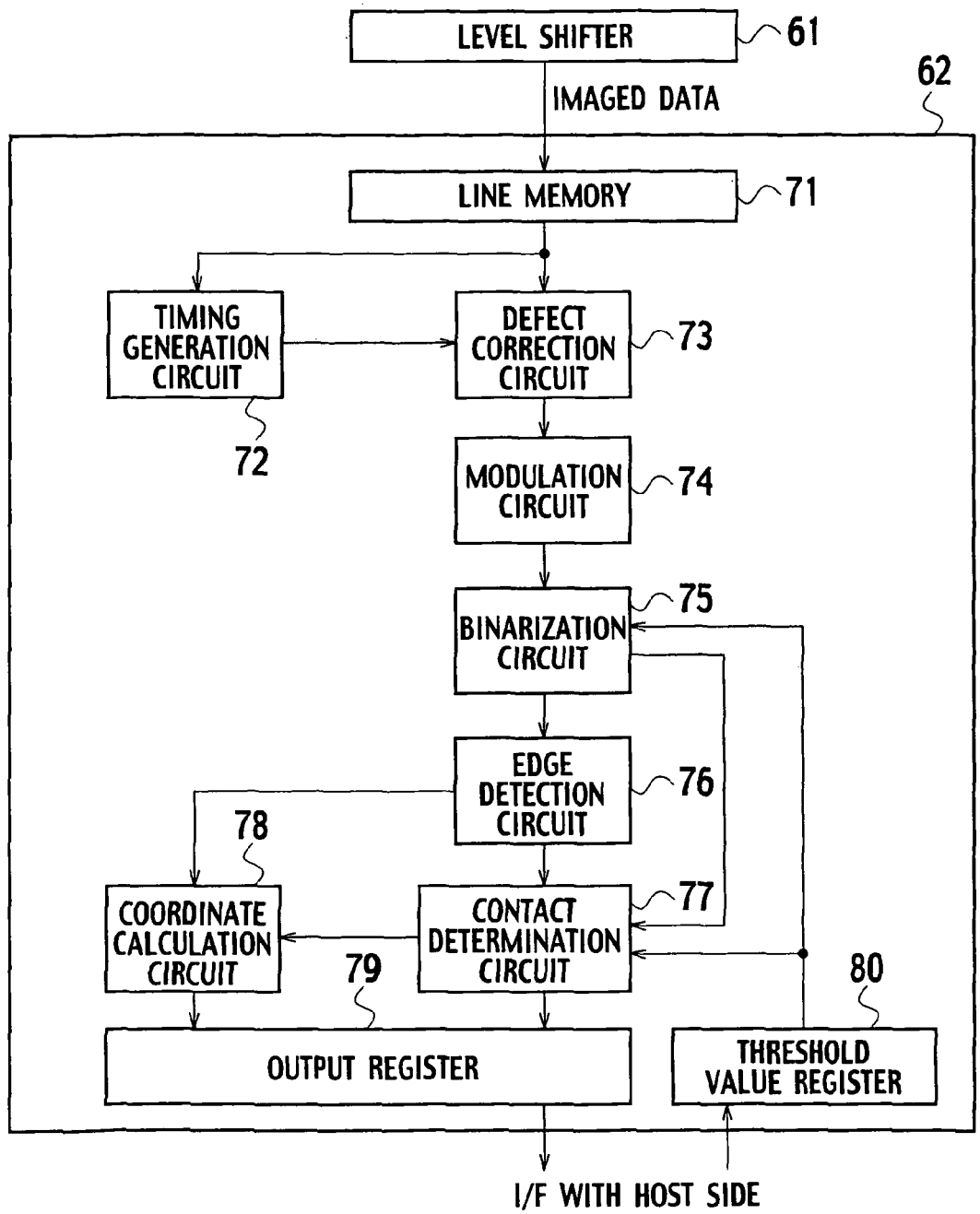
FIG. 7 is a circuit block diagram showing a data processing unit in the sensing IC.

FIG. 7 is a circuit block diagram showing a configuration of the data processing unit 62. The data processing unit 62 includes a line memory 71, a timing generation circuit 72, a defect correction circuit 73, a modulation circuit 74, a binarization circuit 75, an edge detection circuit 76, a contact determination circuit 77, a coordinate calculation circuit 78, an output register 79, and a threshold value register 80.

The line memory 71 temporarily stores binary signals for plural rows, which have been transmitted as imaged data from the above-described comparator 41 through the level shifter 61.

The defect correction circuit 73 includes a filter which corrects a value of each pixel based on values of pixels in the vicinity thereof. For example, a median filter is used as the filter. The defect correction circuit 73 operates in accordance with timing generated by the timing generation circuit 72. The defect correction circuit 73 can be omitted.

The modulation circuit 74 calculates gradation values of multi gradation by taking an average of the values of the pixels in the vicinity of each pixel, thereby obtaining a multi-gradation image. Here, the vicinity is defined as a region of 1.5 mm square to 6 mm square around the interest pixel. When a size of the region is too small, noise is increased, and when the size of the region is too large, the read image is smoothened too much, making it difficult to perform edge detection performed later. Note that this processing also includes an effect of the defect correction. Moreover, though such an area gradation can be calculated for each of the entire pixels, the entire gradation values may not be held, but gradation values thinned at a predetermined interval may be held. Specifically, when an original binary image has a size of 240×320×1 bits, the gradation image is made not to have a size of 240×320×8 bits, but may be thinned to a size of 15×20×8 bits. A ratio of the thinning depends on thickness of an indicating member such as the finger and a pitch of the sensors. In an example where the finger is an adult finger with a width of approximately 1 cm and a pixel pitch is 0.15 mm, the size of the gradation image may be approximately 15×20×8 bits (equivalent to thinning to 1/16 laterally and horizontally).

The binarization circuit 75 binarizes the multi-gradation image by using a threshold value given from the host-side CPU. For the threshold value, one prestored in the threshold register 80 is used.

The edge detection circuit 76 detects plural edges from the imaged image. For the edge detection, for example, a Laplacian filter is used (for details, refer to a second embodiment).

When the object has contacted the screen, spatial changes of a contact portion and a non-contact portion in the imaged image become apparent. Accordingly, the contact determination circuit 77 determines whether or not the object has contacted the screen by using the detected edges. Specifically, a moving direction of each edge is investigated, and as a result, when there are edges moving in directions reverse to each other, it is determined that the object has contacted the screen. In this case, it is determined that the object has contacted the screen when each moving amount in the reverse direction is a predetermined threshold value or more, thus making it possible to enhance accuracy of the determination.

When it is determined by the contact determination circuit 77 that the object has contacted the screen, the coordinate calculation circuit 78 calculates a coordinate position of the object by using the edges detected by the edge detection circuit 76. For specifically calculating the coordinate position, for example, a center of gravity of the edges is obtained.

The output register 79 includes a register which stores the coordinate position of the object, which is obtained based on a calculation result of the center of gravity, and a register which stores a result of the determination by the contact determination circuit 77. Then, the output register 79 outputs the coordinate position and the determination result to the host-side CPU in accordance with a request from the host-side CPU or at predetermined timing.

The threshold value register 80 stores the threshold value for use in the binarization circuit 75 and the threshold value for use in the contact determination circuit 77. As these threshold values, ones transmitted from the host-side CPU are stored.

Next, examples of the edge detection and the contact determination are described by using FIG. 8 and FIG. 9. FIG. 8 shows states at times t1 to t3 during the exposure time in the case where the finger has not contacted the screen. FIG. 8A shows positional relationships between the finger and the screen. FIG. 8B shows the imaged images after the modulation/binarization. FIG. 8C shows edge images. FIG. 8D shows coordinates of the edges. FIG. 8D shows changes with time of coordinates of two edges intersecting a profile line P shown for time t1 of FIG. 8C. Meanwhile, FIG. 9 shows states in the case where the finger has contacted the screen in a similar way to FIG. 8. However, in FIG. 9, the finger is in contact with the screen at time t2.

Figure 8A:
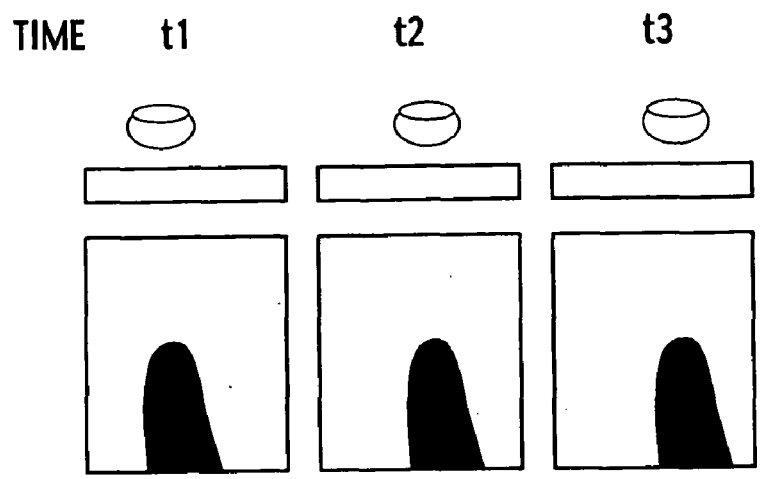
FIG. 8A shows positional relationships between a finger and a screen at times t1 to t3 during an exposure time when the finger has not contacted the screen.
Figure 8B:
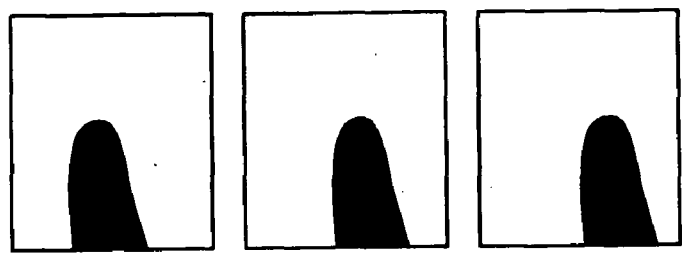
FIG. 8B shows imaged images after modulation/binarization.
Figure 8C:
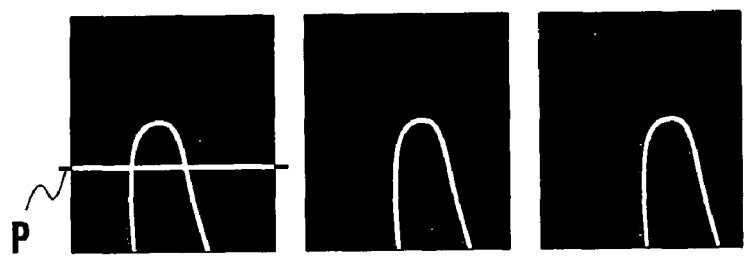
FIG. 8C shows edge images.
Figure 8D:
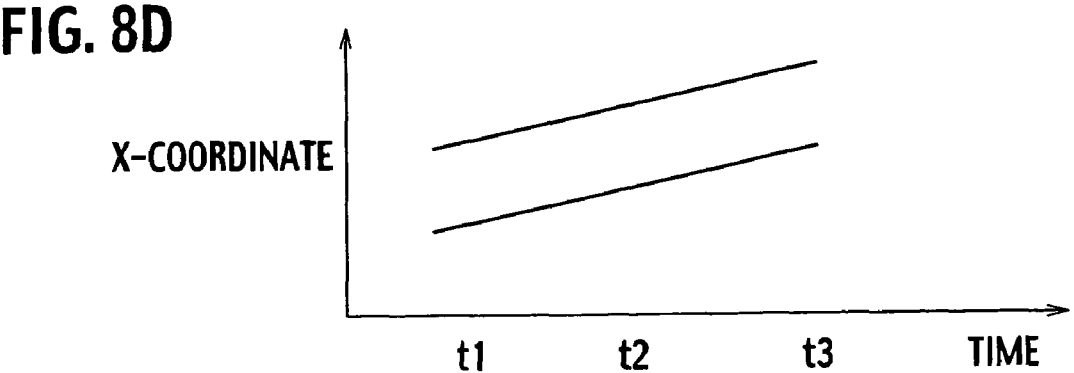
FIG. 8D shows coordinates of edges.

As shown in FIG. 8D, when the finger does not contact the screen, a distance between the coordinates of the two edges is hardly changed. As opposed to this, as shown in FIG. 9D, when the finger has contacted the screen, the finger swells longitudinally and laterally, and therefore, the two edges move in directions reverse to each other. Accordingly, in the contact determination circuit 77, when the edges moving in the directions reverse to each other by the threshold value or more have been detected, it is determined that the finger has contacted the screen.

As described above, according to this embodiment, when the object has contacted the screen, the spatial changes of the contact portion and the non-contact portion in the imaged image become apparent. Accordingly, a boundary between the contact portion and the non-contact portion is identified by detecting the edges by using the imaged image. Then, by utilizing the boundary for the contact determination, the enhancement of the accuracy of the contact determination is achieved. Specifically, the edges of the imaged image are detected by the edge detection circuit 76, and it is determined by the contact determination circuit 77 that the object has contacted the screen when there are edges moving in the directions reverse to each other. Unless the object contacts the screen, the edges do not move in the directions reverse to each other, and accordingly, the accuracy of the contact determination can be enhanced.

According to this embodiment, when it is determined that the object has contacted the screen, a position coordinate of the object is calculated by the coordinate calculation circuit 78 by using the detected edges. Thus, a coordinate position is not calculated when the object does not contact the screen. Accordingly, enhancement of calculation accuracy of the position coordinate can be achieved. In the case of calculating the coordinate position, the center of gravity of the edges is calculated as the coordinate position, thus making it possible to calculate the coordinate position with high accuracy.

The technique of the contact determination in this embodiment may be used singly or in combination with other determination techniques. For example, when the finger has contacted the screen, as shown at time t2 of FIG. 9B, white pixels are increased in a portion of the center of gravity of the object. Accordingly, the number of white pixels is counted, and when the number reaches a predetermined threshold value, it may be further determined that the finger has contacted the screen. In such a way, the accuracy of the contact determination can be further enhanced.

Moreover, while the object is contacting the screen, as shown at time t2 of FIG. 9D, coordinates of the edges become constant, and a coordinate of the center of gravity also becomes constant. Accordingly, when at least one of the edge coordinates and the coordinate of the center of gravity gets constant, it may be further determined that the object has contacted the screen. Also in this case, the accuracy of the contact determination can be further enhanced.

Second Embodiment

In this embodiment, only a configuration of the sensing IC is different from that in the first embodiment, and a basic configuration of the display device is similar to that in the first embodiment. Accordingly, only the sensing IC is described here. A duplicate description of other portions similar to those of the first embodiment is omitted.

Figure 10:
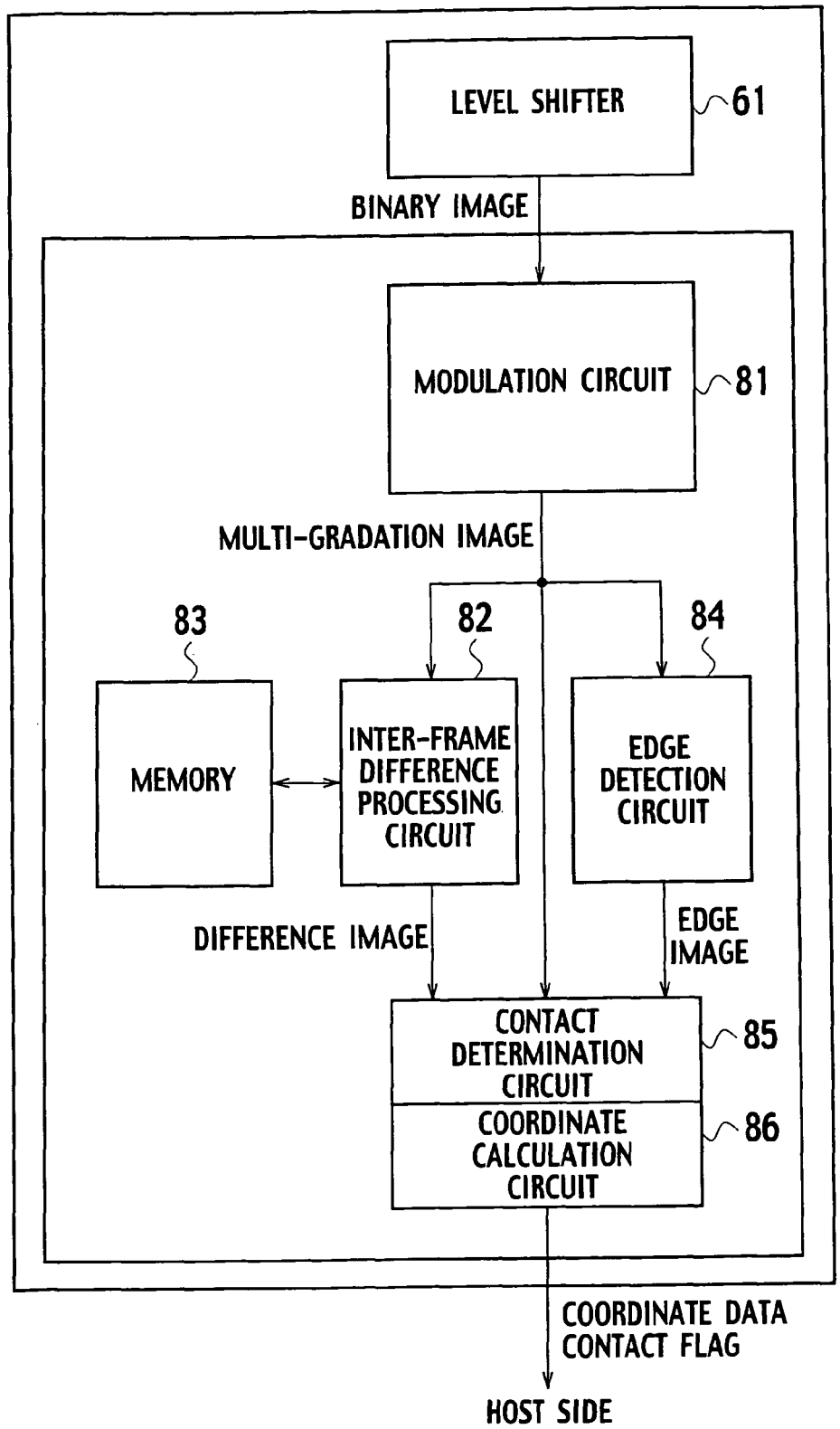
FIG. 10 is a circuit block diagram showing a configuration of a sensing IC in a second embodiment.

FIG. 10 is a circuit block diagram showing a configuration of a data processing unit in the sensing IC of this embodiment. The data processing unit in this drawing includes a modulation circuit 81, an inter-frame difference processing circuit 82, a memory 83, an edge detection circuit 84, a contact determination circuit 85, and a coordinate calculation circuit 86. Note that the second embodiment is similar to the first embodiment in that the sensing IC includes the level shifter 61 and the DAC 64 as well as the data processing unit.

The modulation circuit 81 converts the binary image transmitted from the comparator 41 described by using FIG. 4 into the multi-gradation image. With regard to a technique of such conversion, for example, as shown in FIG. 11, the sum of binary data composed of 0 and 1 is taken for each pixel in a square region of 12×12 pixels on the periphery thereof, and multi-gradation values ranging from 0 to 144 are obtained. Alternatively, multi-gradation values ranging from 0 to 256 may be obtained in a square region of 16×16 pixels. It is recommended that an appropriate value of the multi gradation be determined in consideration of a memory region provided inside of the sensing IC.

Moreover, in the display unit 2, the data of the imaged image may be outputted by an analog signal, and the analog signal may be converted into the multi-gradation digital signal by an A/D converted in the modulation circuit 81. Note that, even if a gradation image thinned as in the first embodiment is used, an influence thereof in the following processing is small. It is recommended that an appropriate value of the thinning be determined in consideration of efficiency in arranging the memory region provided inside of the sensing IC.

The inter-frame difference processing circuit 82 calculates a difference between a multi-gradation image in the current frame and a multi-gradation image in the past, which is stored in the memory 83, and outputs an image of the difference.

In the case of obtaining the difference image, for example, as shown in FIG. 12, a gradation value of a multi-gradation image of one frame before is subtracted from a gradation value of a multi-gradation image at arbitrary time t1. Note that, in this drawing, the gradation value at the coordinate (x, y) at time t is represented as F(x, y, t). Besides the above, when a polarity of a drive voltage of the pixel is changed for each frame, in order to remove an influence thereof, a difference in gradation value between the multi-gradation image of a frame and a multi-gradation image of two frames before may be taken. In such a way, the data is outputted from the sensor per two frames, and the number of output times is reduced. Accordingly, power consumption can be reduced, and a battery can be made to last longer. Moreover, after an average value among multi-gradation images in even number-th frames and an average value among multi-gradation images in odd number-th frames are taken, a difference between the average values may be taken.

The edge detection circuit 84 detects the edge (a portion where the spatial change of the gradation is large) from the multi-gradation image of each frame, and outputs an image of the edge.

In the case of detecting the edge, for example, as shown in FIG. 13, the Laplacian filter is used, which uses, as a gradation value of an arbitrary pixel, a result obtained by subtracting gradation values of four pixels adjacent to the pixel concerned vertically and horizontally from a value obtained by quadrupling the gradation value of the pixel concerned. Besides the above, a well-known filter such as a Sobel filter and a Roberts filter may be used.

Moreover, the pixels to be subjected to the arithmetic operation are not limited to the pixels adjacent to the arbitrary pixel vertically and horizontally, and may be pixels diagonally adjacent thereto. Moreover, in order to prevent a sensitive reaction to the noise, pixels apart from the arbitrary pixel by a few pixels vertically, horizontally and diagonally may be used. It is recommended that a range of the pixels for use in the filter processing go beyond a shadow of the indicating member such as the finger. When a width of the shadow of the indicating member is W, it is recommended that the pixels for use in the filter processing be apart from the interest pixel by W/2 or more. It is not necessary that the pixels be apart from the interest pixel by W or more. For example, in the case of using the adult finger (with the width of approximately 1 cm) for the input, it is recommended that the range of the pixels be 5 mm or more from the interest pixel. It is not necessary that the range be increased to more than 1 cm.

Moreover, in the edge detection circuit 84, in the case of the edge detection, the multi-gradation image outputted by the modulation circuit 82, or the multi-gradation image after the difference is taken by the inter-frame difference processing circuit 82 may be used. Such processing may be performed by using the gradation image after the thinning.

The contact determination circuit 85 determines whether or not the object has contacted the screen by using at lest one of the difference image and the edge image, which are obtained in the above-described manner, and of the original multi-gradation image. When the object has contacted the screen, an area of the region showing the object on the imaged image is widened, and accordingly, the contact determination circuit 85 makes the determination by utilizing such a widening phenomenon. For example, in the case of using the difference image, the region showing the object is extracted by binarizing the difference image by a predetermined threshold value, and when the area of the region has reached a predetermined threshold value or more, the contact determination circuit 85 determines that the object has contacted the screen. Meanwhile, in the case of using the edge image, the area showing the object is extracted by binarizing the edge image by a predetermined threshold value, and when the area of the region has reached a predetermined threshold value or more, the contact determination circuit 85 determines that the object has contacted the screen.

When it is determined that the object has contacted the screen, the coordinate calculation circuit 86 calculates a coordinate position of the object by using at least one of the difference image, the edge image, and the original multi-gradation image. For example, in the case of using the difference image or the edge image, the coordinate calculation circuit 86 calculates, as a position coordinate of the object, a center of gravity of a region where the area obtained by the above-described processing has reached the predetermined threshold value or more.

The above-described modulation circuit 81, inter-frame difference processing circuit 82, memory 83, edge detection circuit 84, contact determination circuit 85, and coordinate calculation circuit 86 can be realized by using ASICs and DSPs, and moreover, can also be formed integrally with the displaying IC 5.

Next, effects of the processing by the inter-frame difference processing circuit 82 and the edge detection circuit 84 are described while being individually compared with comparative examples.

Figure 14:
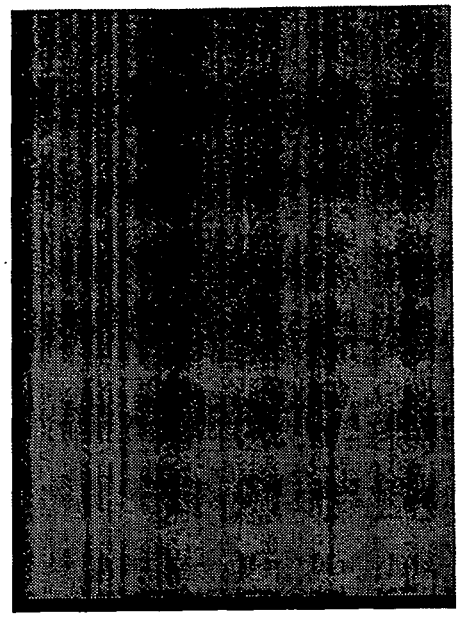
FIG. 14 shows a multi-gradation image immediately before the finger contacts the screen.
Figure 15:
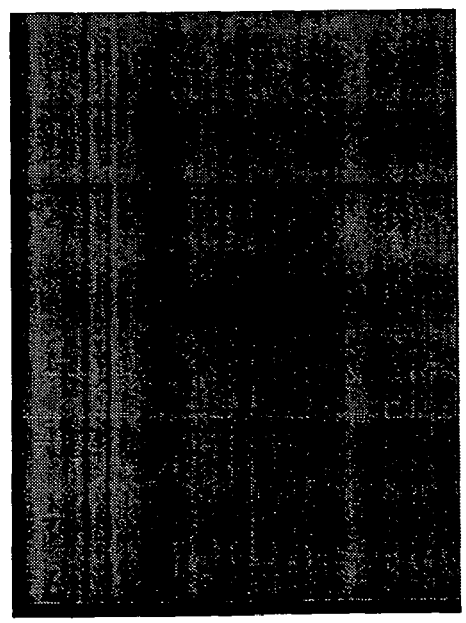
FIG. 15 shows a multi-gradation image at a moment when the finger contacts the screen.
Figure 16:
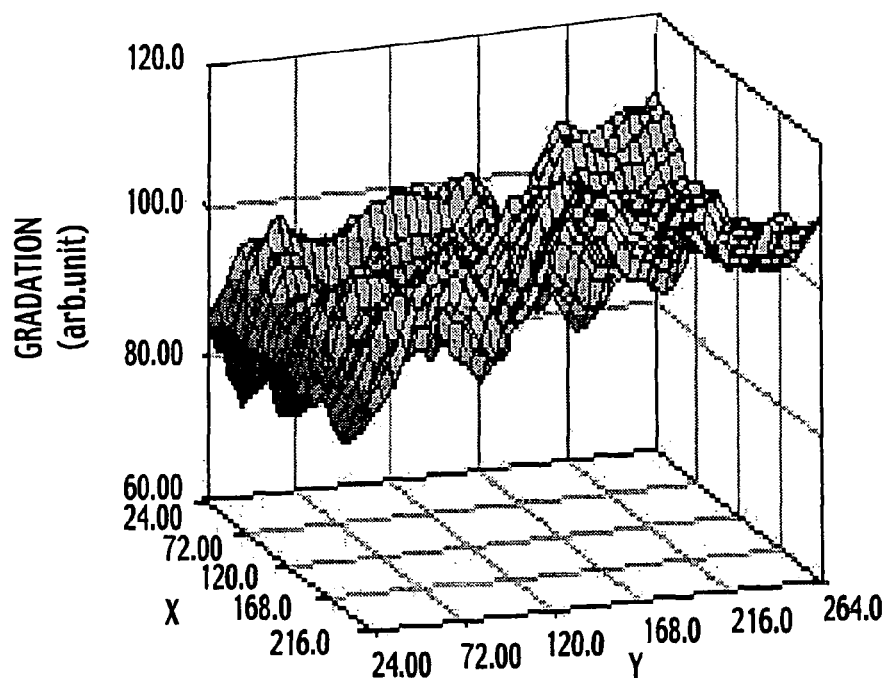
FIG. 16 is a three-dimensional graph showing gradation values of the image of FIG. 14.
Figure 17:
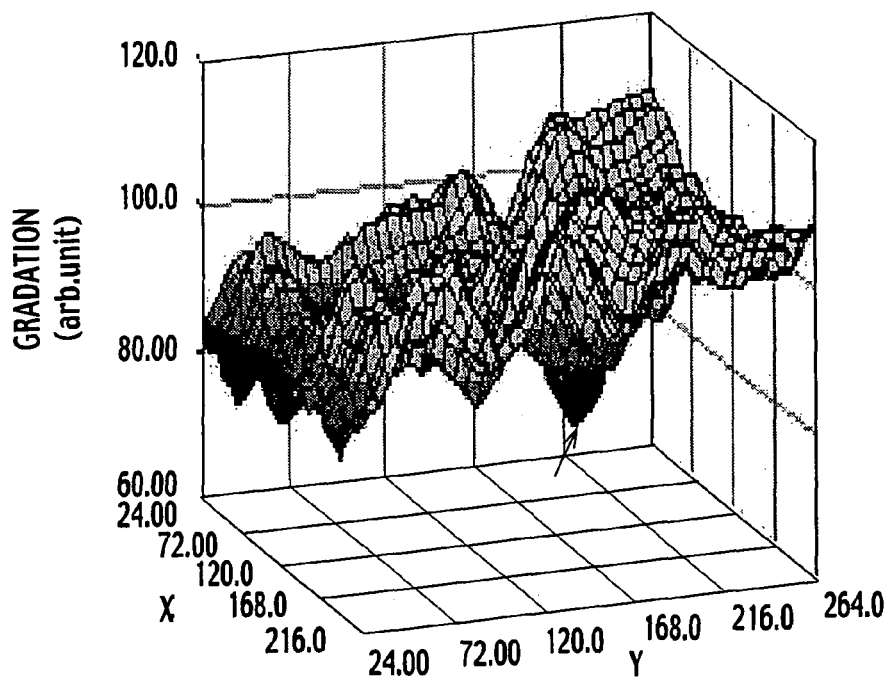
FIG. 17 is a three-dimensional graph showing gradation values of the image of FIG. 15.

FIG. 14 and FIG. 15 show examples of the multi-gradation images obtained as the outputs of the modulation circuit 81 when the finger acts to touch the vicinity of the center of the screen under a dark environment with illumination of several hundred lux. FIG. 14 shows an image of two frames before a moment when the finger contacts the screen, and FIG. 15 shows an image at the moment when the finger contacts the screen. FIG. 16 and FIG. 17 display distributions of gradation values in the respective images of FIG. 14 and FIG. 15 on three-dimensional graphs.

As understood from FIG. 17, while the gradation value becomes the minimum at a spot contacted by the finger, the gradation value of the image is varied and an in-plane gradient is given owing to characteristic variations of the optical sensor, a gradient of an illumination distribution of ambient light itself, and the like.

Figure 18:
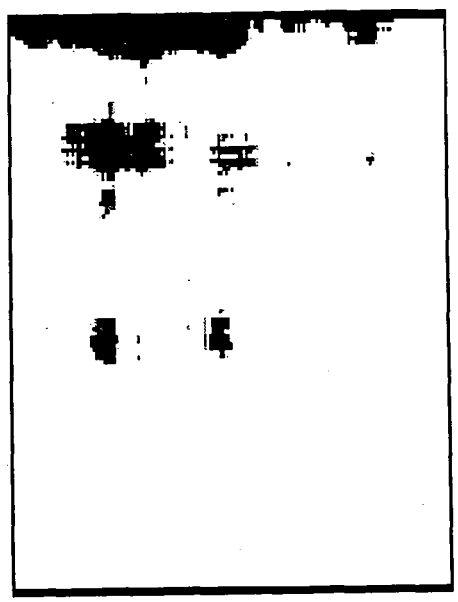
FIG. 18 shows an image formed by binarizing the image of FIG. 14.
Figure 19:
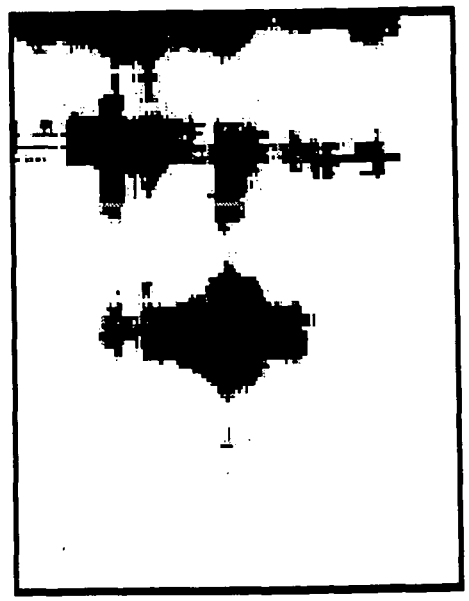
FIG. 19 shows an image formed by binarizing the image of FIG. 15.

FIG. 18 and FIG. 19 individually show images when the images of FIG. 14 and FIG. 15 are binarized by the predetermined threshold value. In FIG. 18, the contact region is erroneously detected though the finger does not contact the region concerned. In FIG. 19, a region that is not contacted by the finger is erroneously detected as the contact region. These show that it is necessary to strictly set the threshold value. However, when the surrounding environment becomes darker, it becomes more difficult to set the threshold value.

Figure 20:
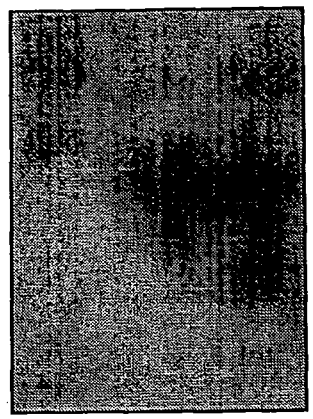
FIG. 20 shows a difference image between the image of FIG. 14 and the image of FIG. 15.
Figure 21:
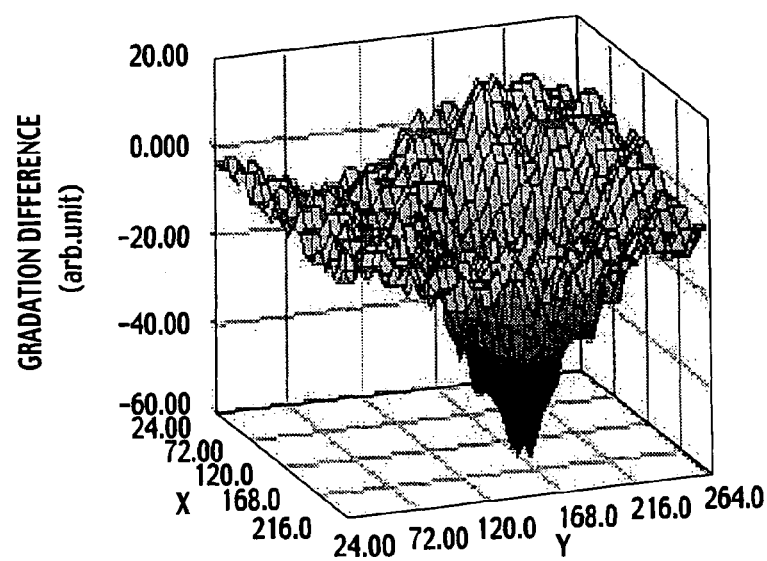
FIG. 21 is a three-dimensional graph showing gradation values of the image of FIG. 20.
Figure 22:
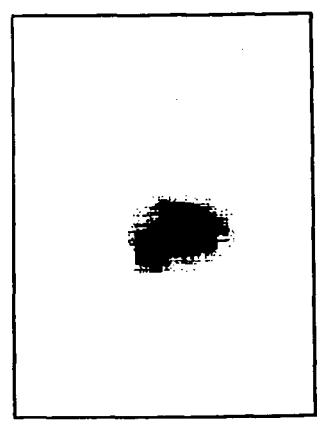
FIG. 22 shows an image formed by binarizing the image of FIG. 20.

As opposed to this, FIG. 20 shows the difference image in which the difference is taken between the frames by the inter-frame difference processing circuit 82, and FIG. 21 displays a gradation value of FIG. 20 in a three-dimensional graph. There is a feature in that the shadow grows radically dark at the moment when the finger contacts the screen. Accordingly, the difference value at this moment becomes the minimum. FIG. 22 shows an image obtained by binarizing the image of FIG. 20 by the predetermined threshold value. The variations and gradient of the gradation value are compensated by taking the difference. Accordingly, the contact portion and non-contact portion of the finger are clearly distinguished from each other, and it is understood that the contact region of the finger is extracted accurately.

Figure 23:
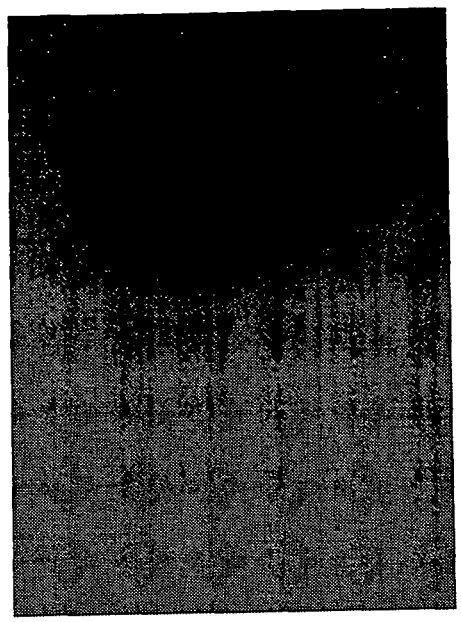
FIG. 23 shows a multi-gradation image immediately before the finger contacts the screen under a light environment.
Figure 24:
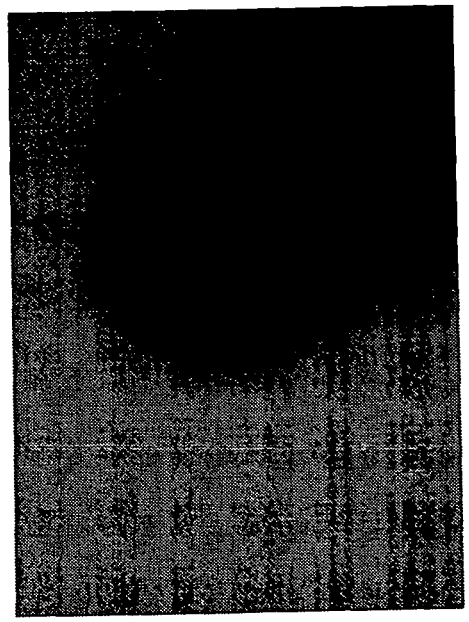
FIG. 24 shows a multi-gradation image at a moment when the finger contacts the screen under the light environment.
Figure 25:
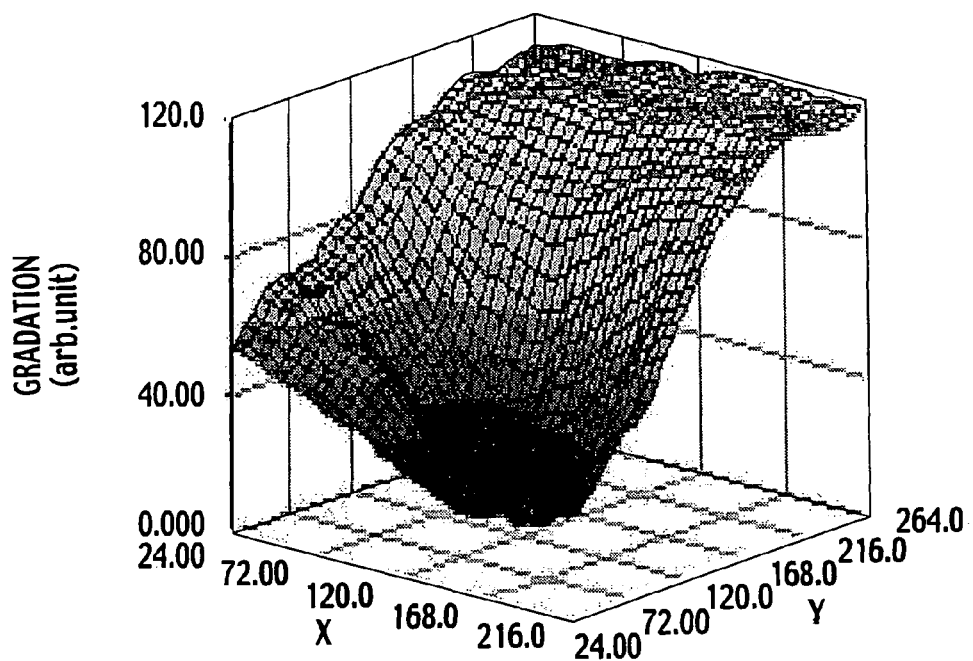
FIG. 25 is a three-dimensional graph showing gradation values of the image of FIG. 23.
Figure 26:
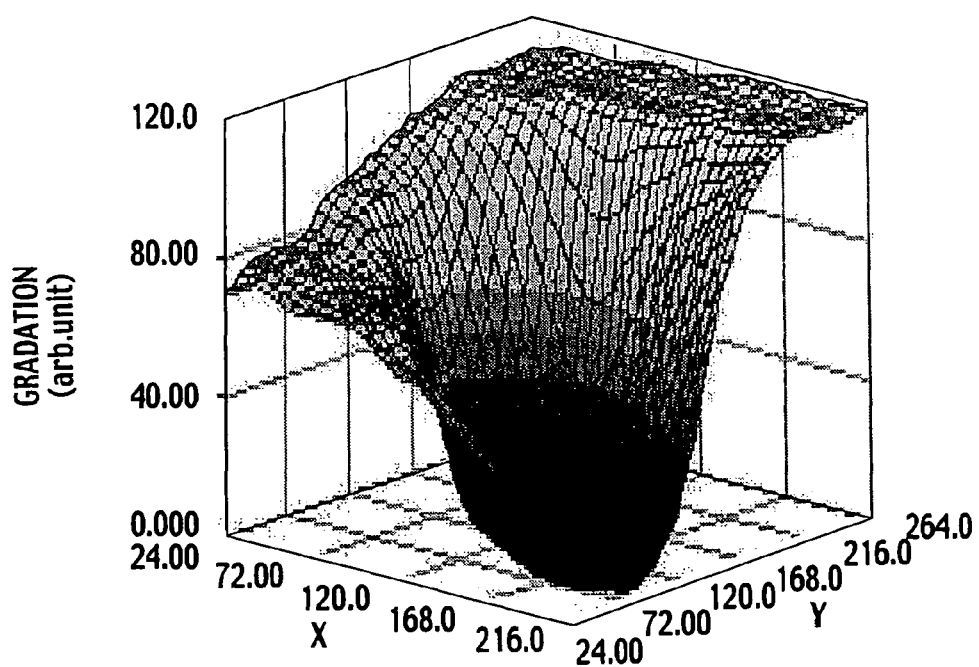
FIG. 26 is a three-dimensional graph showing gradation values of the image of FIG. 24.

FIG. 23 and FIG. 24 show examples of multi-gradation images obtained as the outputs of the modulation circuit 81 when the tip of the finger acts to touch the vicinity of the center of the screen under a light environment with illumination of several thousands lux. FIG. 23 shows an image of two frames before a moment when the finger contacts the screen, and FIG. 24 shows an image at the moment when the finger contacts the screen. FIG. 25 and FIG. 26 display distributions of gradation values in the respective images of FIG. 23 and FIG. 24 on three-dimensional graphs.

Figure 27:
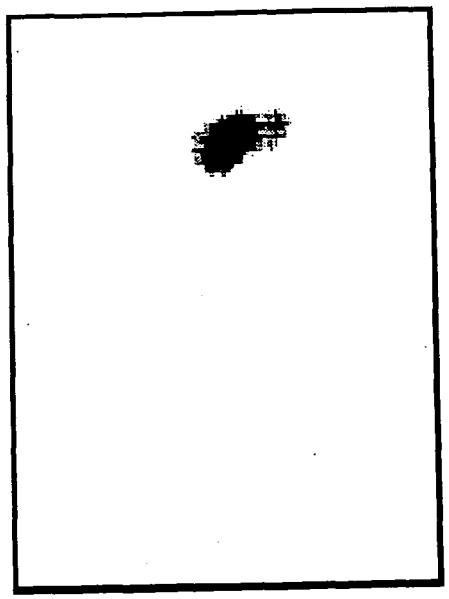
FIG. 27 shows an image formed by binarizing the image of FIG. 23.
Figure 28:
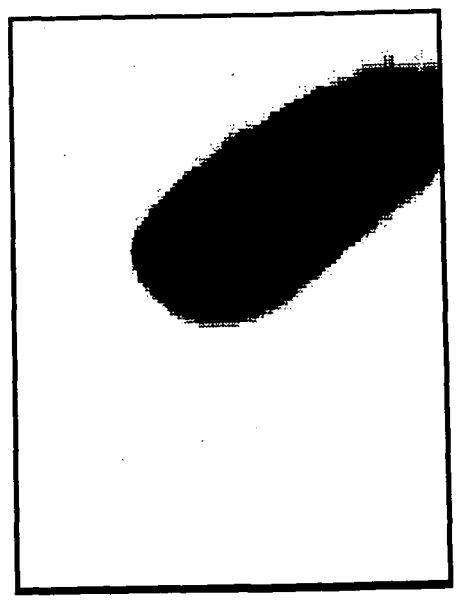
FIG. 28 shows an image formed by binarizing the image of FIG. 24.

FIG. 27 and FIG. 28 individually show images when the images of FIG. 23 and FIG. 24 are binarized by the predetermined threshold value. In FIG. 27, the contact region is erroneously detected though the finger does not contact the region concerned. In FIG. 28, though the tip of the finger touches only the vicinity of the center of the screen, an extended region towards the root of the finger is erroneously detected as the contact region. These also show that it is necessary to strictly set the threshold value. However, when the surrounding environment becomes lighter, it becomes more difficult to set the threshold value, because the shadow image is black and tends to be depressed in shape due to a narrow dynamic range of the optical sensor.

Figure 29:
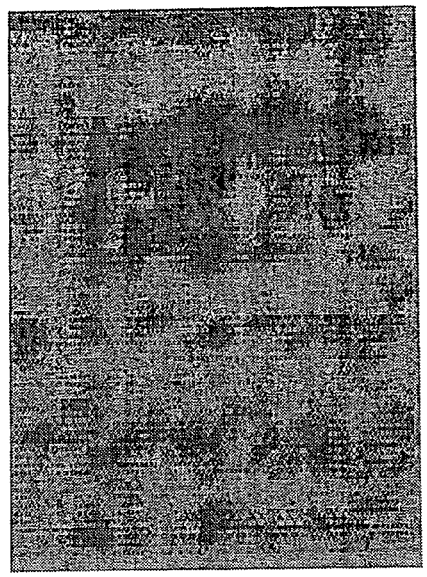
FIG. 29 shows an image formed by detecting an edge of the image of FIG. 23.
Figure 30:
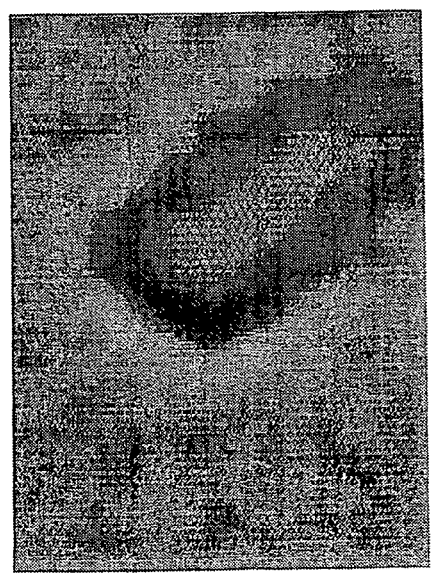
FIG. 30 shows an image formed by detecting an edge of the image of FIG. 24.
Figure 31:
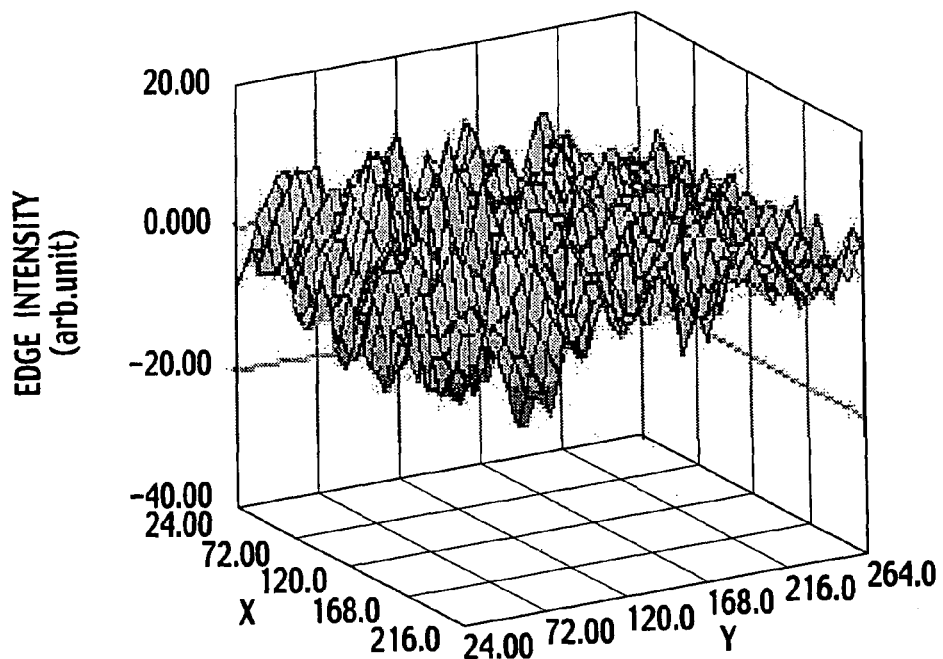
FIG. 31 is a three-dimensional graph showing edge intensity in the edge image of FIG. 29.
Figure 32:
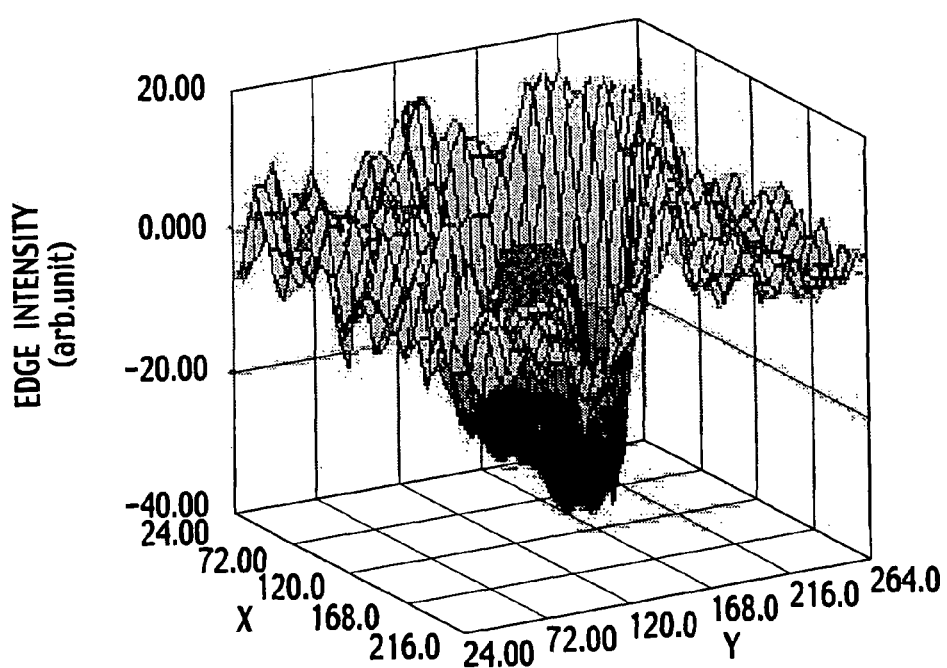
FIG. 32 is a three-dimensional graph showing edge intensity in the edge image of FIG. 30.
Figure 33:
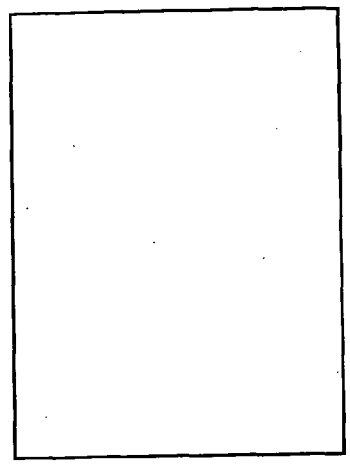
FIG. 33 shows an image formed by binarizing the edge image of FIG. 29.
Figure 34:
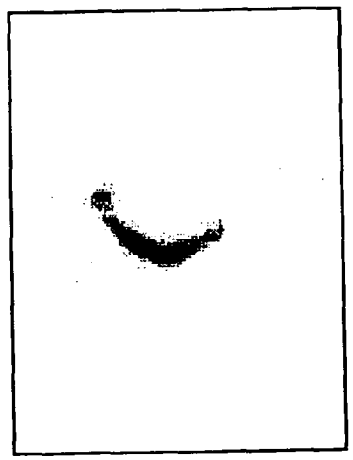
FIG. 34 shows an image formed by binarizing the edge image of FIG. 30.

As opposed to this, FIG. 29 and FIG. 30 show images obtained by detecting edges from the images of FIG. 23 and FIG. 24 by the edge detection circuit 84, respectively. Here, the Laplacian filter is used. FIG. 31 and FIG. 32 individually display edge intensities in the respective images of FIG. 29 and FIG. 30 on three-dimensional graphs. There is a feature in that a boundary between a shadow and environmental light becomes apparent when the finger touches the screen while the boundary becomes blurred owing to diffraction of the light when the finger does not touch the screen. Accordingly, in FIG. 32, a larger peak than that of FIG. 31 is observed. This point is advantageous in terms of detecting the contact region of the finger. FIG. 33 and FIG. 34 show images obtained by individually binarizing the images of FIG. 29 and FIG. 30 by the predetermined threshold value. Seeing the binary image of FIG. 34, it is understood that a portion touched by the finger tip is extracted accurately.

As described above, according to this embodiment, the area of the contact portion is increased when the object has contacted the screen. Accordingly, the edge is detected by the edge detection circuit 84, the region showing the object is extracted from the edge image by the contact determination circuit 85, and it is determined that the object has contacted the screen when the area of the region concerned has reaches the predetermined threshold value or more, thus making it possible to enhance the accuracy of the contact determination.

According to this embodiment, when the contact of the object is detected, the center of gravity of the region in the edge image, where the area has reached the predetermined threshold value or more, is calculated as the position coordinate of the object, thus making it possible to enhance the calculation accuracy of the coordinate position.

According to this embodiment, the temporal change occurs in the imaged image when the object has contacted the screen.

Accordingly, the difference image between the multi-gradation image of the current frame and the multi-gradation image of the past frame is obtained by the inter-frame difference processing circuit 82, the boundary between the contact portion and the non-contact portion is thus identified based on the temporal change of the imaged image, and the boundary is utilized for the contact determination, thus making it possible to enhance the accuracy of the contact determination.

According to this embodiment, the area of the contact portion is increased when the object has contacted the screen. Accordingly, the region showing the object is extracted by the coordinate calculation circuit 86 by using the difference image, and when the area of the region concerned has reached the predetermined threshold value or more, it is determined that the object has contacted the screen, thus making it possible to enhance the accuracy of the contact determination.

According to this embodiment, when the contact of the object is detected, the gravity of center of the region in the difference image, where the area has reached the predetermined threshold value or more, is calculated as the position coordinate of the object by the coordinate calculation circuit 86, thus making it possible to enhance the calculation accuracy of the coordinate position.

According to this embodiment, the accuracy of the contact determination and the coordinate calculation under the dark environment can be enhanced by the inter-frame difference processing, and the accuracy of the contact determination and the coordinate calculation under the light environment can be enhanced by the edge detection processing.

Moreover, intensity of the environmental light can be grasped from the multi-gradation image outputted by the modulation circuit 81, and accordingly, the multi-gradation image is always monitored, and by the contact determination circuit 85, the inter-frame difference processing and the edge detection processing may be automatically switched between the case where the environmental light is dark and the case where the environmental light is light based on the gradation value of the multi-gradation image. For a calculation of the coordinate position in this case, similar processing to the above can be applied.

For example, there is also considered fuzzy processing, in which the result of the contact determination and the result of the coordinate calculation by the difference image are defined to be more probable under the dark environment, and the result of the contact determination and the result of the coordinate calculation by the edge image are defined to be more probable under the light environment.

Third Embodiment

Also in this embodiment, only a configuration of the sensing IC is different from that in the first embodiment, and a basic configuration of the display device is similar to that in the first embodiment. Accordingly, only the sensing IC is described here, and a duplicate description of other portions similar to those of the first embodiment is omitted.

Figure 35:
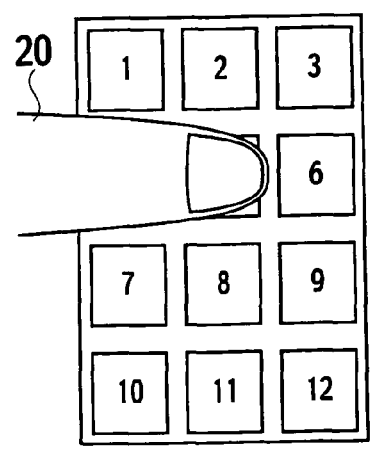
FIG. 35 shows an image pattern displayed on a screen by a display device of a third embodiment.

In the display device of this embodiment, as shown in FIG. 35, it is assumed that first to twelfth switches are displayed on the screen and that it is determined which of the switches a finger 20 has touched.

Figure 36:
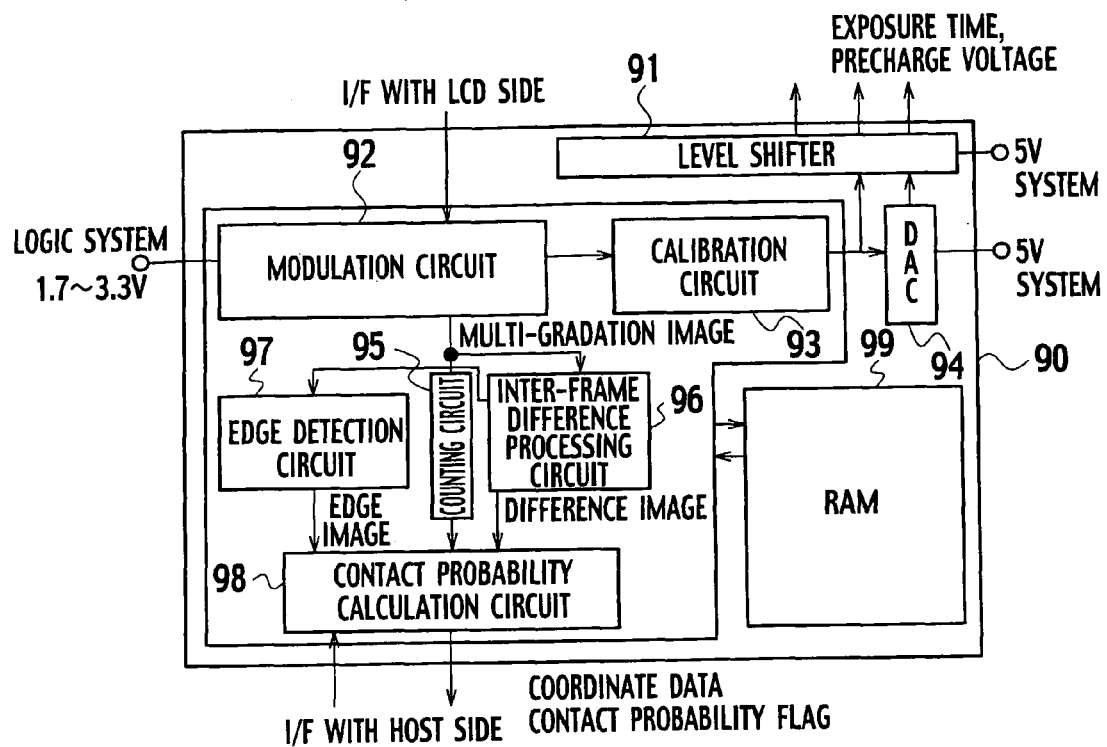
FIG. 36 is a circuit block diagram showing a configuration of a sensing IC in the display device of the third embodiment.

FIG. 36 is a circuit block diagram showing a configuration of a sensing IC 90 in this embodiment. The sensing IC 90 in this drawing includes a level shifter 91, a modulation circuit 92, a calibration circuit 93, a digital analog converter (DAC) 94, a counting circuit 95, an inter-frame difference processing circuit 96, an edge detection circuit 97, a contact probability calculation circuit 98, and a random access memory (RAM) 99.

The level shifter 91 is basically similar to the level shifter 61 described by using FIG. 6.

The modulation circuit 92 converts, into the multi-gradation image, the binary image transmitted from the comparator 41 described by using FIG. 4. A technique of this conversion is similar to that in the modulation circuit 81 of FIG. 10.

Figure 37:
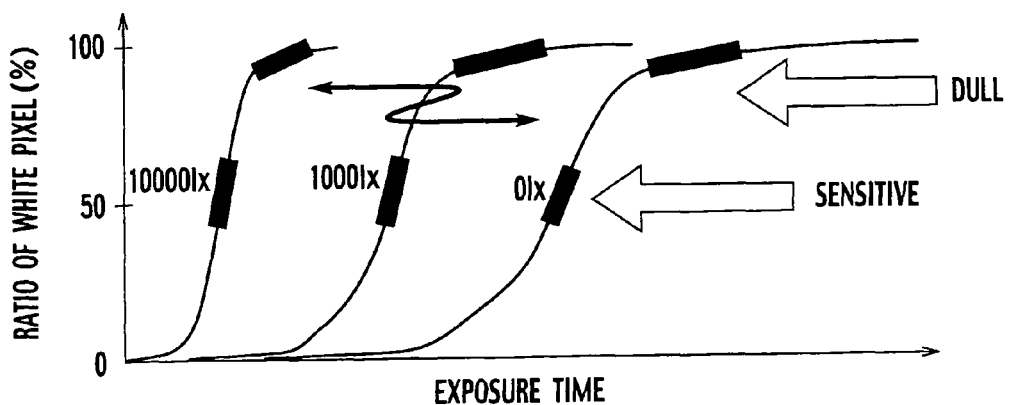
FIG. 37 is a graph showing a relationship between a ratio of white pixels and an exposure time.

The calibration circuit 93 counts the number of white pixels in the imaged image, and outputs a control signal so that 30 to 70% of the entire pixels can be white. The DAC 94 and the level shifter 91, which have receive the control signal, adjust the exposure time and the precharge time. Specifically, when the number of outputted white pixels is increased to 70%, the exposure time is shortened, or the precharge voltage is raised, and the number of white pixels is thus returned to approximately 50%. Meanwhile, when the number of outputted white pixels is decreased to 30%, the exposure time is lengthened, or the precharge voltage is dropped, and the number of white pixels is thus returned to approximately 50%. As described above, the number of white pixels is set within 30 to 70% of the entire pixels, and as shown in FIG. 37, a response of the optical sensor can be thus made sensitive.

Figure 38:
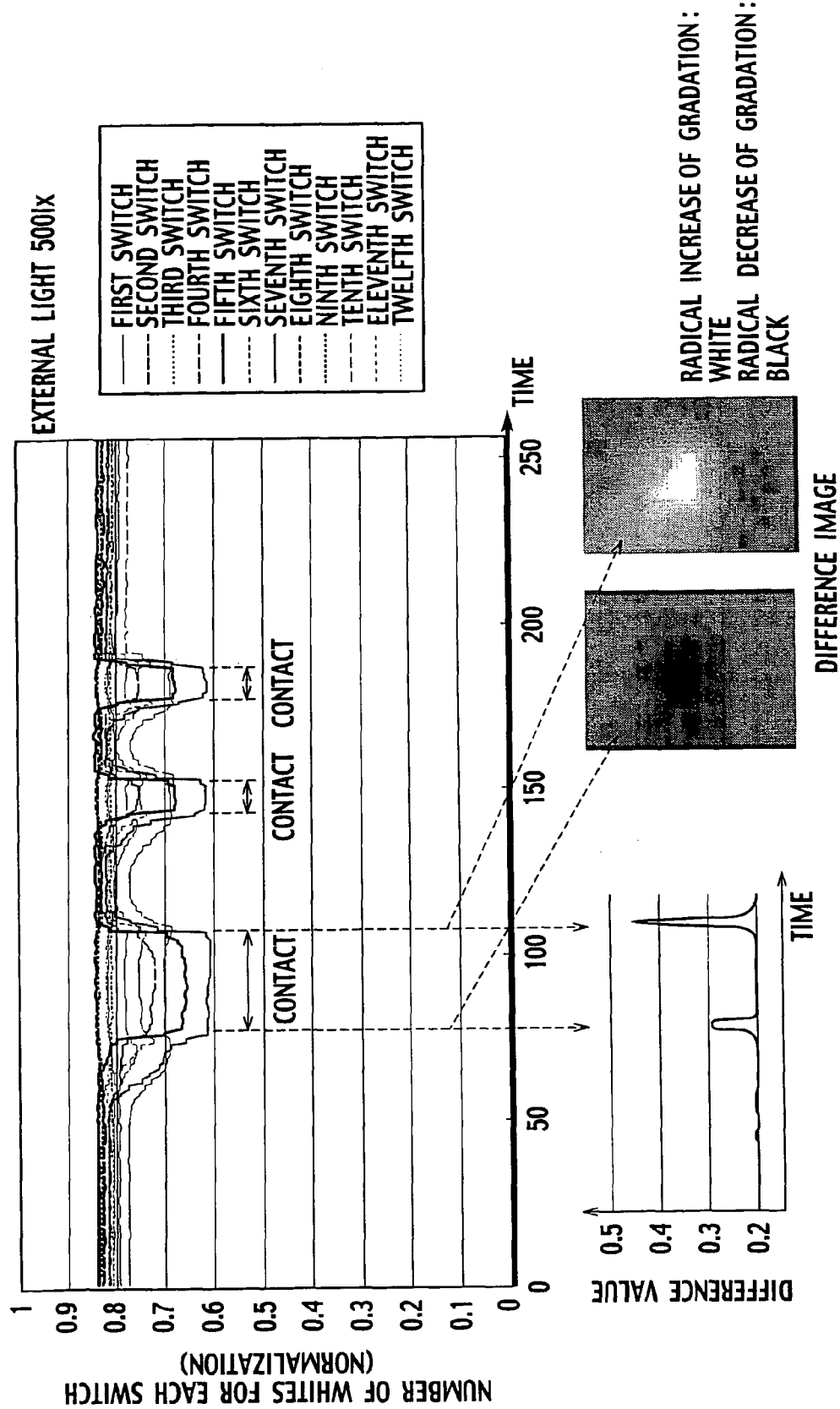
FIG. 38 is views summarizing features of changes with time of the number of white pixels for each switch.

The counting circuit 95 counts the number of white pixels for each switch displayed on the screen, and holds a counted value for each switch. Moreover, the counting circuit 95 calculates and holds a difference value between a counted value in a current n-th frame and a counted value in an n-1-th frame in the past. When the maximum one of the difference values in the respective switches has reached a predetermined threshold value, the counting circuit 95 outputs a signal indicating the effect that the finger has contacted the switch concerned, as a candidate for probability calculation. As shown in FIG. 38, when the finger has contacted a specific switch (a fifth switch in this drawing), though gradation changes between the images to be subjected to the difference calculation also occur in the other switches in an interlocking manner, the gradation variation becomes the most radical in the switch actually contacted by the finger. Accordingly, the above-described maximum difference value is set to be subjected to the determination, thus enhancing the accuracy of the determination. The output signal of the counting circuit 95 is sent to the contact probability calculation circuit 98.

The inter-frame difference processing circuit 96 obtains a difference image obtained by taking a difference between a multi-gradation image in the current frame and a multi-gradation image in the past frame, which is stored in the RAM 99, binarizes the difference image to extract a region showing the object, calculates a center of gravity of the region, and outputs a signal indicating the effect that the finger has contacted the switch located on the center of gravity, as the candidate for the probability calculation. A technique of deriving the difference image is similar to that of the second embodiment.

The edge detection circuit 97 calculates intensity (a magnitude of the spatial change of the gradation) of the edge for the multi-gradation image of each frame, calculates a center of gravity of the edge in which the gradation value is the predetermined threshold value or more, and outputs a signal indicating the effect that the finger has contacted the switch located at the center of gravity concerned, as the candidate for the probability calculation. A technique of calculating the edge is similar to that of the second embodiment. Moreover, it is also effective to prestore the multi-gradation image at the time of calibration completion in the memory, and to detect the edge from a multi-gradation image newly obtained by subtracting the prestored multi-gradation image from the newest multi-gradation image. This is because, in such a way, imaging unevenness caused by the characteristic variations of the sensor can be counteracted, and only the edge really formed by the finger can be cut out.

The contact probability calculation circuit 98 calculates a contact probability for each switch based on the signals individually outputted from the counting circuit 95, the inter-frame difference processing circuit 96, and the edge detection circuit 97. For example, 10 points are given to each of the switches determined by the respective circuits 95, 96 and 97 to be contacted by the finger, and points to be given to the other switches are set at 0. As an example, when the contact probability calculation circuit 98 receives a signal, which is to the effect that there is a high possibility that the finger has contacted the fifth switch, from each of the circuits 95, 96 and 97, the fifth switch acquires 30 points in total, and other switches acquire 0 point. Accordingly, the contact probability of the fifth switch is calculated as 30/30×100(%)=100%, and the contact probability of the other switches is calculated as 0/30×100(%)=0%. As another example, when the contact probability calculation circuit 98 receives a signal, which is to the effect that the finger has contacted the fifth switch, from each of the circuits 95 and 96, and the contact probability calculation circuit 98 receives a signal, which is to the effect that the finger has contacted the sixth switch, from the circuit 97, the fifth switch acquires 20 points in total, the sixth switch acquires 10 points, and the other switches acquire 0 point. Accordingly, the contact probabilities are calculated as: 67% for the fifth switch; 33% for the sixth switch; and 0% for the other switches.

Then, when a setting is made so that the host-side CPU receiving the output of the contact probability calculation circuit 98 can determine that the finger has contacted the screen only when the contact probability is 100%, a system in which the accuracy of the contact determination is extremely high can be realized. Meanwhile, when the setting is made so that the host-side CPU can determine that the finger has contacted the screen even when the contact probability is 67%, a system having good responsiveness can be realized. The former one can be applied to an application of a bank ATM, for which reliability is required. The latter one can be applied to an application of a game and the like, for which the reliability is not required very much.

As described above, according to this embodiment, the signals indicating that the object has contacted the switch are outputted from the counting circuit 95, the inter-frame difference circuit 96, and the edge detection circuit 97 by the techniques different from each other, and the contact probability is calculated for each switch based on the signals by the contact probability calculation circuit 98, thus making it possible to provide a highly reliable contact probability for each switch. Accordingly, highly accurate and flexible contact determination and coordinate calculation in response to the reliability required for the system can be enabled.

According to this embodiment, the calibration circuit 93 outputs the control signal which controls the operation of the optical sensor so that the number of white pixels can be 30 to 70% of the entire pixels. In such a way, the response of the optical sensor can be made sensitive, which can contribute to the highly accurate contact determination and coordinate calculation. The calibration circuit 93 can also be applied to the first embodiment and the second embodiment in a similar way.

Note that, in the respective embodiments described above, descriptions have been made by taking as an example the case where the human finger has contacted the screen; however, the present invention is not limited to this. As the object which contacts the screen, a light pen with a light source such as an LED added thereto may be used, or a while mascot may be used. Alternatively, a metal piece having a metallic mirror surface, or a pencil sack may be used.

Fourth Embodiment

A basic configuration of a display device in this embodiment is similar to that of the first embodiment, and moreover, a basic configuration of the sensing IC is similar to that described by using FIG. 10 in the second embodiment; however, internal configurations of the contact determination circuit 85 and the coordinate calculation circuit 86 and processing performed thereby are different from those of the second embodiment. Accordingly, a description is made of only these points here, and a duplicate description of other portions similar to those of the first and second embodiments is omitted.

Figure 39:
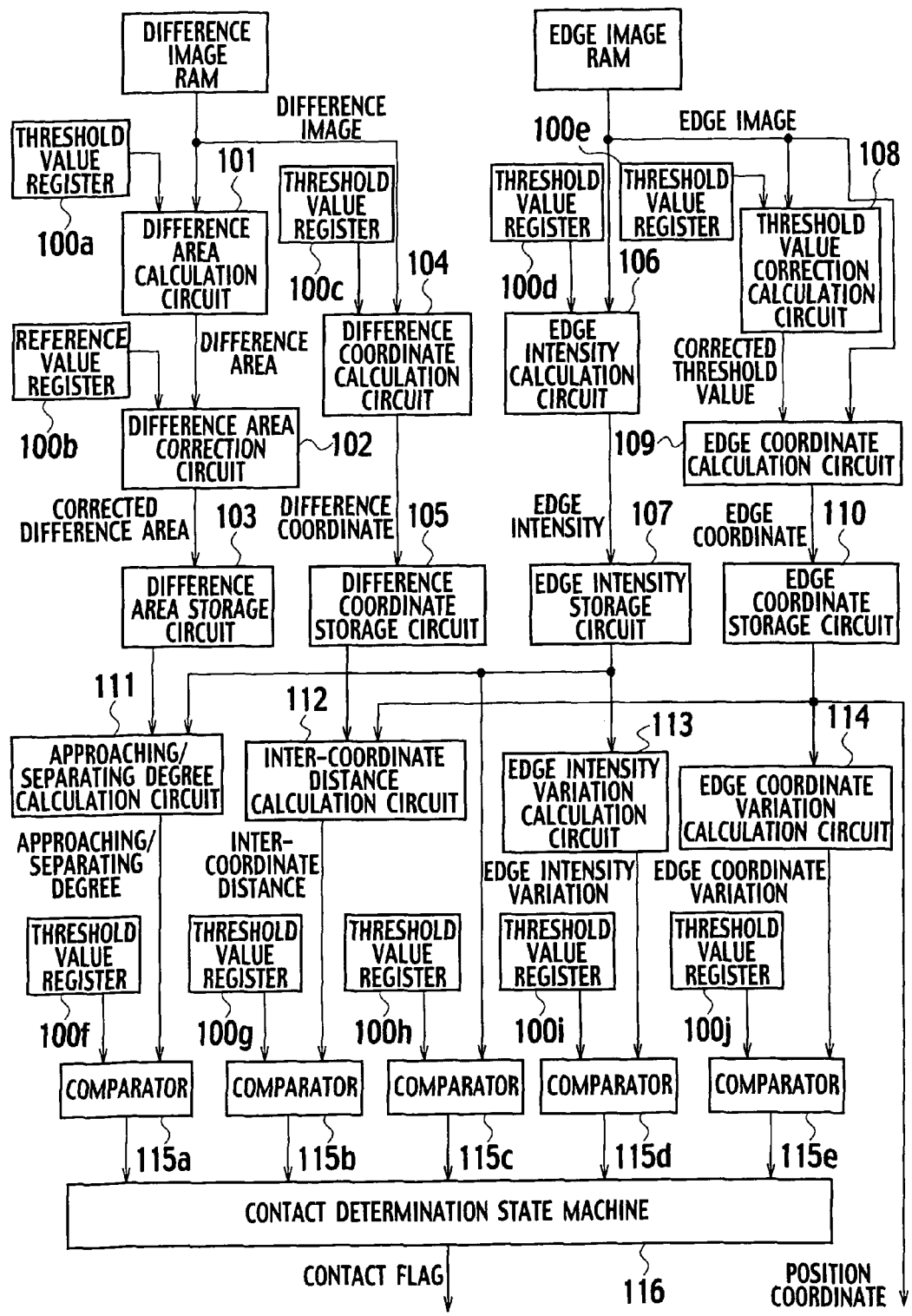
FIG. 39 shows a configuration for calculating a contact flag and coordinate data and a flow of arithmetic processing by using the difference image and the edge image by a contact determination circuit and a coordinate calculation circuit.

FIG. 39 shows a configuration and a flow of arithmetic processing for calculating a contact flag and coordinate data by using the difference image and the edge image by the contact determination circuit 85 and the coordinate calculation circuit 86. Arithmetic operations of the contact flag and the coordinate data may be performed in parallel by dedicated ASICs, or may be sequentially performed by using the CPU, the DSP, and the like.

In this embodiment, the contact determination circuit 85 is configured to include a difference area calculation circuit 101, a difference area correction circuit 102, a difference area storage circuit 103, a difference coordinate calculation circuit 104, a difference coordinate storage circuit 105, an edge intensity calculation circuit 106, an edge intensity storage circuit 107, an approaching/separating degree calculation circuit 111, an inter-coordinate distance calculation circuit 112, an edge intensity variation calculation circuit 113, an edge coordinate variation calculation circuit 114, comparators 115*a* to 115*e*, and a contact determination state machine 116.

The coordinate calculation circuit 86 is configured to include a threshold value correction calculation circuit 108, an edge coordinate calculation circuit 109, and an edge coordinate storage circuit 110. Registers 100*a* to 100*j* are ones for storing various threshold values and reference values.

The difference area calculation circuit 101 counts the total number of pixels in which the gradation values of the difference images are larger or smaller than the predetermined threshold value, and outputs a result thereof as a difference area. This corresponds to that, when a change occurs in the imaged image owing to a motion of the finger, the light pen, and the like, an area of a region thereof is obtained. For example, in the case of the finger, when the finger approaches the panel, the finger cuts off the ambient environmental light, and accordingly, a portion corresponding thereto grows dark, and the difference image frequently has a negative value. Hence, by appropriately setting the threshold value for use in the difference area calculation circuit 101, the area of the portion approached by the finger can be calculated.

Note that, instead of the difference area calculation circuit 101, a circuit may also be used, which calculates a weight coefficient depending on the gradation value and the threshold value for each of the pixels in which the gradation values of the difference images are larger or smaller than the predetermined threshold value, and accumulates the weight coefficient. For example, it is desirable to use, as the weight coefficient, one proportional to the difference between the gradation value and the threshold value. As a matter of course, the difference itself between the gradation value and the threshold value may be used. In this case, an outputted accumulation value becomes an amount depending on a size of the moved portion and a speed of the motion. However, the difference area calculation circuit 101 is employed here.

For example, when the ambient environmental light is radically changed at such a moment when the display device goes to the outdoors from the indoors, the difference area calculation circuit 101 outputs a large difference area value. Accordingly, in order to distinguish the above-described difference area value from the motion of the object to be recognized, such as the finger, it is necessary to correct the difference area.

Figure 40:
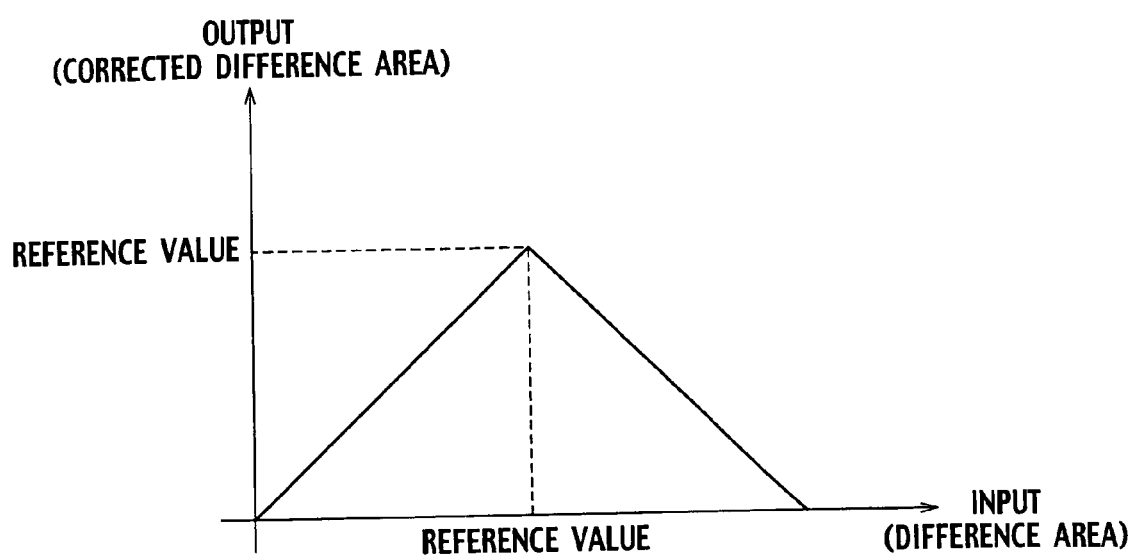
FIG. 40 is a graph showing a relationship between an input and an output in a difference area correction circuit.

The difference area correction circuit 102 is a circuit for the above-described purpose, which presets a reference value of the area of the object to be recognized, and when the difference area exceeds the reference value, corrects the difference area to a value smaller than an original value thereof. As a technique of the correction, for example as shown in FIG. 40, when the inputted difference area exceeds the reference value, the difference area correction circuit 102 performs an arithmetic operation so as to reduce the corrected difference area in proportion to a difference between the difference area and the reference value, and outputs a result of the arithmetic operation.

The corrected difference area values thus obtained are prestored over several frames in the difference area storage circuit 103, and are used for determining approaching/separation of the object concerned as described later. For the difference area storage circuit 103, for example, a shift register is used.

The difference coordinate calculation circuit 104 calculates an average value of the position coordinates of the pixels in which the gradation values of the difference images are larger or smaller than the predetermined threshold value, and outputs a difference coordinate as a result of the average value calculation. The difference coordinate has a value representing a coordinate of a center of the difference of the image, for example, when the difference concerned occurs owing to the approaching of the finger. A plurality of the difference coordinates are stored over several frames in the difference coordinate storage circuit in this drawing, and are used for the contact determination as described later.

Moreover, in the difference coordinate calculation circuit 104, instead of the above-described technique, the position coordinates may be obtained by center-of-gravity calculation using the weight coefficients depending on the difference between the gradation values and the predetermined threshold value, for the pixels in which the gradation values of the difference images are larger or smaller than the predetermined threshold value. This corresponds to weighted average calculation by weight coefficients of position coordinates along the scan line and the signal line. In this case, it is desirable that the weight coefficients be proportional to the differences between the gradation values and the threshold value.

The edge intensity detection circuit 106 is a circuit which accumulates the differences between the gradation values and the threshold value, for the pixels in which the gradation values of the edge images are larger or smaller than the predetermined threshold value. The edge intensity detection circuit 106 outputs a value of the accumulation as the edge intensity. As the object such as the finger is approaching the panel, a gradation difference between the portion where the ambient environmental light is cut off by the object and the periphery thereof is increased. Specifically, an absolute value of the gradation value of the edge image is increased. Moreover, when the finger is in contact with the panel, the area of the portion contacted by the finger differs depending on a manner of pressing the finger to the panel, and accordingly, an area where the absolute value of the gradation value of the edge image is increased is also changed. Hence, the edge intensity serves as an index indicating a distance between the object such as the finger and the panel or a size of the contact region of the object and the panel. A plurality of the edge intensities are stored over several frames in the edge intensity storage circuit 107, and are used for the contact determination as described later.

In the edge intensity calculation circuit 106, the differences between the gradation values and the threshold value are accumulated as they are for the pixels exceeding the threshold value; however, weight coefficients determined by the differences between the gradation values and the threshold value may also be accumulated. As the weight coefficients, for example, ones proportional to the differences between the gradation values and the threshold value are used. Moreover, the total number of pixels in which the gradation values are larger or smaller than the predetermined threshold value is counted, and a result thereof may be outputted as the edge intensity. However, here, the differences between the gradation values and the threshold value are accumulated as they are.

The edge coordinate calculation circuit 109 calculates center-of-gravity coordinates by using the weight coefficients depending on the differences between the gradation values and the threshold value for the pixels in which the gradation values of the edge image are larger or smaller than a certain threshold value, and outputs a result thereof as an edge coordinate. The edge coordinate represents a center coordinate of the region touched by, for example, the object to be recognized, such as the finger. A plurality of the edge coordinates are stored over several frames in the edge coordinate storage circuit 110, and are used for the contact determination as described later, and in addition, are also outputted as the position coordinate finally.

As the weight coefficients for use in calculating the centers of gravity, it is desirable to use values proportional to the differences between the gradation value and the threshold value. Alternatively, the differences themselves between the gradation values and the threshold value may be used, or the weight coefficients may be set at 1 irrespective of the differences between the gradation values and the threshold value. However, the differences themselves between the gradation values and the threshold value are uses as the weight coefficients here.

Moreover, instead of the above-described technique, the edge coordinate calculation circuit 109 may calculate an average value of the position coordinates of the pixels in which the gradation values of the edge images are larger or smaller than the predetermined threshold value, and may output a result thereof as an edge coordinate.

Figure 41:
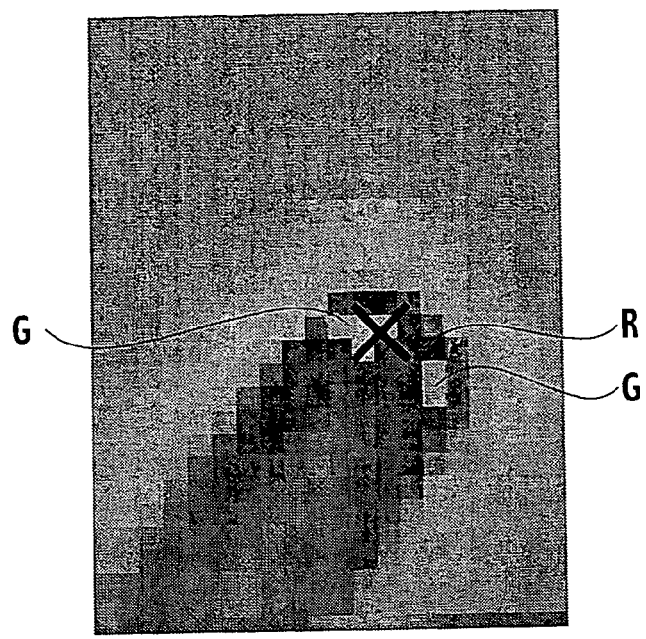
FIG. 41 is a view showing the edge image when environmental light is dark.
Figure 42:
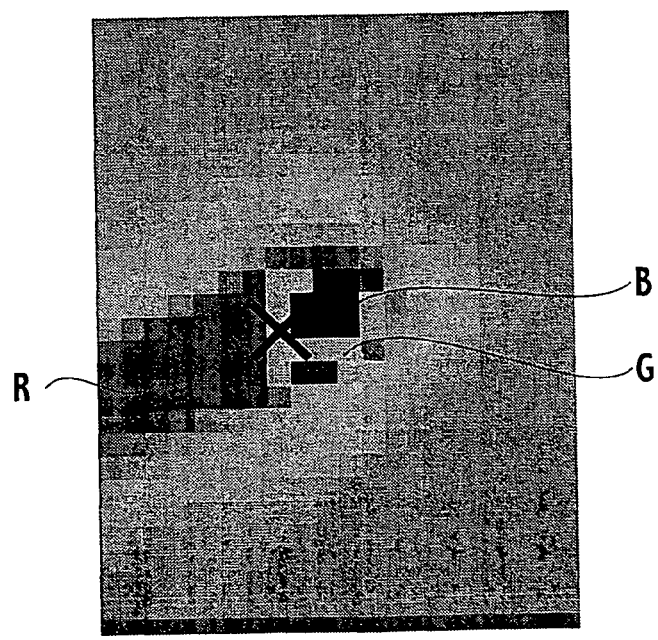
FIG. 42 is a view showing the edge image when the environmental light is light.

In order to further enhance the accuracy of the position coordinate, it is effective to perform processing for dynamically changing the threshold value for the edge image depending on a distribution of the gradation values of the edge images by the threshold value correction calculation circuit 108. This is because a difference in gradation is large between the case where the environmental light is dark and the case where the environmental light is light. FIG. 41 shows an edge image in the case where the environmental light is dark as in the indoors, and FIG. 42 shows an edge image in the case where the environmental light is light. In these drawings, reference symbols R denote pixels with gradation values of 88 to 69, reference symbols G denote pixels with gradation values of 68 to 49, and reference symbols B denote pixels with gradation values of 48 or less. As shown in FIG. 41, when the environmental light is dark, a difference in gradation between a portion which shades the environmental light and a portion which does not shade the environmental light in the image is not very large. However, as shown in FIG. 42, when the environmental light is very light as in the outdoors on a sunny day, the difference in gradation is increased to a very large extent. As described above, the gradation of the edge image is changed in magnitude depending on the ambient environmental light. Accordingly, when the threshold value is fixed, there is a possibility that the edge coordinate is largely diverted from the portion actually contacted by the object. Therefore, for example, the maximum value or the minimum value in the frequency distribution of the gradation values is obtained in advance by scanning the edge image once, and a correction is performed so that an average value between the maximum value or the minimum value and the preset threshold value can be taken as a new threshold value. By this correction, it is made possible to calculate an accurate position coordinate corresponding to the contact portion.

The approaching/separating degree calculation circuit 111 calculates a value called an approaching/separating degree indicating an approaching degree/separating degree of the object to be recognized, such as the finger, by using the difference area values and the edge intensity values, which are held for the plural frames in the past. Specifically, the approaching/separating degree is defined as a value obtained by multiplying two values: a first value being obtained by subtracting edge intensity of a predetermined frame before from the current edge intensity of a certain frame; and a second value being the current difference area. For example, a value obtained by subtracting edge intensity of two frames before from edge intensity in the current frame is multiplied by the difference area in the current frame, and a value thus obtained is defined as the approaching/separating degree. Besides the above, for example, a value obtained by subtracting edge intensity of one frame before from the edge intensity in the current frame is multiplied by the difference area in the current frame, and a product thus obtained may be defined as the approaching/separating degree. Although it is desirable to use a corrected one as the difference area, a difference area that is not corrected is also applicable.

At a moment when the finger or the like approaches the panel, the edge intensity is increased as well as the value of the difference area is increased, and accordingly, the approaching/separating degree has a positive peak. Meanwhile, at a moment when the finger or the like separates from the panel, the edge intensity is decreased as well as the value of the difference area is increased, and accordingly, the approaching/separating degree has a negative peak. Hence, by comparing an appropriately set positive threshold value and the approaching/separating degree with each other, timing when the object to be recognized, such as the finger, approached the panel can be grasped. In a similar way, by comparing an appropriately set negative threshold value and the approaching/separating degree, timing when the object to be recognized, such as the finger, separated from the panel can be grasped. As shown in FIG. 39, results of these comparison arithmetic operations are inputted to the contact determination state machine 116, and can be used for a series of the contact determination as described later.

The edge intensity variation calculation circuit 113 calculates an edge intensity variation value serving as an index as to which extent the edge intensity was varied for several frames in the past. The edge intensity variation is defined as a difference between the maximum value and minimum value of the edge intensity values in the plural frames. For example, from edge intensity values in three frames in the past, the maximum value and minimum value thereof are obtained, and a value obtained by subtracting the minimum value from the maximum value is defined as the edge intensity variation. With regard to the number of frames, other more appropriate values in the past, such as four frames and five frames, can be selected in response to a frame rate in imaging and an assumed contact time of the finger or the like. Moreover, the edge intensity variation may be defined not as the difference between the maximum value and the minimum value but as an accumulated value itself of the edge intensities or by using a standard deviation.

During a period while the finger or the like is in surely contact with the panel and is standing still, the edge image becomes stable, and accordingly, the edge intensity variation becomes a small value. Hence, by comparing the edge intensity variation with an appropriately set threshold value, it can be determined that the object to be recognized, such as the finger, is in contact with the panel and is standing still. Such a result of the comparison arithmetic operation is inputted to the contact determination state machine 116 as shown in FIG. 39, and can be used for a series of the contact determination described later.

Moreover, the edge intensity value itself becomes an index of the distance between the object such as the finger and the panel or of the size of the contact region of the object and the panel as described above. Accordingly, by comparing the edge intensity value of the current frame with an appropriate threshold value, the contact/non-contact of the finger or the like can be determined. A result of the above-described comparison arithmetic operation is inputted to the contact determination state machine 116, and can be used for a series of the contact determination as described later.

The edge coordinate variation calculation circuit 114 calculates an edge coordinate variation value serving as an index as to what extent the edge coordinate was varied for several frames in the past. Specifically, the position coordinates represented as the edge coordinates are stored for plural frames in the edge coordinate storage circuit 110, and the edge coordinate variation calculation circuit 114 performs a comparison arithmetic operation of a difference between the maximum value and minimum value of the plural position coordinates with a predetermined threshold value. For example, from edge coordinates of four frames in the past, the maximum values and the minimum values are obtained separately for individual scan line direction coordinates and signal line direction coordinates, and the minimum values are subtracted from the maximum values. With regard to the number of frames, other more appropriate values in the past, such as three frames and five frames, can be selected in response to the frame rate in imaging and the assumed contact time of the finger or the like. Moreover, the edge coordinate variation may be defined not as the difference between the maximum values and the minimum values but by using the standard deviation and the like. During the period while the finger or the like is in surely contact with the panel and is standing still, the edge coordinate becomes stable, and accordingly, the edge coordinate variation becomes a small value. Hence, by comparing the edge coordinate variation with an appropriately set threshold value, it can be determined that the object to be recognized, such as the finger, is in contact with the panel and is standing still. Such a result of the comparison arithmetic operation is inputted to the contact determination state machine 116, and can be used for a series of the contact determination as described later.

The inter-coordinate distance calculation circuit 112 calculates a distance (an inter-coordinate distance) between the position coordinate obtained by using the difference image by the difference coordinate calculation circuit 104 and the position coordinate obtained by using the edge image by the edge coordinate calculation circuit 109. For example, the inter-coordinate distance calculation circuit 112 compares coordinates at three timing, that is, a difference coordinate at the moment when the object such as the finger approaches the panel, an edge coordinate at the moment when the object contacts the finger and stands still, and a difference coordinate at the moment when the object separates from the panel, thereby calculating the inter-coordinate distance such as a distance between a position approached by the object and a position from which the finger separates, and a distance between a position contacted by the object, where the object then stands still, and the position from which the object separates. The three timing can be grasped by the results of the comparison arithmetic operations described above for the approaching/separating degree, the edge intensity variations, and the like. Accordingly, if the difference coordinates and the edge coordinates at these times are temporarily stored, the calculation of the inter-coordinate distance is possible. For example, by comparing, with a predetermined threshold value, the inter-coordinate distance between the position approached by the finger and the position from which the finger separates, the inter-coordinate distance can be used for distinguishing whether an operation of the finger is a "click operation" in which the position pressed by the finger and the position from which the finger separates are the same or a "drag & drop operation" in which the pressed position and the position from which the finger separates are different from each other. A result of the comparison arithmetic operation is inputted to the contact determination state machine 116, and can be used for a series of the contact determination as described later. Note that, in FIG. 39, lines through which the results of the respective comparison arithmetic operations are inputted to the inter-coordinate distance calculation circuit 112 are omitted in order to avoid complicatedness of the drawing.

The contact determination state machine 116 receives the following as inputs: at least one of the results of the comparison arithmetic operation of the approaching/separating degrees, the result of the comparison arithmetic operation of the edge intensity variations, the result of the comparison arithmetic operation of the edge intensities, the result of the comparison arithmetic operation of the edge coordinate variations, and the result of the comparison arithmetic operation of the inter-coordinate distances; as well as a current state of frames, the number of frames which have appeared in the current state; and the number of time-out frames preset so as to correspond to each state, these of which are as described above. Then, the contact determination state machine 116 decides a state of the next frame. Moreover, the contact determination state machine 116 outputs the contact flag whether or not the object to be recognized, such as the finger, has contacted the panel based on the current frame state. Note that, in FIG. 39, since the drawing becomes complicated, lines indicating the inputs of the current frame state, the number of passed-by frames, the number of time-out frames, and the like are omitted.

Figure 43:
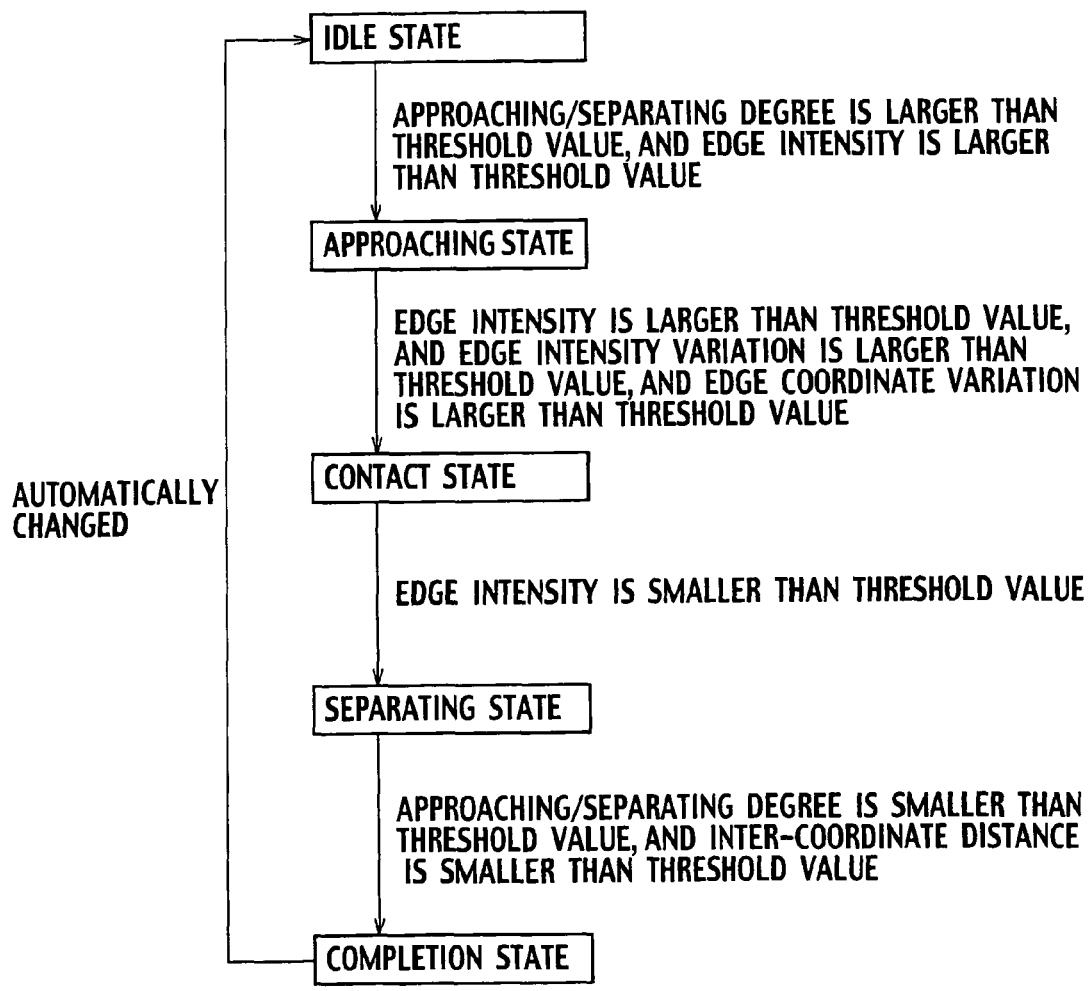
FIG. 43 is a view showing states in a contact determination state machine, transition paths thereof, and transition conditions.

FIG. 43 shows an example of transition states in the state machine 116, and of transition paths and conditions therebetween. However, in order to prevent complicatedness, FIG. 43 does not describe all the transition paths and conditions. Moreover, transition by the time out is also omitted. In the example of FIG. 43, it is determined that the object to be recognized, such as the finger, has contacted the panel for a "single-click" operation where, after touching a certain position on the panel once and standing still, the object separates from the panel at the same position. The state machine 116 displays a result of the contact determination by the respective states which are an approaching state, a contact state, a separating state, and a completion state.

The idle state is a standby state for the approaching of the finger. When the above-described approaching/separating degree is larger than the preset positive threshold value, and the edge intensity is larger than the threshold value, it is determined that the finger has approached the panel, and the transition state is changed to the approaching state. The approaching state is a standby state for touching of the finger or the like on the panel, followed by sure stabilization thereof.

When the edge intensity keeps on being larger than the threshold value, and the edge intensity variation and the edge coordinate variation become smaller than the individually set threshold values, it is determined that the finger or the like has surely touched the panel and has been stabilized, and the transition state is changed to the contact state. In the contact state, a start of the separation of the finger or the like is awaited.

When the edge intensity becomes smaller than the threshold value, it is determined that the finger or the like starts to separate from the panel, and the transition state is changed to the separating state. The separating state is a standby state for the complete separation of the finger. When the approaching/separating degree is smaller than the negative threshold value, and the inter-coordinate distance that is the distance between the coordinate when the finger approaches and the coordinate when the finger separates is smaller than the threshold value, it is determined that the "single click" is established, and the transition state is changed to the completion state. In the completion state, the contact determination flag is turned on, and the fact that a "single click" was performed and the position coordinate thereof are issued to the host-side CPU or the like. From the completion state, the transition state automatically returns to the idle state in response to a setting of the number of time-out frames.

Note that, besides the above-described state machine 116, a state machine which recognizes a "double-click" operation, state machines which recognize the "drag & drop" operation, an operation of "rubbing" the panel, and the like, may be used.

Fifth Embodiment

In this embodiment, a description is made of display illumination of the switches when the screen at the input, which has been described by using FIG. 35, is displayed in a software manner. Note that, since other configurations are similar to those of the respective embodiments described above, a duplicate description is omitted here.

Figure 44:
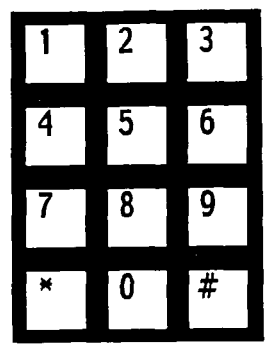
FIG. 44 is a view showing a screen displaying white switches on a black background.
Figure 45:
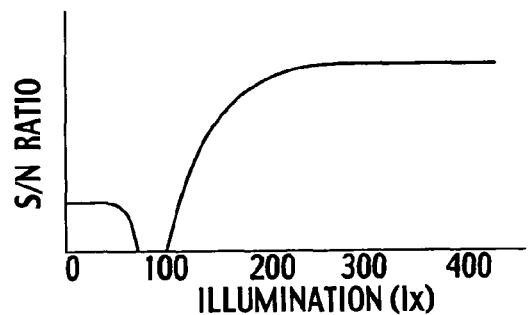
FIG. 45 is a graph showing a relationship between an S/N ratio and illumination with regard to the screen of FIG. 44.

FIG. 44 shows a state where twelve white switches are displayed on a black background, and numbers are displayed on the individual switches. An S/N ratio when each switch is pressed and not pressed, which is as described by using FIG. 38, is shown in FIG. 45. An axis of ordinates represents the S/N ratio, and an axis of abscissas represents illumination of the external light. Although no problem occurs when the illumination of the external light is high, there is a problem that the S/N ratio becomes small in the vicinity of 100 lux. A reason for this is as follows. Specifically, while a shadow (signal) is projected on the optical sensors belonging to each switch concerned in such a manner that the finger shades the external light, a component of reflected light formed by reflection of display light of the switch on the finger becomes relatively conspicuous with respect to the shadow (signal), and becomes noise reducing the shadow (signal). Note that, thought the S/N ratio becomes small in the vicinity of 100 lux, the S/N ratio rises toward 0 lux. This is because the external light becomes sufficiently small, the component of the reflected light caused by the reflection of the display light of the switch on the finger becomes a signal, the external light becomes noise against the signal, and the S/N ratio becomes good when the external light becomes sufficiently small.

Figure 46:
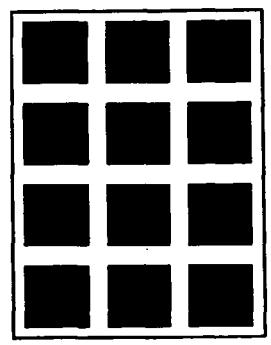
FIG. 46 is a view showing a screen displaying black switches on a white background.
Figure 47:
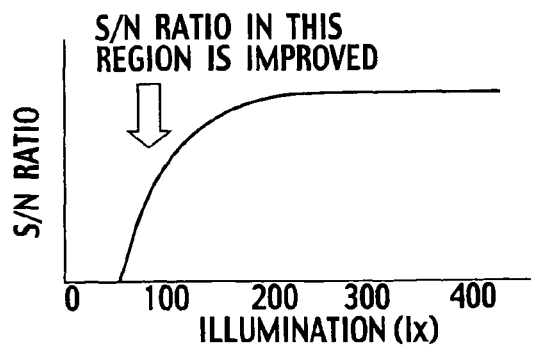
FIG. 47 is a graph showing a relationship between an S/N ratio and illumination with regard to the screen of FIG. 46.

Accordingly, as shown in FIG. 46, the switches are made black, and the background is made white. In such a way, it is possible to suppress the above-described phenomenon that the display light acting as the noise in the vicinity of the external light is reflected on the finger, and that the shadow incident onto the sensor is reduced. As shown in FIG. 47, the S/N ratio in the vicinity of 100 lux is improved. This is effective in an application that just needs to operate under the illumination of approximately 100 lux.

Figure 48:
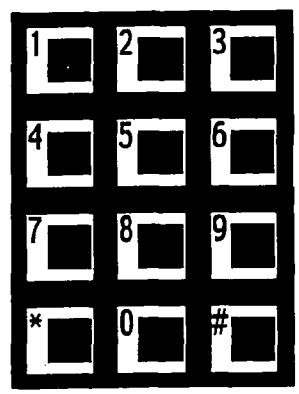
FIG. 48 shows a screen in which black regions are provided inside of the white switches of FIG. 44.
Figure 49:
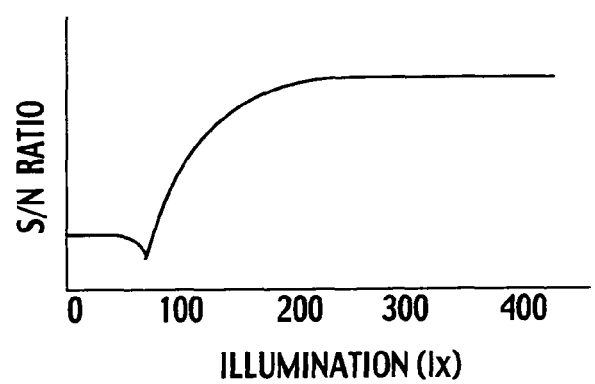
FIG. 49 is a graph showing a relationship between the S/N ratio and the illumination with regard to the screen of FIG. 48.

FIG. 48 shows an example where contrivance is further added to the display of the switches. In this screen, black regions are provided in the inside of the switches of FIG. 44. As compared with the case of FIG. 44, a ratio of the black portion is large, and accordingly, a range of reading the shadow caused by the external light is widened. At the same time, white portions are also provided appropriately, and accordingly, the S/N ratio can be ensured even in a dark place.

Figure 50:
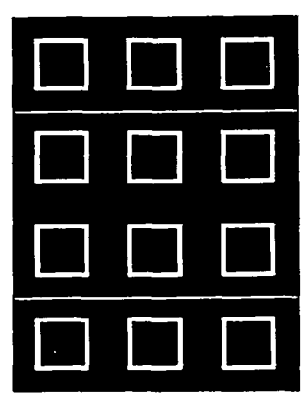
FIG. 50 shows another modification example of the screen of FIG. 44.
Figure 51:
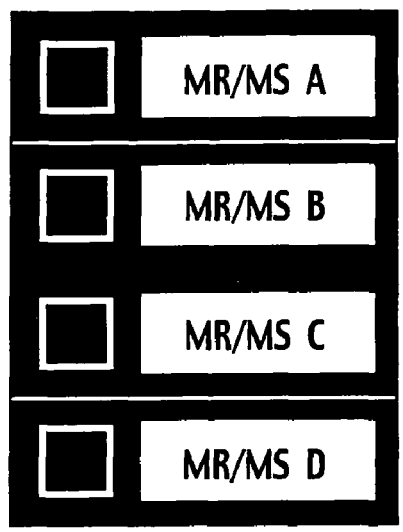
FIG. 51 shows still another modification example of the screen of FIG. 44.
Figure 52:
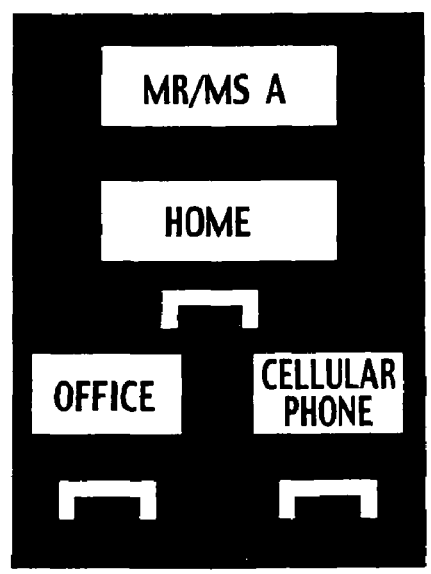
FIG. 52 shows yet another modification example of the screen of FIG. 44.

According to an experiment, even if the white portions are not made very large, the information can be read in the dark place with the illumination of approximately 0 lux. It is recommended that a black (low-brightness) area in the switches be 50% or more of the area of the switches. Modification examples are shown in FIG. 50, FIG. 51, and FIG. 52. By reducing white (high-brightness) portions, the portions touched by the finger are limited, and an effect of preventing an erroneous input is brought to a user. For the reason as described above, it is particularly effective to make the white (high-brightness) portions smaller than the black (low-brightness) portions.

Sixth Embodiment

In this embodiment, a description is made of a way of deciding the respective threshold values in the respective embodiments described above. Note that, since other configurations are similar to those of the respective embodiments described above, and a duplicate description is omitted here.

Figure 53:
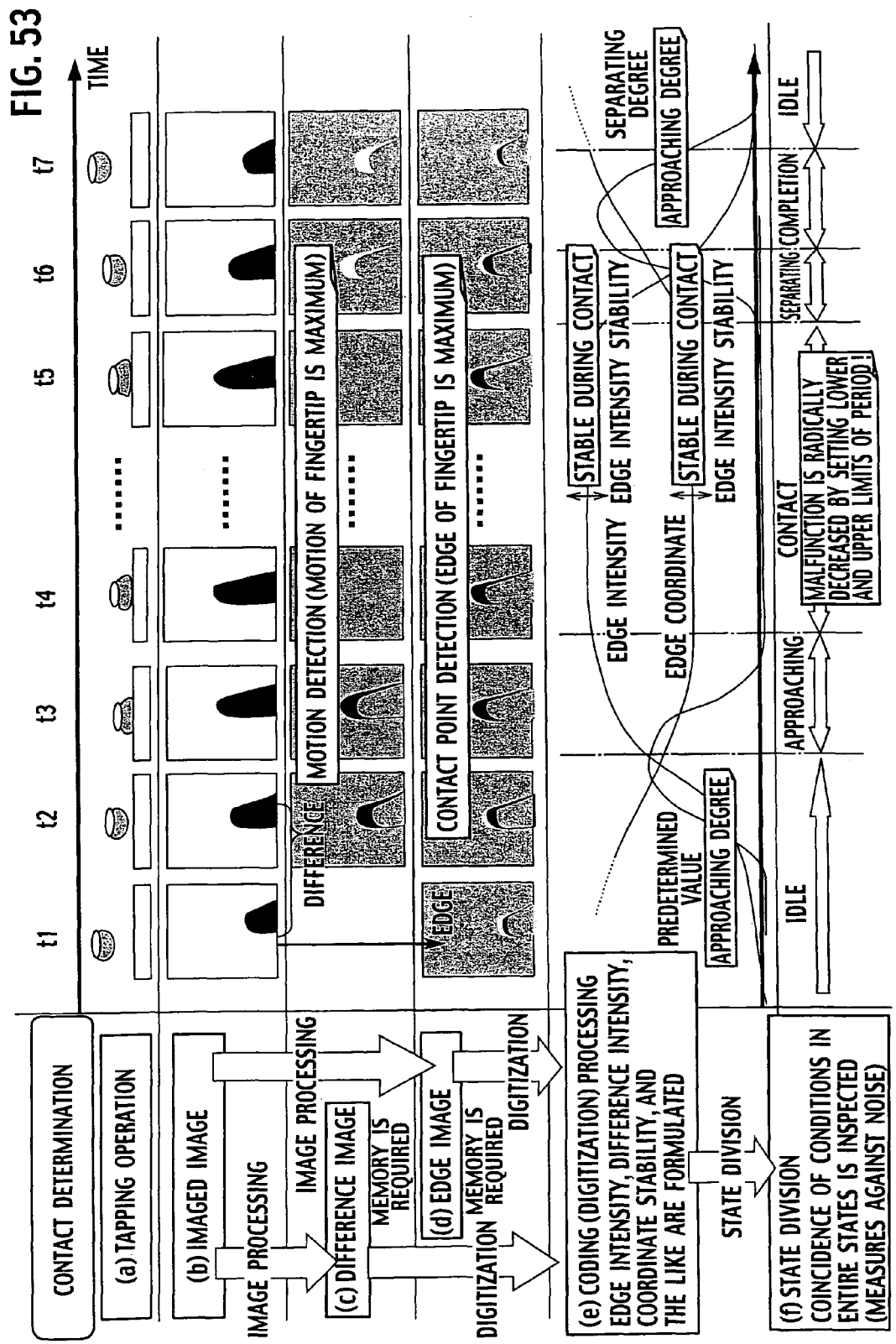
FIG. 53 shows a flow of processing of contact determination.
Figure 54:
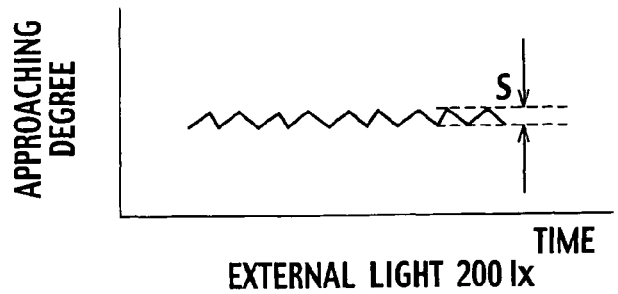
FIG. 54 is a graph showing a relationship between an approaching degree and a time when illumination of external light is 200 lx.
Figure 55:
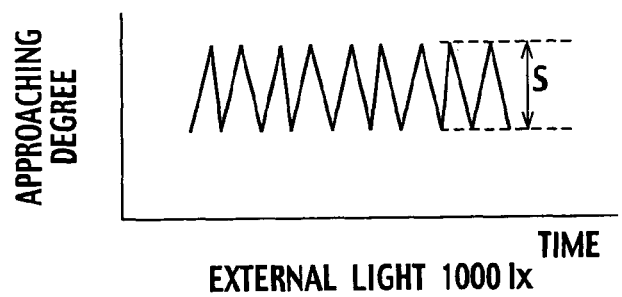
FIG. 55 is a graph showing a relationship between the approaching degree and the time when the illumination of the external light is 1000 lx.
Figure 56:
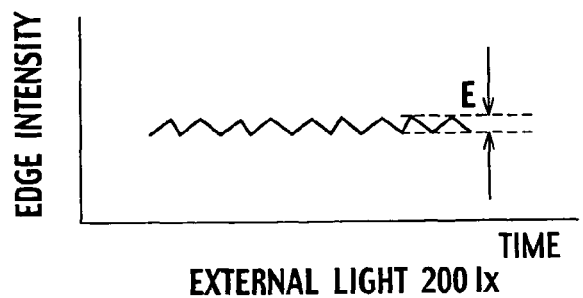
FIG. 56 is a graph showing a relationship between edge intensity and a time when the illumination of the external light is 200 lx.
Figure 57:
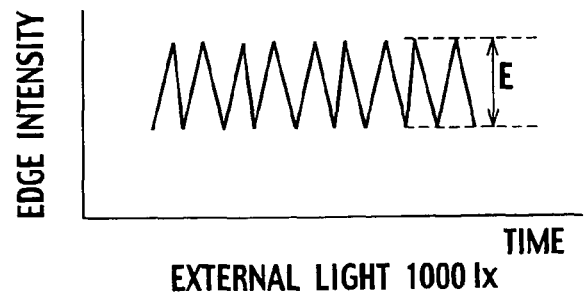
FIG. 57 is a graph showing a relationship between the edge intensity and the time when the illumination of the external light is 1000 lx.

In the case of performing the contact determination as shown in FIG. 53, it is necessary to decide the threshold values individually for the approaching degree, the separating degree, edge stability, and coordinate stability. However, the optimum values of the above-described degrees are varied owing to an environment such as the external light and temperature, and accordingly, it is difficult to decide the degrees at specific values. When the degrees are decided at the specific values, there is a possibility that a malfunction occurs on the contrary.

Accordingly, in this embodiment, noise of the signal at specific timing is measured in advance, and the threshold values are calculated based on the noise. Specifically, a noise level of each signal in the state (the idle state) immediately before is measured in advance. The threshold values are automatically set so that, with regard to the stability, an amplitude of the signal can be 60% or less of that in the idle state, and with regard to the approaching/separating degree, the amplitude of the signal can be five to twenty times a noise amplitude in the idle state.

Specific examples are described by using FIG. 54 to FIG. 57. In each of the drawings, the noise amplitude of the approaching degree at the idle time is denoted by reference symbol S, and a noise amplitude of the edge intensity at the idle time is denoted by reference symbol E. When the finger is approaching, a signal indicating an approaching intensity is gradually increased, and when the signal reaches S×10, this action is regarded as the approaching. Specifically, S×10 is set as a threshold value of the approaching intensity. The same can also applied to a separating signal. Meanwhile, with regard to the edge intensity, when the finger is in contact with the screen, the finger is tolerably fixed to the surface of the LCD. Accordingly, it is conceived that the edge intensity becomes stable. Specifically, the amplitude of the edge intensity becomes small. When the amplitude of the edge intensity becomes equal to or smaller than approximately 0.5 times the noise amplitude of the edge intensity at the idle time, it is regarded that the edge intensity is stabilized. Specifically, a threshold value of edge stability is set at E×0.5. The same can also be applied to coordinate stability.

In such a way, it is made possible to appropriately decide the threshold values under various environments, and the erroneous input and the malfunction can be reduced radically.

Seventh Embodiment

Figure 58A:
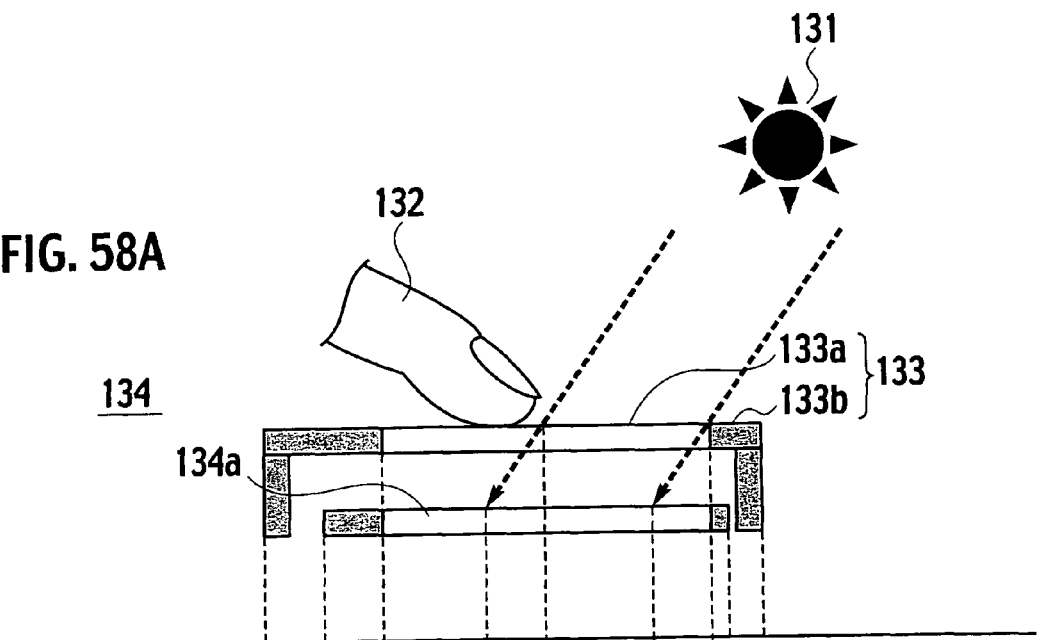
FIG. 58A schematically shows a side view of a cabinet having the display device mounted therein, FIG. 58B schematically shows a plan view of the cabinet, and FIG. 58C schematically shows a plan view of the display device.
Figure 58B:
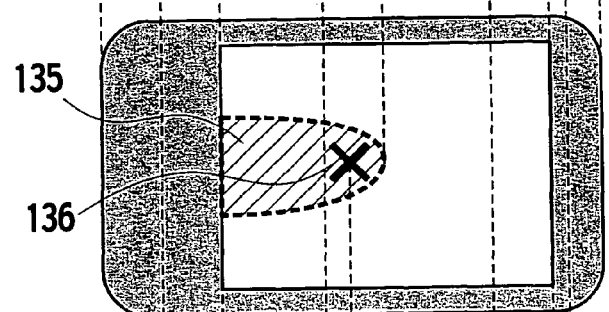
Figure 58C:
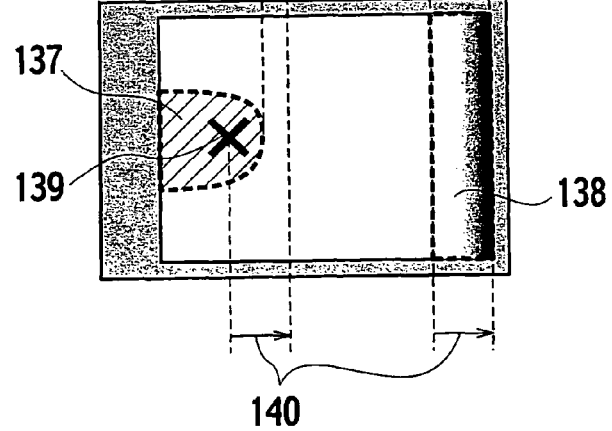

FIG. 58A schematically shows a side view of a cabinet having the display device in this embodiment mounted therein, FIG. 58B schematically shows a plan view of the cabinet, and FIG. 58C schematically shows a plan view of the display device.

A display device 134 includes an optical sensor unit 134a. A cabinet 133 includes the display device 134, a transparent portion 133a, and a shading portion 133b. For example, the display device 134 is a liquid crystal display in which optical sensors are integrated, or the like. For example, the cabinet 133 is a cabinet of a cellular phone. The transparent portion 133a is disposed above a display unit and optical sensor unit 134a of the display device 134, and the periphery of the transparent portion 133 becomes the shading portion 133b through which the light is not permitted to pass.

In such a configuration, when a finger 132 has contacted the transparent portion 133a, the finger 132 shades ambient environmental light 131, thereby forming a shadow 137 on the screen. The optical sensor unit 134a senses the shadow, thus making it possible to calculate a coordinate 139 of the position touched by the finger.

However, for the purpose of protecting the screen, in general, the transparent portion 133a of the cabinet 133 and the display device 134 are somewhat apart from each other. Accordingly, when the environmental light 131 is made incident onto the display device 134 from the diagonal direction as shown in FIG. 58A, a position 136 on the transparent portion 133a, which has been actually contacted by the finger 132, and the calculated coordinate 139 is shifted from each other, and this is a problem.

Meanwhile, when the environmental light 131 is made incident diagonally, a shadow 138 is formed on the screen also by the shading portion 133b of the cabinet 133. Since relative positions of the cabinet 133 and the display device 134 can be grasped in advance, a correction amount 140 for grasping a correct contact position can be calculated based on gradation information obtained by sensing the shadow 138 of the cabinet 133 by the optical sensor unit 134a.

Accordingly, in this embodiment, the shadow projected on the screen by the shading portion 133b is sensed by the optical sensor unit 134a, and an incident direction of light incident onto the screen from the periphery thereof is thus sensed, and based on the incident direction, the coordinate value of the coordinate to be inputted is corrected.

Figure 59:
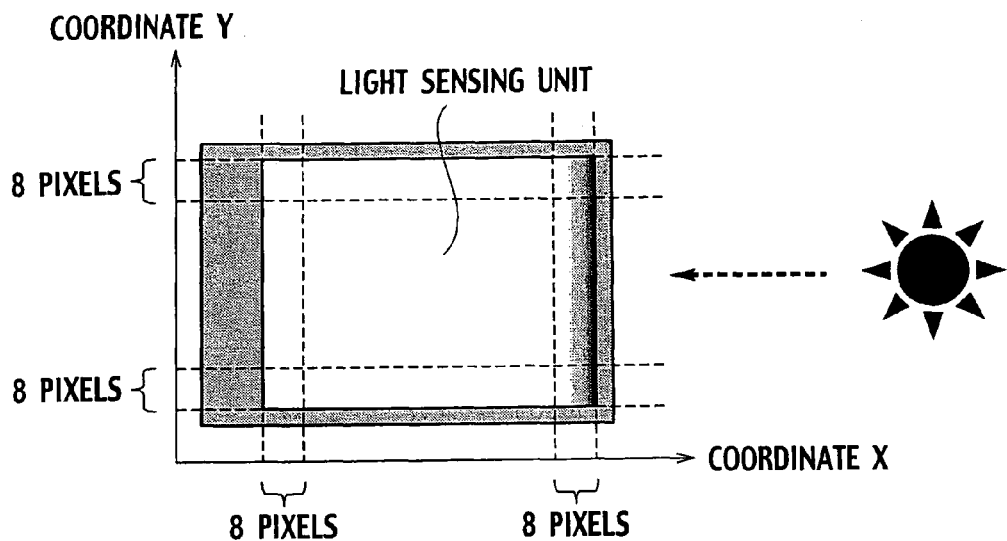
FIG. 59 is a schematic view for explaining a technique of calculating a correction amount from gradation information.
Figure 60:
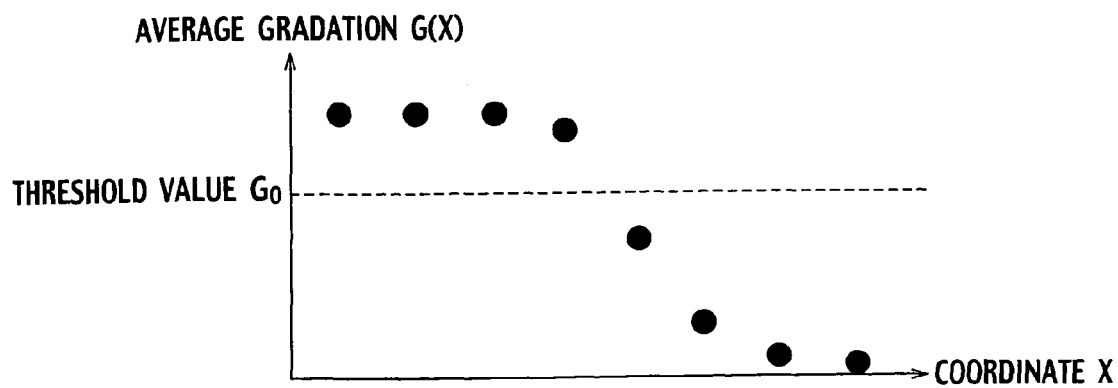
FIG. 60 is a graph showing a relationship between a coordinate X and an average gradation value G(X).

FIG. 59 shows a specific example of a method of calculating the correction amount from the gradation information. As shown by broken lines of this drawing, pixels in the optical sensor unit, which are, for example, eight pixels or less counted from each of four sides of the optical sensor unit, is used exclusively for calculating the correction amount. FIG. 60 shows a relationship of an X-axis and an average gradation value G(X) taken along a Y-axis direction, for eight pixels counted from a larger point of the X-axis when the environmental light is made incident from the right side. Since the shadow of the right side cabinet is formed, the average gradation is reduced when X is increased. The number of pixels, in each of which a value of the average gradation becomes lower than a threshold value G0, is defined as a correction amount of the X-coordinate. For example, in FIG. 60, the correction amount of the X-coordinate is defined as +4.

In a similar way, also in the case where the average gradation value becomes lower than the threshold value within eight pixels counted from a smaller point of the X-axis, the number of pixels concerned is defined as the correction amount of the X-coordinate. However, in this case, the correction is made to the negative side. Correction amounts in the Y-coordinate can also be obtained in completely the same way.

Eighth Embodiment

A basic configuration of a display device of this embodiment is similar to that described by using FIG. 1 to FIG. 5. Moreover, also in this embodiment, as shown in FIG. 35, as the regions which the object is made to approach, the first to twelfth switches are assumed to be displayed on the screen, and it is assumed that it is determined which of the switches is contacted by the finger 20.

A basic configuration of the sensing IC 4 in the display device of this embodiment is similar to that described by using FIG. 36 in the third embodiment. Specifically, the calibration circuit 93 changes the operation point based on the change of the external light.

However, if the operation point is frequently changed by the approaching of the finger/hand, accurate reading thereof cannot be performed. Specifically, when it is desired to detect the finger motion by means of the difference image, excessive noise occurs if the difference in the entire read image is detected owing to a change of drive conditions of the optical sensors.

Accordingly, the average value is not outputted based on the output values of the optical sensors of the entire screen, but the drive conditions are changed based on output values of the optical sensors arranged on a region other than the region on the screen, on which the switches are displayed. As the region concerned, for example, an upper portion of the screen, which is not shaded even if the finger approaches there, is assigned.

Figure 61:
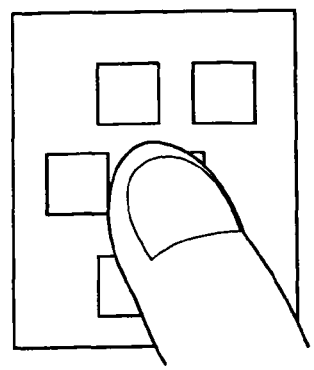
FIG. 61 shows the screen in the case of outputting an average value based on output values of optical sensors of the entire screen.
Figure 62:
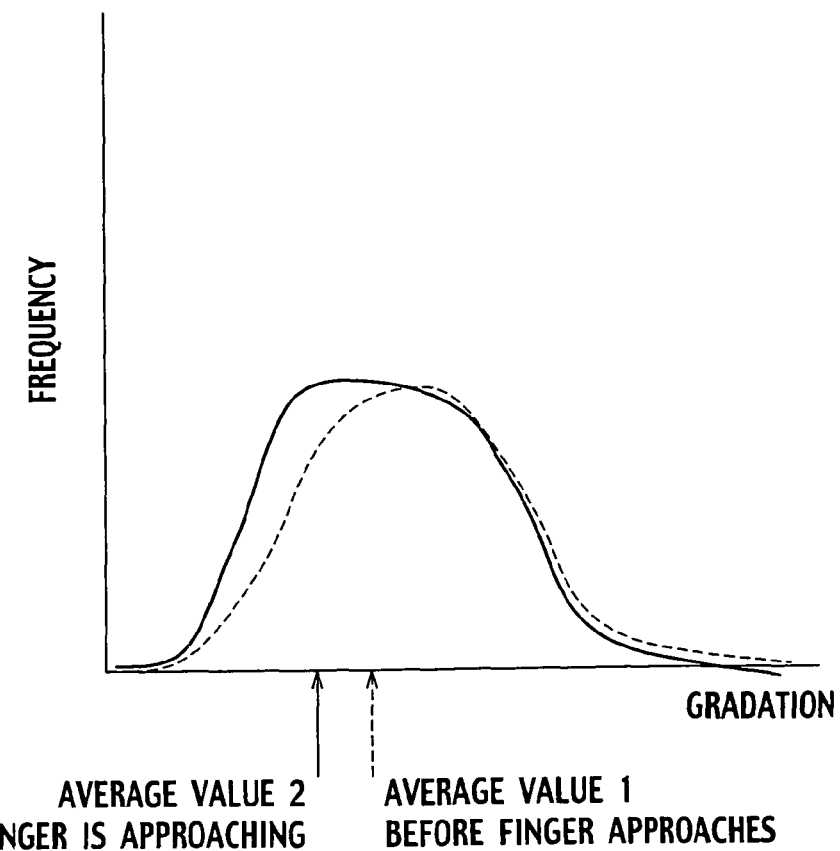
FIG. 62 shows gradation histograms in the case of using the optical sensors of the entire screen.

FIG. 61 shows a screen in the case of outputting the average value based on the output values of the optical sensors of the entire screen. FIG. 62 shows gradation histograms in this case. A broke line shows a histogram before the finger approaches, and a solid line shows a histogram when the finger approaches.

Figure 63:
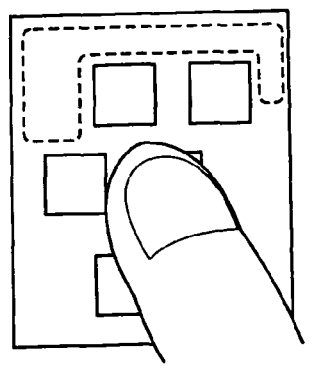
FIG. 63 shows the screen in the case of outputting the average value based on the output values of the optical sensors in a region other than the switches in an upper portion of the screen.
Figure 64:
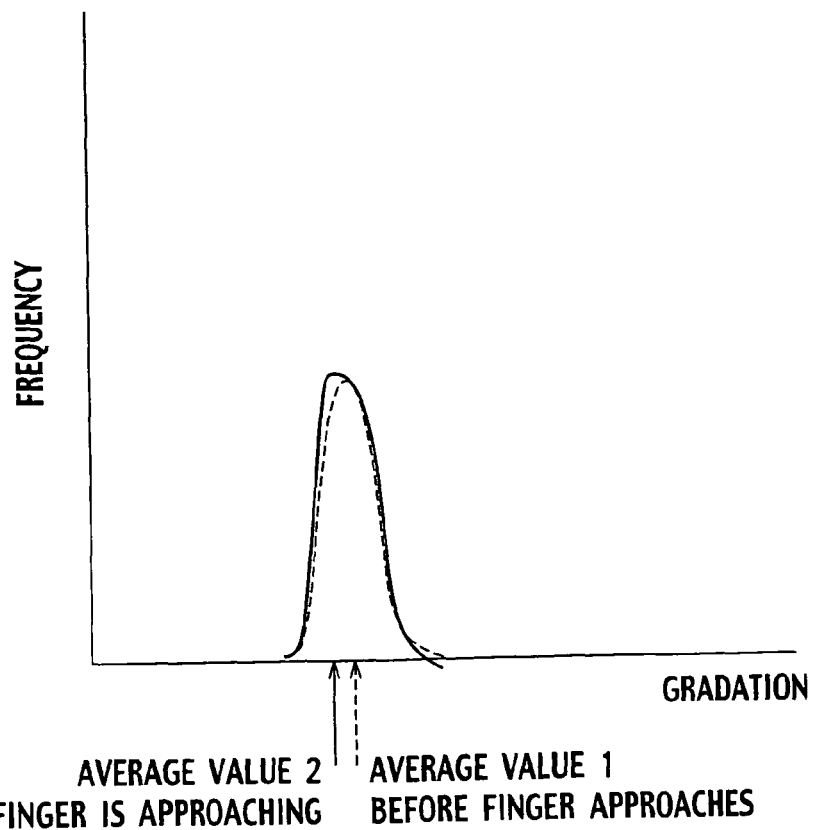
FIG. 64 shows gradation histograms in the case of using the optical sensors in the region other than the switches in the upper portion of the screen.

As opposed to this, FIG. 63 shows a screen in the case of outputting the average value based on the output values of the optical sensors on the region on the upper portion of the screen, which is other than the region of the switches, and FIG. 64 shows gradation histograms in this case. Here, the output values of the optical sensors arranged on a region shown by a broken line of FIG. 63 are used. A relationship between a solid line and a broken line in FIG. 64 is similar to that of FIG. 62.

As seen from FIG. 62 and FIG. 64, when the finger is approaching, an area that comes to have the low gradation value, which corresponds to the shadow of the finger, is increased, and the histogram is shifted to the low gradation value side.

When comparing both of FIG. 62 and FIG. 64 with each other, in the case of using the optical sensors of the entire screen, an average value 1 of the histogram before the finger approaches is shifted to an average value 2 thereof when the finger approaches, and the gradation average value drops to a large extent. As opposed to this, in the case of using only the optical sensors on the upper portion of the screen, a sampled region of the gradation histogram is limited to a dotted line of FIG. 63. In such a way, it is less frequent that the shadow is projected on the sampled region before and after the finger approaches, and accordingly, the shift of the gradation average value in the sampled region is reduced. Hence, a sensitive reaction to the approaching of the finger and the hand can be avoided, and it is made possible to accurately read only the change of the external light.

Figure 65:
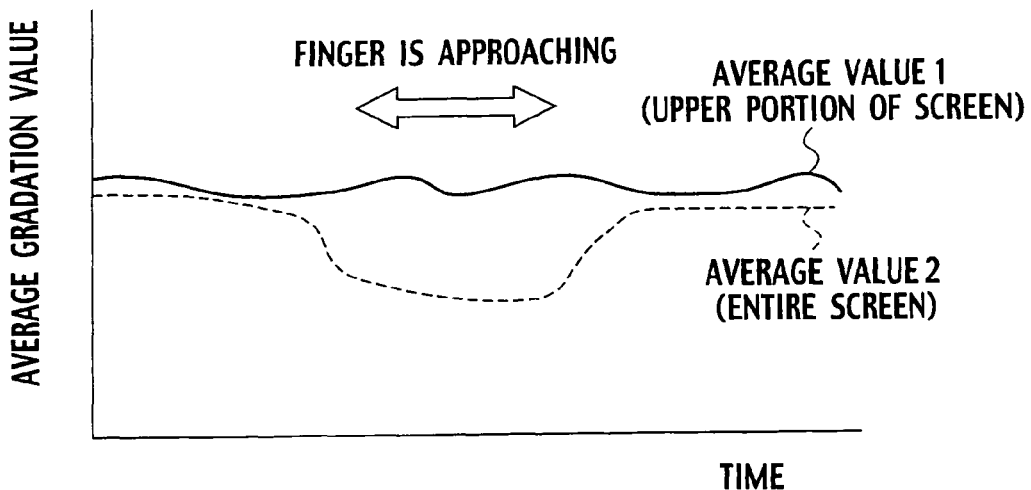
FIG. 65 shows changes with time of gradation average values before and after the finger approaches.

FIG. 65 shows changes with time of the gradation average values before and after the finger approaches. A dotted line of this drawing shows a change with time of the average value in the case of using the optical sensors of the entire screen, in which the average value is largely changed by the approaching of the finger. As opposed to this, a solid line of this drawing shows a change with time of the average value in the sampled region on the upper portion of the screen, in which the average value is not changed very much before and after the approaching of the finger. Meanwhile, when the illumination of the external light is largely changed, the gradation average of the sampled region shown by the dotted line is shifted while interlocking with the external light, and accordingly, the calibration functions effectively.

Considering that the calibration is performed in the inside of the sensing IC, the output values from the optical sensors of the entire screen must be awaited in the case of calculating the average value from the entire screen. As opposed to this, if the average value is calculated only from the specific region on the upper portion of the screen, there is an advantage in that it is not necessary to await the output values from the optical sensors of the entire screen.

Note that, though it is determined whether or not the calibration is to be performed by observing the "average value" in this embodiment, the object to be observed is not limited to the "average value". In order to determine whether or not the drive conditions of the optical sensors are appropriate, some statistical amount based on the output values from the image just needs to be used. For example, a central value (a median value) of the gradation histogram may be used. However, a circuit scale for obtaining the "average value" is smaller, and there is an advantage in that cost of the sensing IC can be reduced.

Figure 66:
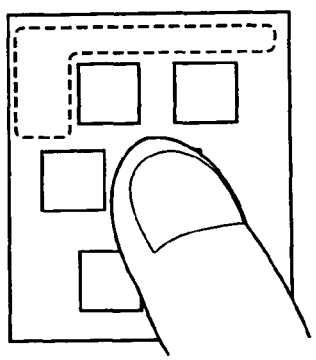
FIG. 66 shows the screen in the case of setting a region for calibration in a left region of the upper portion of the screen.
Figure 67:
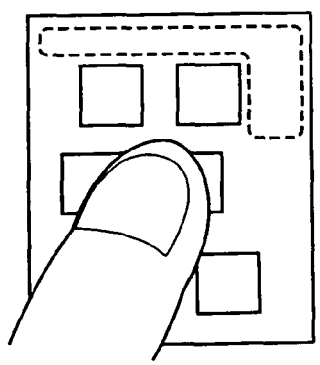
FIG. 67 shows the screen in the case of setting the region for calibration in a right region of the upper portion of the screen.

It is desirable that the sampled region be made somewhat large within a range where the shadow of the finger is not projected. Accordingly, as shown in FIG. 66 and FIG. 67, it is effective to make the sampled region asymmetric with respect to the center of the screen between the case where the inputting hand of the user is the right hand and the case where the hand concerned is the left hand. This setting shall be made when the user purchases the terminal. For example, the following is conceived. A right-handed user is supposed to more often use the right hand for the input as shown in FIG. 66, and accordingly, there is a somewhat high possibility that the shadow is projected on the right side of the screen, and there is a low possibility that the shadow is projected on the left side of the screen. Accordingly, as shown by a dotted line of this drawing, it is adequate to define the sampled region for the calibration on the upper left side of the screen. As opposed to this, a left-handed user is supposed to more often use the left hand for the input as shown in FIG. 67, and accordingly, as shown by a dotted line of this drawing, it is adequate to define the sampled region on the upper right side of the screen.

As described above, according to this embodiment, the drive conditions of the optical sensors are changed based on the output values of the optical sensors arranged on the region other than the region which the object is made to approach, thus making it difficult for the calibration to be affected by an influence of the shadow when the object approaches the screen. Accordingly, it is made possible to accurately grasp the variations of the outputs of the optical sensors owing to the illumination change of the external light.

Ninth Embodiment

In this embodiment, only a function of the calibration circuit 93 is different from that of the third embodiment, and other basic configurations are similar to those of the third embodiment. Accordingly, here, only the calibration circuit 93 is described, and a duplicate description of portions similar to those of the third embodiment is omitted.

In this embodiment, the calibration is performed in real time. This is because, in some cases, it is insufficient if the calibration is performed only at times of shipment of the display device or of turning on a power supply. For example, this is because the illumination of the external light is sometimes changed during use of the terminal, or the illumination of the panel surface is sometimes largely changed owing to a change of an angle of the hand holding the display even if the illumination of the external light is constant.

Figure 68:
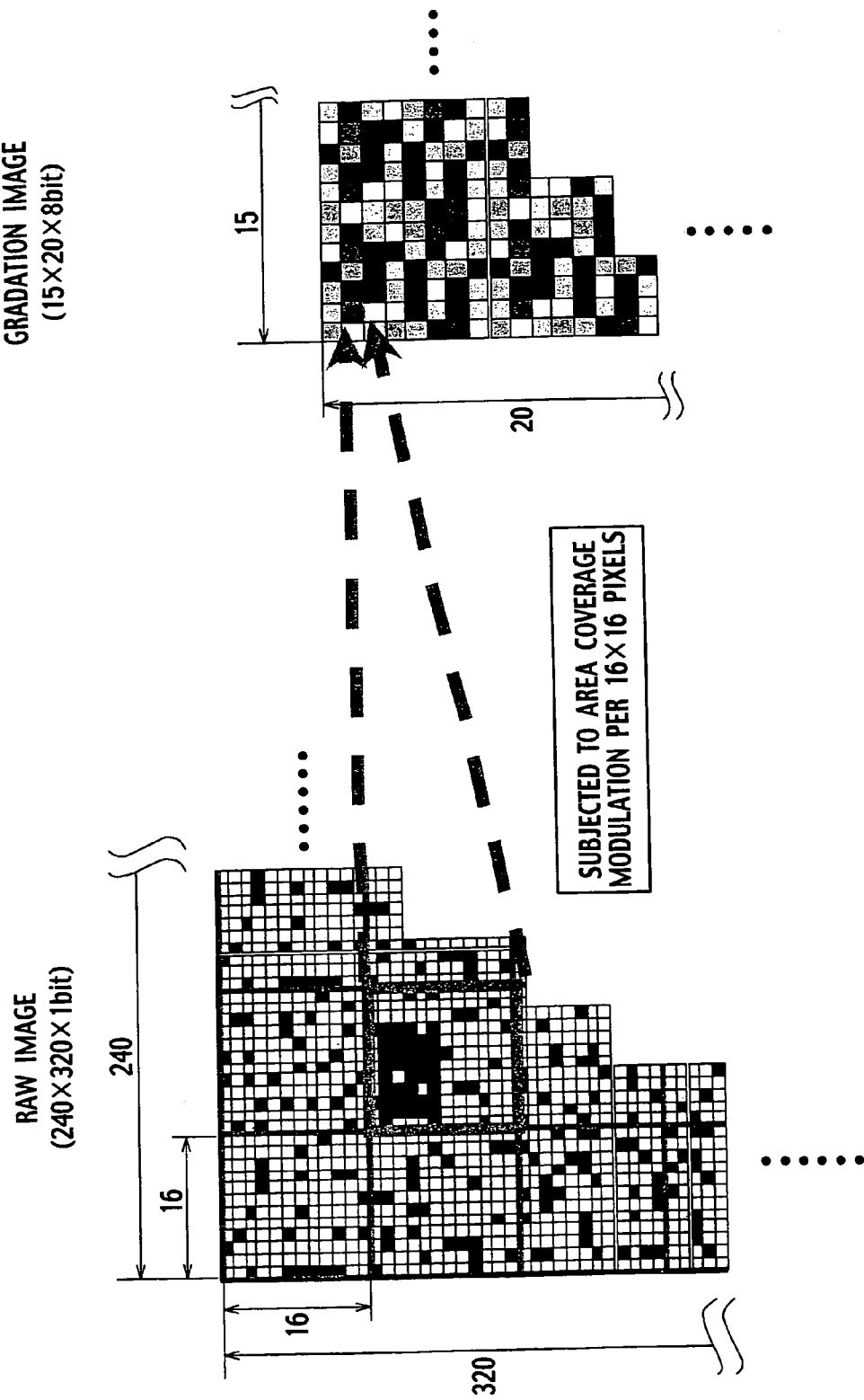
FIG. 68 is a view for explaining processing for pixel thinning in the modulation circuit.

To the calibration circuit 93 of this embodiment, as shown in FIG. 68, the gradation data of 15×20×8 bits, which is formed by area modulation processing for each of 16×16 pixels of the imaged image, is sequentially inputted. The thinning processing is performed as described above, thus achieving a reduction of a load of the real-time processing in the calibration circuit 93.

Meanwhile, it is not preferable that the change of the operation point by the calibration occur sensitively when the finger approaches/contacts the panel surface. Accordingly, the calibration circuit 93 creates the gradation histogram, and outputs a control signal so that upper values including the center in the gradation histogram can be set within a predetermined range. The DAC 94 and the level shifter 91 which have received the control signal adjust at least one of the exposure time and the precharge time.

A description is next made that the calibration focusing on the upper values of the gradation histogram is more excellent in stability than the calibration focusing on the average value.

Figure 69:
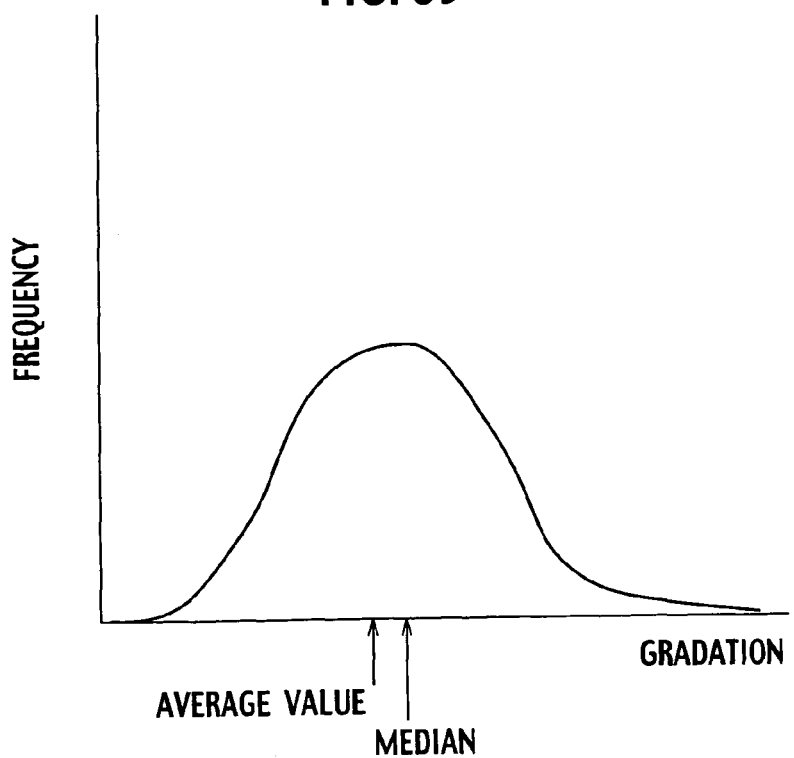
FIG. 69 shows an average value and a median value in a gradation histogram before the finger approaches.
Figure 70:
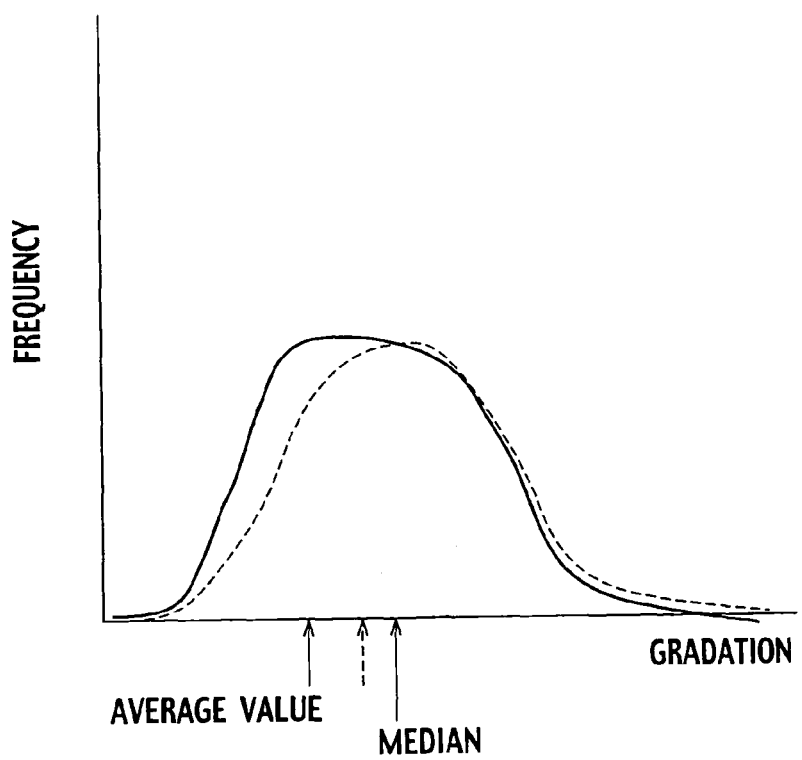
FIG. 70 shows average values and median values in gradation histograms after the finger approaches.

FIG. 69 shows a gradation histogram before the finger approaches, and FIG. 70 shows gradation histograms when the finger approaches. In each of the drawings, the average value and the central value (median value) are shown. Note that, in FIG. 70, a broken line denotes the same histogram as that in FIG. 69, and a broken arrow indicates the average value thereof.

As shown in these drawings, when the case is assumed, where the switch in the vicinity of the center of the screen is pressed under the external light, the quantity of light incident onto the optical sensors is gradually reduced as the finger and the palm are approaching the screen, and the gradation average value is changed to a direction of a decrease thereof. If the operation conditions of the optical sensors are changed in sensitive response to the above-described approaching, in the case of the difference processing, the entire gradation change accompanied with a change of operation points excluding the component of the finger motion is added as noise to the difference image.

As opposed to this, the upper gradation values from the center of the histogram are less affected by the noise as described above. The reason is as follows. Since the shadow of the finger has a low gradation value, the shadow of the finger largely affects a lower portion of the histogram; however, less affects the upper portion including the center of the gradation histogram. As shown in FIG. 70, though the average value is shifted to a lower gradation, the median value is less shifted thereto. Accordingly, it can be said that the median value is excellent in stability.

As a matter of course, similar processing may be performed by using, instead of the median value, for example, a gradation value at a position of ⅓ from the upper portion of the gradation histogram and a gradation value at a position of ¼ from the upper portion of the gradation histogram. By using the upper gradation values, even if the shadow of the finger in the case of the approaching thereof is formed on the entire screen depending on a way of overlapping of the light source and the hand, unnecessary calibration is not performed, thus making it possible to enhance the operation stability.

Only when the external light is significantly changed, the upper gradation values of the gradation histogram are changed. To which extent the upper gradation values are to be used depends on to which extent the screen is shaded when the finger approaches there. For example, when the size of the screen is sufficiently larger than the object such as the finger and the hand, the median value is sufficient, and when the size of the screen is approximately the same as that of the finger or the hand, gradation values of approximately ⅕ counted from the upper portion are better. As described above, in the calibration circuit 93, it is desirable that the upper gradation values be set changeable depending on the sizes of the screen and the object.

Moreover, if parameters of the sensor drive conditions, such as the precharge voltage and the exposure time, are continuously changed, then it will take time to make a control thereof. Accordingly, it is desirable to prepare in advance a table showing in a discrete manner a relationship between a predetermined range of the gradation values and at least one of the exposure time and precharge voltage of the optical sensors. The parameters in the table in this case should have overlapped portions in adjacent ones. This is because, otherwise, the case will occur, where the processing falls into an infinite loop when the calibration is applied to boundary portions thereof. Moreover, the table is made in such a manner that the exposure time is maximized in an allowable range and that the precharge voltage is changed. As a table satisfying the above-described conditions, for example, a table of FIG. 71 is determined, in which the way of changing the precharge voltage and the exposure time accords with the above-described conditions.

Figure 72:
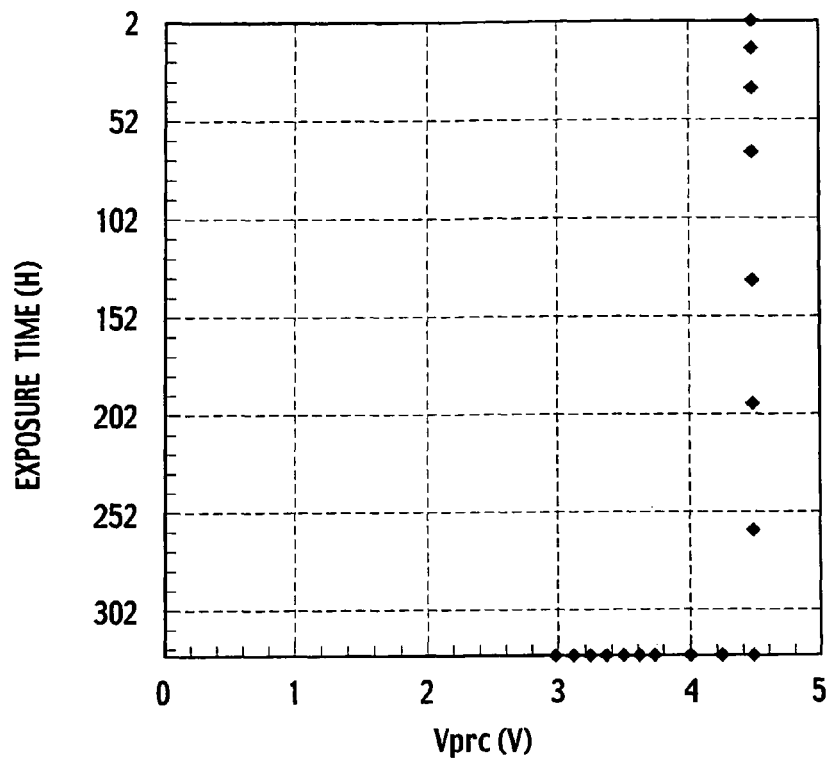
FIG. 72 is a view in which the table of FIG. 71 is graphed.

This table sets a relationship among the precharge voltage Vprc, the exposure time, and the minimum value and the maximum value, both of which represent the range of the median value. FIG. 72 is a view in which the table of FIG. 71 is graphed.

Figure 73:
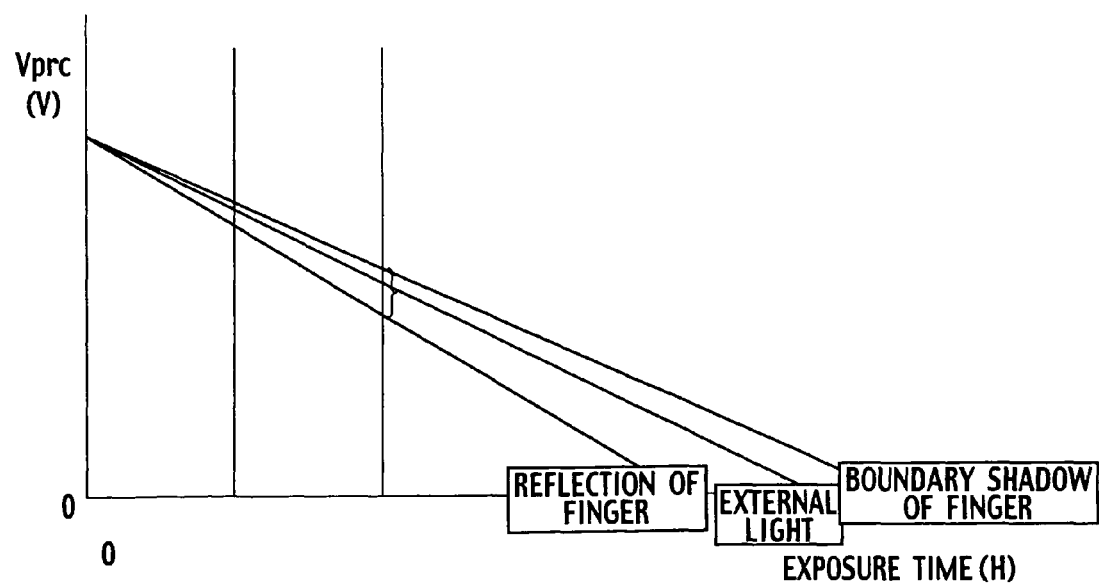
FIG. 73 is a graph showing relationships between a precharge time and the exposure time.

Both of the precharge voltage and the exposure time are not changed little by little with a constant pitch, but the pitch is set so that it can take shorter to move the precharge voltage and the exposure time to appropriate conditions. Moreover, the reason why the exposure time is maximized in the allowable range and the precharge time is preferentially changed is because, the longer the exposure time is, the better the S/N ratio is as shown in FIG. 73.

Next, a description is made of processing for controlling the exposure time and the precharge time in real time by using the table as described above.

Figure 74:
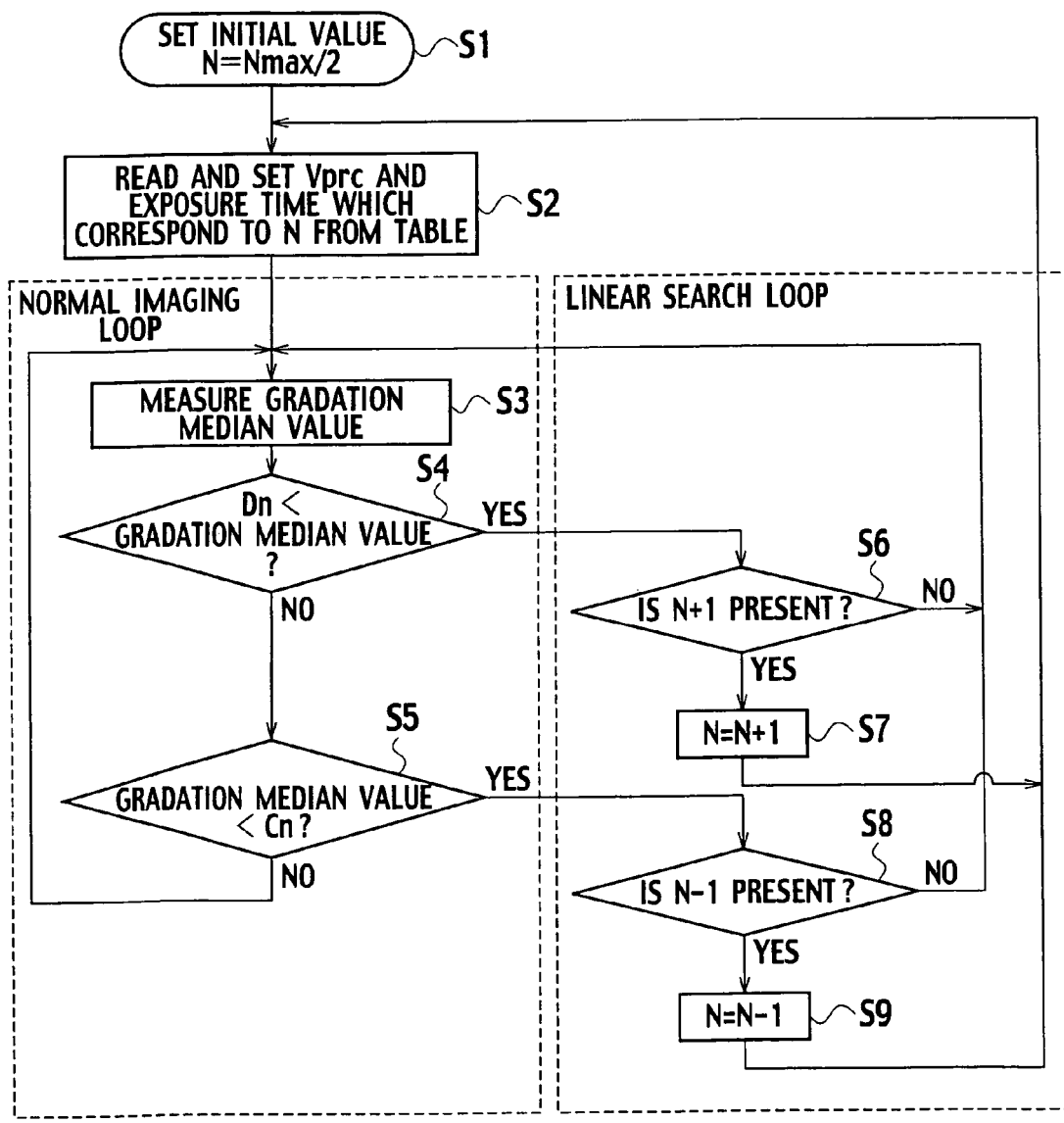
FIG. 74 is a flowchart showing a flow of processing for setting the exposure time and the precharge voltage by a linear search method.

FIG. 74 is a flowchart showing a flow of processing for setting the exposure time and the precharge voltage by a linear search method. Here, as shown in FIG. 71, a number N increased one by one is assigned in advance in a descending order for each relationship between the respective parameters such as the precharge voltage, the exposure time, the minimum value and maximum value of the median value. Moreover, the following setting is made in advance, in which the predetermined range of the median value, which is defined by the minimum value and maximum value thereof, is changed to a higher gradation value as the number N is increased, and the precharge voltage and the exposure time are changed following the change of the median value.

The linear search processing of FIG. 74 includes setting processing (Steps S1 and S2) of an initial value, a normal imaging loop (Steps S3 to S5) when the measured median value is within the predetermined range, and a linear search loop (Steps S6 to S9) when the measured median value is not within the predetermined range.

In Step S1, ½ of the maximum value Nmax of N is set at the initial value N.

In Step S2, the precharge voltage Vprc and the exposure time which correspond to an N-th column are read from the table, values of these are set by the calibration circuit 93, and the control signal based on these values is outputted.

In Step S3, the image is imaged by the display unit 2 by using the optical sensors 8, the output value of the imaged image is modulated by the modulation circuit 92, and the median value of the gradation histogram is measured by the calibration circuit 93.

In Step S4, the calibration circuit 93 reads out the maximum value Dn corresponding to the N-th column of the table, and compares the maximum value Dn with the measured median value. When the measured median value is smaller than the maximum value, the processing proceeds to Step S5, and when the measured median value is larger, the processing proceeds to Step S6.

In Step S5, the calibration circuit 93 reads out the minimum value Cn of the median corresponding to the N-th column of the table, and compares the minimum value Cn with the measured median value. When the measured median value is larger than the minimum value, the processing proceeds to Step S3, and when the measured median value is smaller, the processing proceeds to Step S8.

In Steps S6 and S7, in order that the measured median value can stay within a range smaller than the maximum value, N is increased by one, and the processing then returns to Step S2. When N cannot be increased, the processing returns to Step S3 without changing N.

In Steps S8 and S9, in order that the measured median value can stay within a range larger than the minimum value, N is decreased by one, and the processing then returns to Step S2. When N cannot be decreased, the processing returns to Step S3 without changing N.

By the linear search processing as described above, it is made possible to set the appropriate precharge voltage and exposure time in real time. In this technique, when the state abruptly turns from dark to light, or on the contrary, when the state abruptly turns from light to dark, a time for N frames is required to the longest until the appropriate setting is made.

Figure 75:
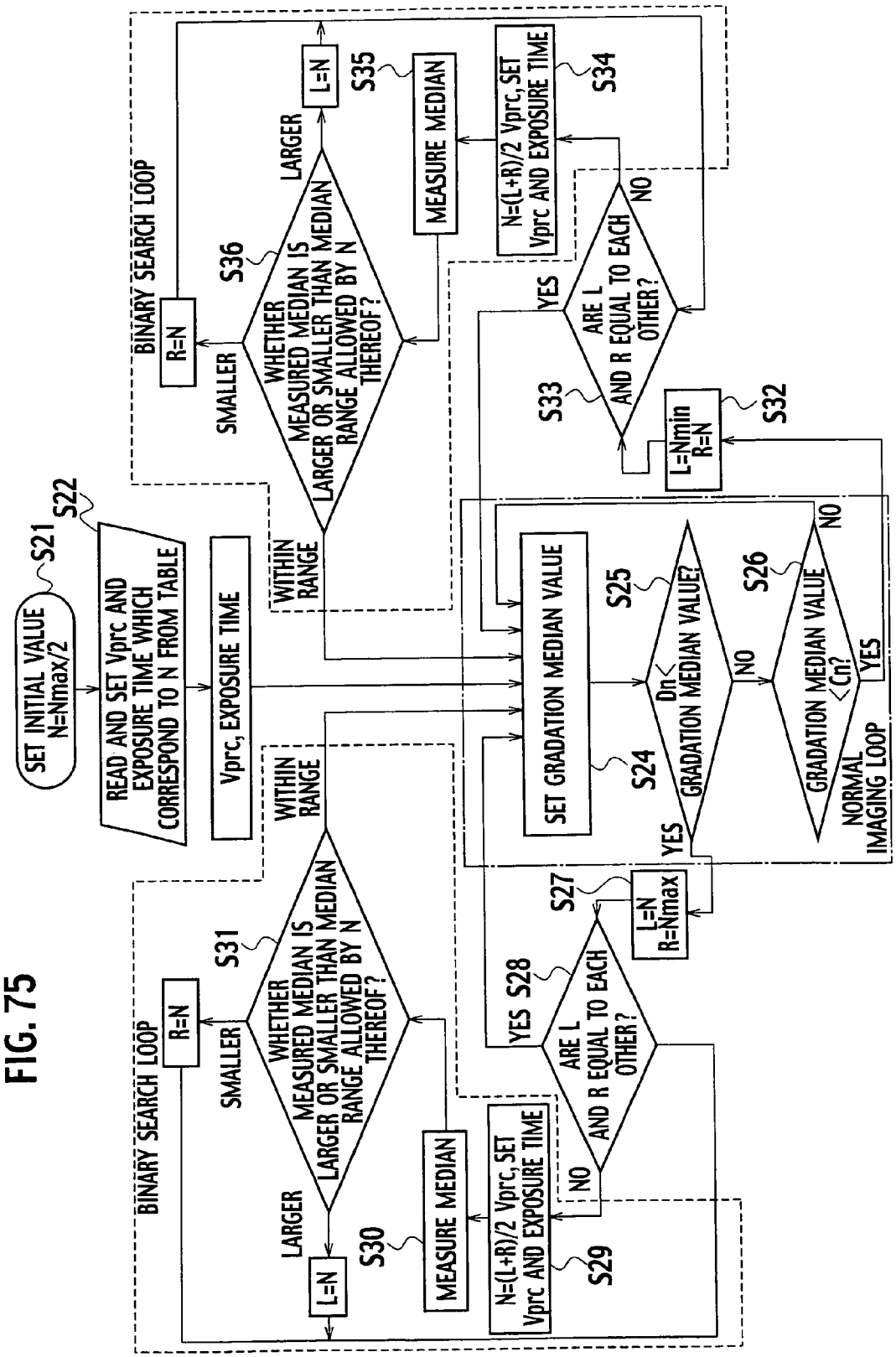
FIG. 75 is a flowchart showing a flow of processing for setting the exposure time and the precharge voltage by a binary search method.

Next, a description is made of a binary search method as another technique. FIG. 75 is a flowchart showing a flow of processing for setting the exposure time and the precharge voltage by the binary search method. The table described above is used here as well.

Binary search processing in this drawing includes setting processing (Steps S21 and S22) of an initial value, a normal imaging loop (Steps S24 to S26) when the measured median value is within the predetermined range, deadlock determination processing (Steps S27 and S28 and Steps S32 and 33), and a binary search loop (Steps S29 to S31 and Steps S34 to S36) when the measured median value is not within the predetermined range.

In Step S21, ½ of the maximum value Nmax of N is set at the initial value N.

In Step S22, the precharge voltage Vprc and the exposure time which correspond to the N-th column are read from the table, the values of these are set by the calibration circuit 93, and the control signal based on these values is outputted.

In Step S24, the image is imaged by the display unit 2 by using the optical sensors 8, the output value of the imaged image is modulated by the modulation circuit 92, and the median value of the gradation histogram is measured by the calibration circuit 93.

In Step S25, the calibration circuit 93 reads out the maximum value Dn corresponding to the N-th column of the table, and compares the maximum value Dn with the measured median value. When the measured median value is smaller than the maximum value, the processing proceeds to Step S26, and when the measured median value is larger, the processing proceeds to Step S27.

In Step S26, the calibration circuit 93 reads out the minimum value Cn of the median corresponding to the N-th column of the table, and compares the minimum value Cn with the measured median value. When the measured median value is larger than the minimum value, the processing returns to Step S24, and when the measured median value is smaller, the processing proceeds to Step S32.

In Step S27, the current value of N is substituted into a variable L, and the value of Nmax is substituted into a variable R.

In Step S28, it is determined whether or not L and R are equal to each other. This is a determination as to whether N has reached an end of the table. When L and R are equal to each other, N cannot be changed, and accordingly, the processing returns to Step S24 without doing anything. Meanwhile, when L and R are different from each other, the processing proceeds to Step S29.

In Step S29, the calibration circuit 93 takes a value of (L+R)/2 as a new value of N, reads and sets a precharge voltage and an exposure time which correspond to the N-th column concerned, and outputs a control signal based on these values.

In Step S30, the image is imaged by the display unit 2 by using the optical sensors 8, the output value of the imaged image is modulated by the modulation circuit 92, and the median value of the gradation histogram is measured by the calibration circuit 93.

In Step S31, it is determined whether or not the measured median value is within the range defined by the minimum value and the maximum value which correspond to the column of the number N concerned. When the measured value is larger than the maximum value, L and N are taken as equal to each other, and the processing returns to Step S28. When the measured value is smaller than the minimum value, R and N are taken as equal to each other, and the processing returns to Step S28. When the measured value is within the range defined by the minimum value and the maximum value, the measured value is within the normal range, and accordingly, the processing returns to Step S24 in the normal loop.

Meanwhile, in Step S32, the current value of N is substituted into the variable R, and the value of Nmin is substituted into the variable L.

In Step S33, it is determined whether or not L and R are equal to each other. This is a determination as to whether N has reached the end of the table. When L and R are equal to each other, N cannot be changed, and accordingly, the processing returns to Step S24 without doing anything. Meanwhile, when L and R are different from each other, the processing proceeds to Step S34.

In Step S34, the calibration circuit 93 takes a value of (L+R)/2 as a new value of N, reads and sets a precharge voltage and an exposure time which correspond to the N-th column concerned, and outputs a control signal based on these values.

In Step S35, the image is imaged by the display unit 2 by using the optical sensors 8, the output value of the imaged image is modulated by the modulation circuit 92, and the median value of the gradation histogram is measured by the calibration circuit 93.

In Step S36, it is determined whether or not the measured median value is within the range defined by the minimum value and the maximum value which correspond to the column of the number N concerned. When the measured value is larger than the maximum value, L and N are taken as equal to each other, and the processing returns to Step S33. When the measured value is smaller than the minimum value, R and N are taken as equal to each other, and the processing returns to Step S33. When the measured value is within the range defined by the minimum value and the maximum value, the measured value is within the normal range, and accordingly, the processing returns to Step S24 in the normal loop.

By the binary search processing, it is made possible to set the appropriate precharge voltage and exposure time in real time. In this technique, only a time for $\log_2 N$ frames is required to the longest until the appropriate setting is made, and it is made possible to perform faster processing than the above-described linear search processing.

As described above, according to this embodiment, the drive conditions of the optical sensors are controlled so that the upper values including the center in the gradation histogram can be set within the predetermined range. In such a way, it becomes difficult for the calibration to be affected by an influence of a change of the low gradation values caused in the shadow occurring when the object approaches. Accordingly, the variations of the outputs of the optical sensors owing to the illumination change of the external light can be grasped accurately.

According to this embodiment, the control is made by using the table showing the relationship between the exposure time, precharge voltage, and predetermined range of the optical sensors in a discrete manner, thus making it possible to save the time for the control than continuously changing the exposure time and the precharge time.

According to this embodiment, the upper gradation values are set changeable in response to the sizes of the screen and the object, thus making it possible to perform the control using the appropriate gradation values in response to the sizes of the screen and the object.

According to this embodiment, the precharge voltage is changed, and the exposure time is maximized within the allowable range, thus making it possible to enhance the S/N ratio.

According to this embodiment, by using the linear search method, the exposure time and the precharge voltage can be obtained rapidly and accurately so that the gradation values can stay within the predetermined range.

According to this embodiment, by using the binary search method, the exposure time and the precharge voltage can be obtained at a higher speed than using the linear search method.

According to this embodiment, by using the gradation values in which the pixels have been subjected to the thinning processing for each fixed region, the load on the processing for changing the drive conditions of the optical sensors can be reduced.

Moreover, in this embodiment, as shown in FIG. 63, FIG. 66, and FIG. 67, it is also effective to limit the region of the optical sensors for calculating the median and the like. In usual, the upper portion of the screen, which is other than the switch display portion, is difficult to be shaded by the shadow of the finger or the hand. Accordingly, it is conceived that there is hardly a change of the gradation histogram owing to the approaching of the finger, and only when the illumination of the external light is really changed to a large extent, the change of the gradation histogram occurs, and the values of the median and the like are changed.

Moreover, though there has been shown the example of changing the drive conditions such as the precharge voltage instantaneously after the changes of the median and the like in this embodiment, a predetermined standby time may be provided. At the start of the change of the median, it is not still apparent whether the change is caused by the change of the external light or the approaching operation of the finger. When the change is caused by the change of the external light, the drive conditions should be changed. When the change is caused by the approaching of the finger, it is not necessary to change the drive conditions since values of the median and the like return to original values thereof after a while. When the values of the median and the like return to the original values thereof to an extent where it is not necessary to change the drive conditions after the predetermined standby time (for example, one second), the drive conditions are not changed. When the values of the median and the like are continuously changed to the extent where it is necessary to change the drive conditions after the predetermined standby time, the drive conditions are changed. In such a way, an excessive calibration in the case where the finger temporarily approaches can be radically reduced.

The predetermined time in the change point in the sensing IC is a time required for the contact determination for the finger. For example, the predetermined time is defied as a time somewhat longer than a time between a first peak when the finger approaches and a second peak when the finger separates in FIG. 38. This is a time of which upper limit is determined, such as "within 0.5 second". Then, the median values and the like in this predetermined period are prestored in the memory and the register in the sensing IC.

Note that, though the descriptions have been made by taking as an example the case where the human finger has contacted the screen in the respective embodiments described above, as the object contacting the screen, the light pen added with the light source such as an LED, the white mascot, and the like may be used. Alternatively, the metal piece having the metallic mirror surface, the pencil sack, and the like may be used.

Tenth Embodiment

While the potential of the signal line and the fixed reference voltage are compared with each other in the comparator 41 in the first embodiment, a variable reference voltage changed in response to the output of the comparator is used instead of the fixed reference voltage in this embodiment. A basic configuration of a display device in the embodiment is similar to that of the first embodiment, and accordingly, a description is made only of the comparator and the reference voltage here, and a duplicate description of similar portions to those of the first embodiment is omitted.

In the case of fixing the reference voltage of the comparator 41 as in the first embodiment, the comparison result appropriately corresponding to the illumination change of the ambient environmental light cannot be outputted. Moreover, if the reference power supply 40 is provided for each comparator 41 in order to provide the fixed reference voltage, the circuit scale becomes enormous.

Figure 76:
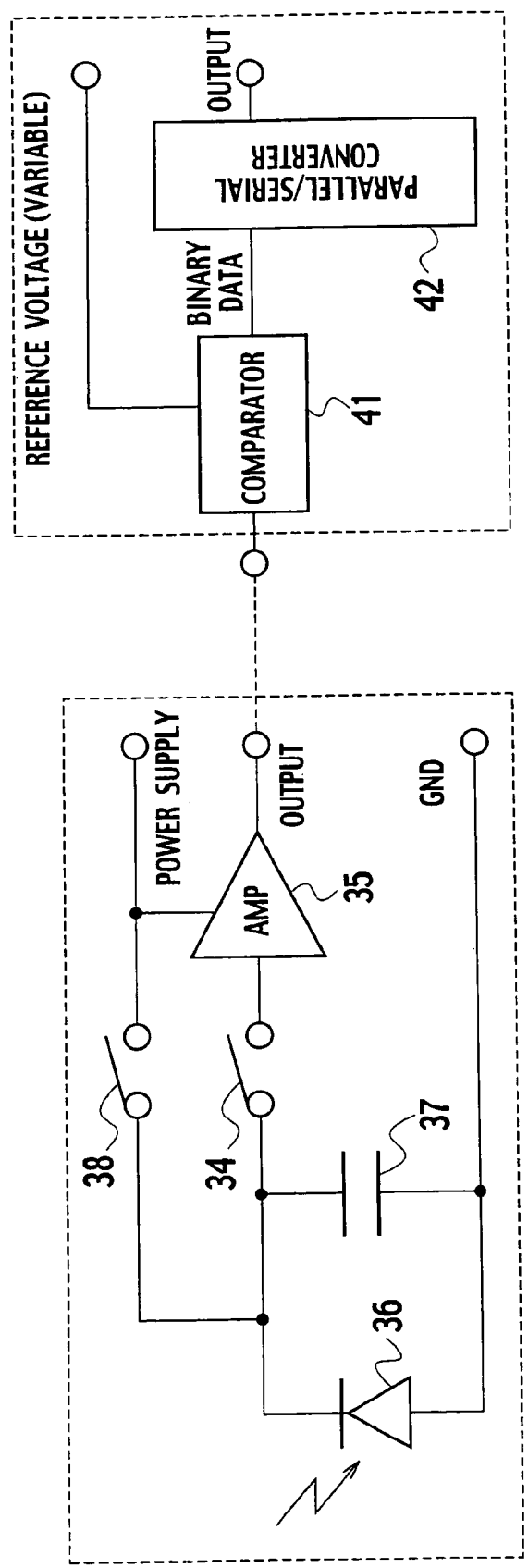
FIG. 76 is a circuit diagram showing a configuration of the optical sensor.

Accordingly, in this embodiment, as shown in FIG. 76, the output value from each comparator 41 provided for each pixel is subjected to parallel/serial conversion by a parallel/serial converter 42, and is then outputted, and the reference voltage of the comparator 41 is changed in response to a value of the output concerned. Such a variable reference voltage value is decided by an arithmetic operation circuit 51 shown in FIG. 77.

Figure 77:
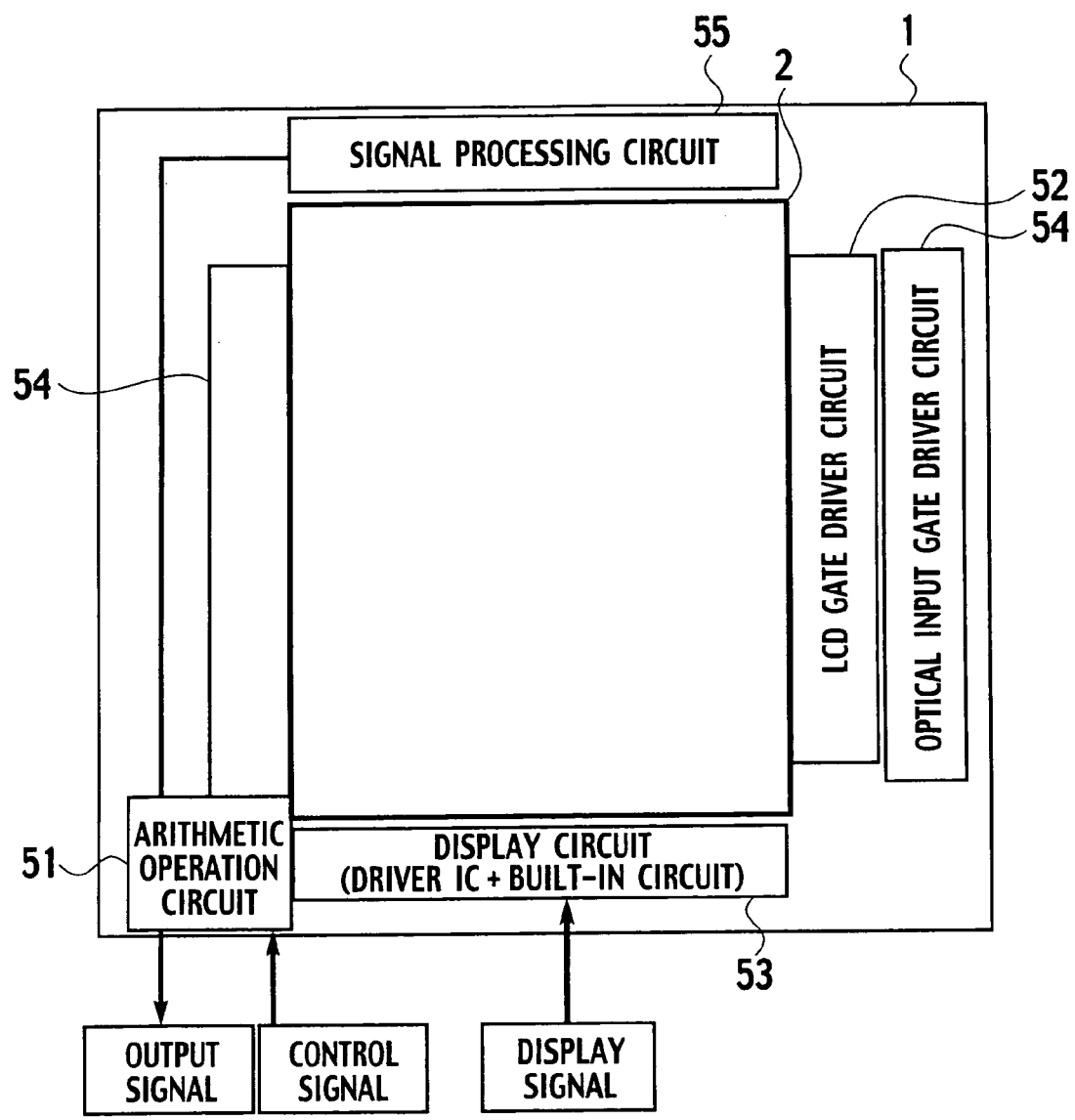
FIG. 77 is a plan view showing an arranged position of an arithmetic circuit which determines a variable reference voltage value for a comparator.

As shown in FIG. 77, the display device of this embodiment includes the display unit 2, the arithmetic operation circuit 51, an LCD gate driver circuit 52, a display circuit 53, and an optical input gate driver circuit 54 on the array substrate 1.

Based on the output values of the comparators 41 in one frame, the arithmetic operation circuit 51 varies the reference voltage of the comparators in the next frame, thus making it possible for the comparators 41 to output the appropriate comparison result in response to the illumination of the external light. For example, in a display device including an optical input function such as recognizing the shadow caused by the finger or the pen, when a light state is represented by "1" and a dark state is represented by "0", if the entire output values of the respective comparators 41 are 1 since the ambient environment is light, the reference voltage value is adjusted so that "0" is generated in the outputs of the comparators. On the contrary, when many output values of the respective comparators 41 are "0" since the ambient environment is dark, the reference voltage value is adjusted so that "1" is increased in the outputs of the comparators. This adjustment is continued until the reference voltage value reaches a value at which the difference between light and dark in a fixed area can be recognized.

The LCD gate driver circuit 52 performs an ON/OFF control of the switches for outputting the video signals of the respective pixels to the pixel electrodes. The display circuit 53 outputs the sent video signals to the display unit 2. The optical input gate driver circuit 54 performs an ON/OFF control of the switches for controlling the outputs of the optical sensors of the respective pixels.

As described above, according to this embodiment, the reference voltage of each comparator 41 is changed in response to the output value of the comparator 41, and the comparator 41 can thus output the appropriate comparison result in response to the illumination of the ambient environmental light. Moreover, this embodiment can be realized while hardly increasing wires.

Eleventh Embodiment

Figure 78:
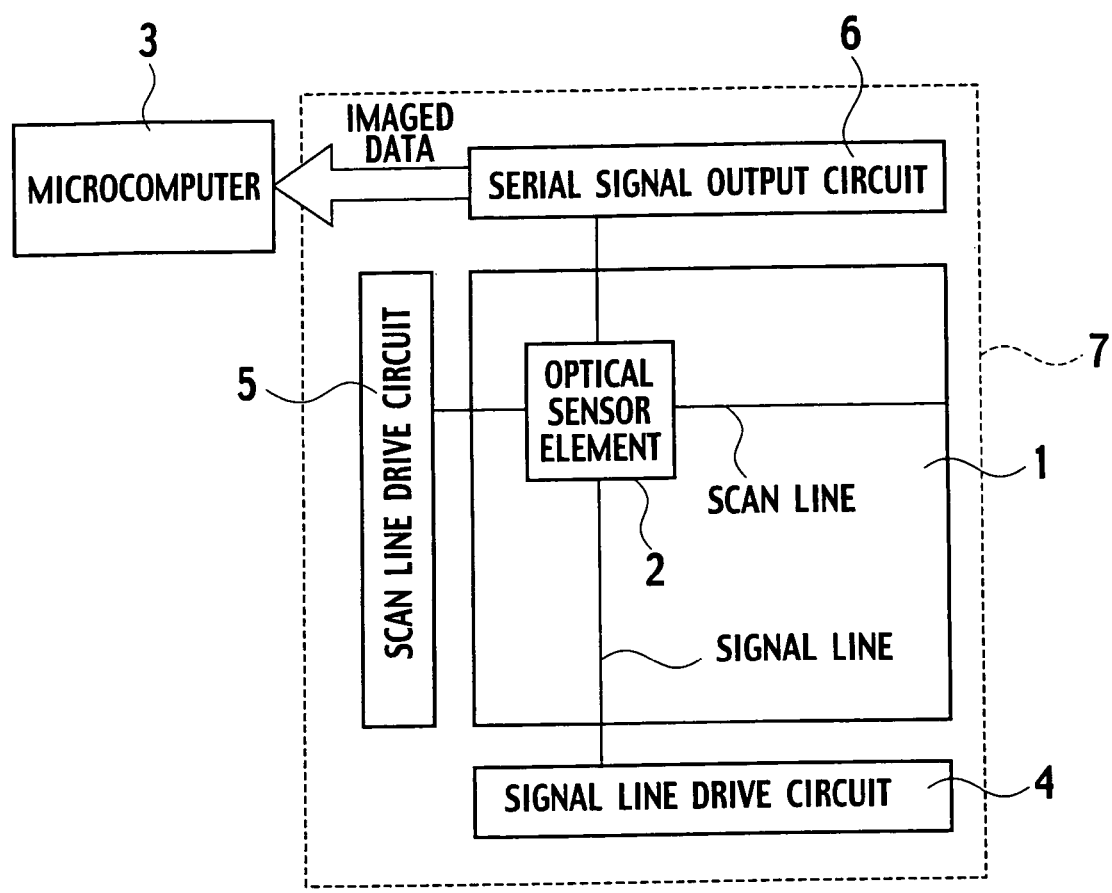
FIG. 78 is a block diagram showing a schematic configuration of a display device in an eleventh embodiment.

FIG. 78 is a block diagram showing a schematic configuration of a display device in this embodiment. The display device of this drawing includes a pixel region 1, and a microcomputer 3, and further includes a signal line drive circuit 4, a scan line drive circuit 5, and a serial signal output circuit 6.

In the pixel region 1, plural scan lines and plural signal lines are wired so as to intersect each other, and pixels are provided on the respective intersections. The microcomputer 3 compares in magnitude a value to be determined, which is based on multi-gradation data for each pixel, with a threshold value. The multi-gradation data corresponds to intensity of light received by an optical sensor element 2. Then, the microcomputer 3 performs a binary determination for the value to be determined. The signal line drive circuit 4 drives the signal lines, and the scan line drive circuit 5 drives the scan lines. The serial signal output circuit 6 serially outputs imaged data with two gradations, which is obtained from an image imaged by the respective optical sensor elements 2, to the microcomputer 3. Here, for the microcomputer 3, an external IC connected to a circuit on a glass-made array substrate 7 through a bus is used; however, the microcomputer 3 may be mounted on the array substrate 7.

Each of the pixels in the pixel region 1 includes a pixel electrode for applying a voltage to the liquid crystal layer, a switching element, and the optical sensor element 2. The switching element is turned ON/OFF according to an instruction of a scan signal supplied to the scan line, thereby applying, to the pixel electrode, a video signal supplied to the signal line at appropriate timing. For the switching element, for example, a thin-film transistor is used. The optical sensor element 2 receives light from the outside, and converts the light into a current. For the optical sensor element, for example, a gate control-type diode including a p-region, an i-region, and an n-region is used.

When the optical sensor element 2 is the gate control-type diode, sensitivity of the optical sensor element 2 can be adjusted by changing a voltage of the gate electrode, or by changing at least one of a width and a length of the optical sensor element 2.

The microcomputer 3 includes a register which sets the threshold value for performing the binary determination, the threshold value being to be compared with the value to be determined. Then, the multi-gradation data is calculated from the data with two gradations for each pixel, which is obtained from the image imaged by each optical sensor element 2, and the value to be determined and the threshold value are compared in magnitude with each other based on the multi-gradation data. In such a way, the binary determination is performed.

Figures 79, 80:
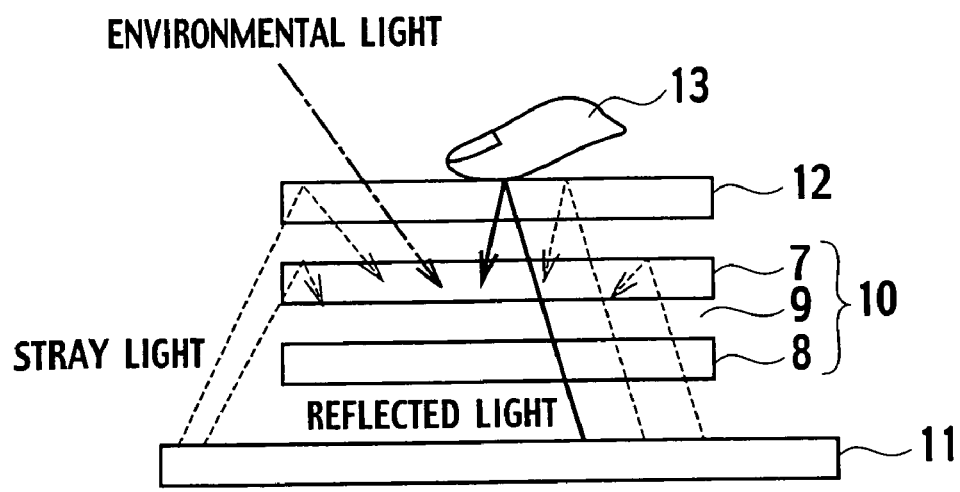
FIG. 79 is a cross-sectional view of the display device shown in FIG. 78.
FIG. 80 shows sensitivities of optical sensor elements in a partial enlarged region of a screen of the display device shown in FIG. 78.

As shown in a cross-sectional view of FIG. 79, the display device of this embodiment includes a liquid crystal cell 10 having a liquid crystal layer 9 in a gap between the glass-made array substrate 7 and an opposite substrate 8 arranged opposite thereto, in which a backlight 11 is arranged on the outside of the opposite substrate 8. Moreover, on the outside of the array substrate 7, a protection plate 12 subjected to a surface treatment for protecting the screen from a mechanical stress is arranged.

Light outputted by the backlight 11 is outputted to the outside of the display device through the opposite substrate 8, the liquid crystal layer 9, the array substrate 7, and the protection plate 12. A part of the light is reflected on an interface between the liquid crystal cell 10 and the protection plate 12. Note that the light reflected on the interface is referred to as stray light.

When a human finger 13 as the object approaches an outer surface of the protection plate 12, reflected light reflected on the finger 13 is received by each optical sensor element 2 on the array substrate 7 on the liquid crystal cell 10 together with the stray light and the external light irradiated from the outside. The optical sensor element 2 outputs a current in response to a quantity of the received light. By digital signal processing, the microcomputer 3 calculates multi-gradation date from the binary data detected in each optical sensor element 2, thereby obtaining an imaged image from which a region where the finger 13 is located on the screen is recognizable.

Next, a specific description is made of a configuration for obtaining the multi-gradation data from such two-gradation data and of the digital signal processing. FIG. 80 shows sensitivities of the optical sensor elements 2 in a partially enlarged region of the screen of the display device. Here, nine types of the optical sensor elements 2 different in sensitivity are arranged so as to form a magic square for each of 3×3 pixels. The numbers in this drawing denote the sensitivities of the optical sensor elements 2. Values of photocurrents flowing through the optical sensor elements 2 with respect to fixed light are increased in proportion to the numbers.

The microcomputer 3 performs digital processing for binary signals read by the optical sensor elements 2 in the following manner. First, an average value of the two-gradation data (each of which is 0 or 1) read by the peripheral nine pixels including the interest pixel itself is defined as a gradation value of the interest pixel concerned. Then, by performing this digital processing for the entire pixels, new multi-gradation data is obtained.

Next, an operation of the display device of this embodiment is described based on an experiment result. The display device individually displays checkered special patterns on three regions A, B and C provided on the pixel region 1 as shown in a first example of imaging conditions in FIG. 81 in the case of capturing the image. Here, the human finger 13 as the object was disposed on the region B and was then imaged. Then, with regard to the binary signals read by the optical sensors 2, the average value of the two-gradation data (each of which is 0 or 1) read by the peripheral nine pixels including the interest pixel itself was calculated for the entire pixels by the microcomputer 3, and an imaged image as shown in FIG. 82 was obtained from the multi-gradation data obtained by the above-described calculation. In the imaged image, in the region B on which the finger 13 was placed, a special pattern is detected as the reflected light from the finger 13. Moreover, also in the regions A and C on which the finger 13 is not placed, special patterns are detected owing to the stray light reflected on the interface between the liquid crystal cell surface and the protection plate surface and to the external light.

Figure 82:
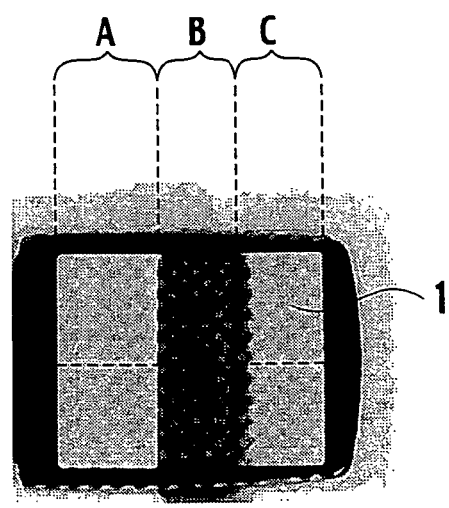
FIG. 82 shows an image imaged in the example of the imaging conditions shown in FIG. 81.
Figure 83:
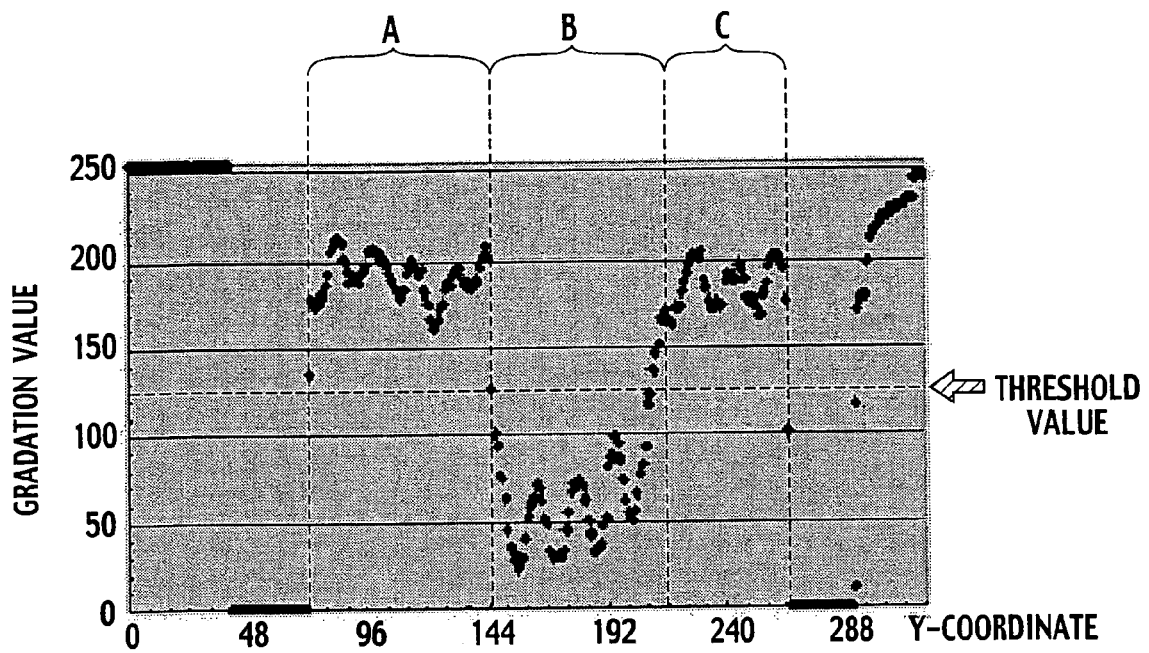
FIG. 83 is a graph showing the image of FIG. 82 by multi-gradation data.

FIG. 83 is a graph showing the imaged image obtained in FIG. 82 by the multi-gradation data with 256 gradations. An axis of ordinates represents the gradation value, and an axis of abscissas represents a Y-coordinate along a dotted line direction in the imaged image of FIG. 82. As shown in this graph, there is a large difference in gradation value between the reflected light from the object and other light. Accordingly, an appropriate threshold value is preset in the register in the microcomputer 3, thus making it possible to perform the binary determination accurately for the reflected light from the object and the other light.

Figure 84:
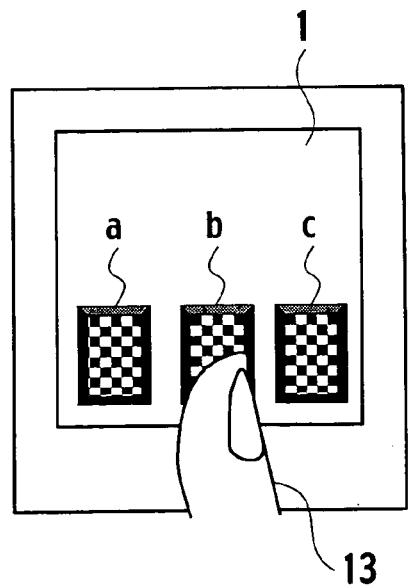
FIG. 84 shows an example of second imaging conditions when the display device shown in FIG. 78 captures an image.

A specific description is made of a technique of this determination by using a second example of the imaging conditions in FIG. 84. First, in the case of capturing the image, the display device displays checkered special patterns on regions to be determined a, b and c, to which the input is expected, on the pixel region 1 as shown in this drawing. Then, when the finger 13 approaches the region to be determined b, in the display device, the optical sensor elements 2 convert light incident onto the respective regions to be determined a to c into currents in response to quantities of received light. Subsequently, by the digital signal processing in the microcomputer 3, the multi-gradation data is calculated, as the value to be determined, from the binary data detected in the respective optical sensor elements 2, and the values to be determined in the respective regions to be determined and the threshold value preset in the register are compared in magnitude with each other, and the binary determination is performed as to whether the light incident onto the respective regions to be determined is the reflected light from the finger 13 or the other light. In such a way, it is made possible for the display device to recognize that the finger 13 has approached the region to be determined b.

Hence, according to this embodiment, in the microcomputer 3, the multi-gradation data is calculated from the two-gradation data imaged by the optical sensor elements 2 for each pixel, and the values to be determined which are based on the multi-gradation data, and the threshold value preset in the register are compared in magnitude with each other, thus making it possible to perform the binary determination accurately for the reflected light from the object on the screen and the other light.

Twelfth Embodiment

Figure 81:
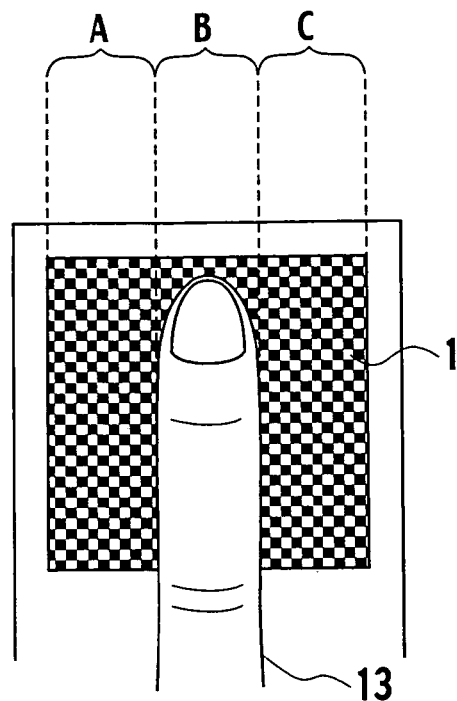
FIG. 81 shows an example of first imaging conditions when the display device shown in FIG. 78 captures an image.

A basic configuration of a display device of this embodiment is similar to that of the eleventh embodiment described by using FIG. 81. A different point from the eleventh embodiment is that the threshold value preset in the microcomputer 3 is set at a value between an average value of gradation values of pixels in the region from which the reflected light reflected on the object has been detected and an average value of gradation values of pixels in the region from which the light other than the reflected light has been detected.

A description is made of the above-described threshold value by taking as an example the graph of FIG. 83. In the result of the imaging in FIG. 83, the average value of the gradation values of the pixels in the region B from which the reflected light reflected on the object has been detected is 55. Moreover, the average values of the gradation values of the pixels in the regions A and C from which the light other than the reflected light has been detected are 190. From the above-described matter, 125 located between 55 and 190 is set as the threshold value of the average values of the gradation values.

As in the eleventh embodiment, after obtaining the values to be determined in the respective regions to be determined, the microcomputer 3 compares the values to be determined and the threshold value 125 preset in the register with each other in terms of magnitude, thereby performing the binary determination as to whether the light incident onto the respective regions to be determined is the reflected light from the finger 13 or other light.

Hence, according to this embodiment, in the microcomputer 3, the value located between the average value of the gradation values of the pixels in the region from which the reflected light reflected on the object has been detected and the average value of the gradation values of the pixels in the region from which the stray light has been detected is set as the threshold value for the binary determination, thus making it possible to enhance the determination accuracy of the binary determination for the reflected light from the object and other light in the regions to determined on the pixel regions.

Note that, while the threshold value in this embodiment is changed by the illumination of the external light and the surface brightness of the display device, from a result of an experiment performed under normal using conditions, it was confirmed that it is appropriate to set the average values of the gradation values at 100 or more and 150 or less.

Thirteenth Embodiment

A basic configuration of a display device of this embodiment is similar to that of the eleventh embodiment described by using FIG. 78. A different point from the eleventh embodiment is as follows. In the microcomputer 3, for the values to be determined by the binary determination, contrast values of the pixels in the regions to be determined on the pixel region 1 are used. Moreover, the threshold value for the binary determination is set at a value located between a contrast value of the pixels in the region from which the reflected light reflected on the object has been detected and a contrast value of the pixels in the region from which other light than the reflected light has been detected. The contrast value is a value obtained by dividing the maximum value of the gradation values of the pixels by the minimum value thereof.

A description is made of the threshold value by taking as an example the graph of FIG. 83. In the imaging result of FIG. 83, a contrast value obtained by dividing the maximum value of the gradation values of the pixels in the region B from which the reflected light reflected on the object has been detected by the minimum value thereof is approximately 1.3. Moreover, contrast values obtained by dividing the maximum values of the gradation values of the pixels in the regions A and C from which the other light than the reflected light has been detected by the minimum values thereof is approximately 3. From the above, 2 located between 1.3 and 3 is set as the threshold value of the contrast values.

As a technique of the determination, after obtaining the multi-gradation data of the pixels in the respective regions to be determined as in the eleventh embodiment, the microcomputer 3 obtains, as the values to be determined, the contrast values obtained by dividing the maximum values of the gradation values by the minimum values. Then, the microcomputer 3 compares in magnitude the values to be determined and the threshold value preset in the register with each other, thereby performing the binary determination as to whether the light incident onto the respective regions to be determined is the reflected light from the finger 13 or other light.

Hence, according to this embodiment, in the microcomputer 3, the value located between the contrast value obtained by dividing the maximum value of the gradation values of the pixels in the region from which the reflected light reflected on the object has been detected by the minimum value thereof and the contrast value obtained by dividing the maximum value of the gradation values of the pixels from which the stray light has been detected by the minimum value thereof is set as the threshold value of the binary determination. In such a way, the determination accuracy of the binary determination for the reflected light from the object and other light in the regions to be determined in the pixel region can be enhanced.

Note that, while the threshold value in this embodiment is changed by the illumination of the external light and the surface brightness of the display device, from a result of an experiment performed under the normal using conditions, it was confirmed that it is appropriate to set the contrast values at 1.5 or more and 3.0 or less.

Fourteenth Embodiment

A basic configuration of a display device in this embodiment is similar to that of the eleventh embodiment described by using FIG. 78. A different point form the eleventh embodiment is a setting of the threshold value for the binary determination. When the object is not present on the surface of the protection plate, the multi-gradation data for each pixel, which corresponds to the reflected light reflected on the protection plate, is read to be white. Meanwhile, a setting is made so that the multi-gradation data on the portion on the surface of the protection plate, on which the object is present, can be read to be black.

The reflected light reflected on the interface of the protection plate is not very intense; however, for example, by adjusting the operation conditions of the sensors, such as the exposure time of the sensors and the precharge voltage, it becomes easy to recognize the reflected light of the protection plate as white. For example, when a certain dark gradation image has been obtained as a result of reading the image for a certain exposure time, the image is reread while lengthening the exposure time of the sensors. In such a way, the gradation image is shifted to the light side, and it becomes easy to recognize the reflected light on the protection plate as white.

Figure 85:
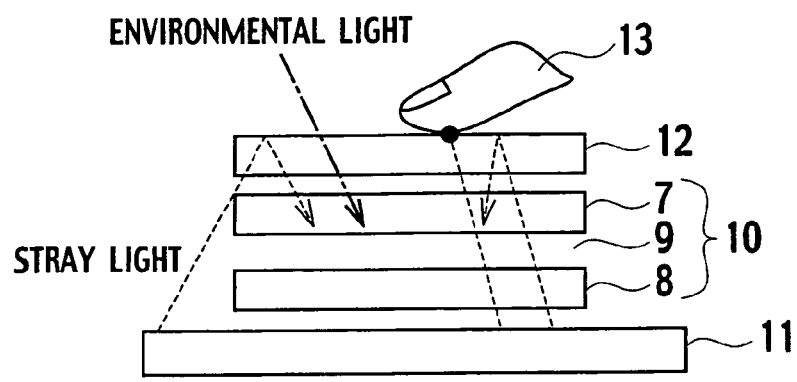
FIG. 85 is a cross-sectional view of a display device in a fourteenth embodiment.

With such a configuration, in the case of capturing the image in the display device, as shown by a cross-sectional view of FIG. 85, when the finger 13 has approached the surface of the protection plate 12, the stray light and the external light are made incident onto the liquid crystal cell 10 in the region on which the finger 13 is not present, and accordingly, the image becomes while. Meanwhile, in the region on which the finger 13 is present on the surface of the protection plate 12, the finger 13 absorbs light traveling from the backlight 11 toward the interface of the protection plate 12, and accordingly, the image becomes black. Hence, by detecting such a black portion of the image in this case, the coordinate of the finger can be read.

Figure 86:
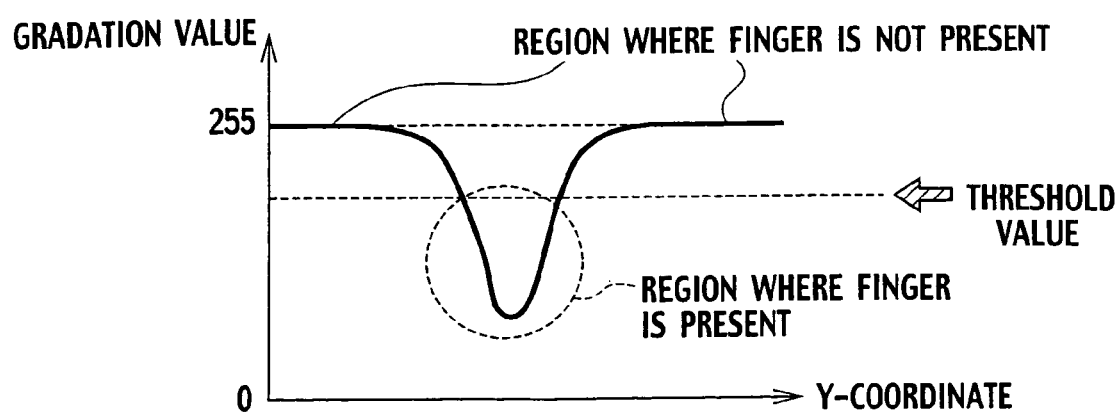
FIG. 86 is a graph of an imaging result imaged by the display device of FIG. 85, shown by multi-gradation data.

FIG. 86 is a view showing a result of the imaging performed in the display device of FIG. 85 by the multi-gradation data with 256 gradations. In the region on which the finger 13 is not present on the surface of the protection plate 12, the region which has received the stray light reflected on the interface of the protection plate 12 and the external light is imaged to be white. Accordingly, the gradation value is increased. Meanwhile, in the region on which the finger 13 is present, the finger 13 absorbs the light traveling from the backlight 11 toward the interface of the protection plate 12, and the reflected light is reduced. Accordingly, the region concerned is imaged to be black, and the gradation value is decreased. Hence, it becomes easy to set the threshold value at a value located between the high gradation values in the region on which the finger is not present and the low gradation values in the region on which the finger is present. Thus, it is made possible to perform the binary determination accurately by the threshold value for the region where the reflected light is absorbed by the object and the region where the reflected light is not absorbed.

As a technique of the determination, after obtaining, as the value to be determined, the multi-gradation data of the pixels in the respective regions to be determined as in the eleventh embodiment, the microcomputer 3 compares the values to be determined and the threshold value preset in the register in magnitude with each other, and divides the regions into low-gradation portions darker than the threshold value and high-gradation regions lighter than the threshold value. In such a way, the accuracy of the binary determination performed as to whether the light incident onto the respective regions to be determined is the reflected light from the finger 13 or the other light can be increased.

Here, the threshold value preset in the register may be set by using the average values of the gradation values for each of the regions as shown in the twelfth embodiment, or may be set by using the contrast values obtained by dividing the maximum values of the gradation values by the minimum values thereof for each of the regions as shown in the thirteenth embodiment.

Hence, according to this embodiment, when the protection plate is provided on the pixel region, and the object is not present on the protection plate surface, the multi-gradation data corresponding to the reflected light reflected on the protection plate is set to be white. In such a way, the region on which the object is not present on the protection plate surface is imaged to be white by the reflected light reflected on the interface of the protection plate no matter whether the external light is intense or weak, and the gradation values are increased. Meanwhile, in the region on which the object is present, the object absorbs the light traveling from the backlight toward interface of the protection plate, and the reflected light is decreased. Accordingly, the region is imaged to be black, and the gradation values are decreased. Hence, it becomes easy to set the threshold value between the high-gradation values in the region on which the object is not present and the low-gradation values in the region on which the object is present, and the binary determination can be performed accurately by the threshold value for the region where the reflected light is absorbed by the object and the region where the reflected light is not absorbed.

Note that, in this embodiment, a normally white mode is assumed, in which the display screen makes high-brightness display in a state where a drive voltage is not applied to the liquid crystal layer of the display device; however, the present invention is not limited to this. For example, even in a normally black mode, the precharge voltage supplied from the signal line drive circuit on the array substrate 7 to the entire signal lines is set somewhat higher in the case of capturing the image, thus making it possible to set the display screen by the reflected light reflected on the interface of the protection plate to be white in advance.

For the protection plate, an acrylic plate having a high refractive index may be used. In such a way, the reflected light reflected on the interface of the protection plate is increased, and accordingly, it is made possible to set the display screen to be white.

In the respective embodiments described above, the magic square is formed for each of 3×3 pixels by using nine types of the optical sensor elements different in sensitivity from one another in the pixel region of the display device; however, the present invention is not limited to this. As long as a configuration is made capable of expanding the binary data detected by the optical sensor elements to the multi-gradation data, it is possible to perform the binary determination accurately for the reflected light from the object on the screen by setting the threshold value for the multi-gradation data thus obtained.

What is claimed is:
1. A display device, comprising:
a display unit configured to display an image on a screen, and is an image of an object which has approached the screen, by using optical sensors; and
a sensor drive unit configured to change a drive condition of the optical sensors based on a statistical amount of output values of the optical sensors,
wherein the sensor drive unit outputs a control signal which controls the drive condition so that upper gradation values including a center in a histogram of gradation values obtained by modulating the output values can be set within a predetermined range,
wherein the sensor drive unit decides the control signal by using a table showing a relationship between an exposure time of the optical sensors, a precharge voltage thereof, and the predetermined range.
2. The display device according to claim 1,
wherein the drive condition is at least one of an exposure time and precharge time of the optical sensors.
3. The display device according to claim 1,
wherein the display unit is one configured to display, on a screen, a region which an object is made to approach, and
the sensor drive unit changes the drive condition based on a statistical amount of output values of the optical sensors arranged in a region on the screen, the region other than the region which the object is made to approach.
4. The display device according to claim 1,
wherein the sensor drive unit is capable changing the upper gradation values in response to sizes of the screen and the object.
5. The display device according to claim 1,
wherein the table is one, in which the exposure time is maximized in an allowable range, and the precharge voltage is changed.
6. The display device according to claim 1,
wherein the sensor drive unit decides the control signal by a linear search method by using the table.
7. The display device according to claim 1,
wherein the sensor drive unit decides the control signal by a binary search method by using the table.
8. The display device according to claim 1,
wherein the sensor drive unit uses gradation values of pixels which have been subjected to thinning processing performed for each of plural regions obtained by partitioning the screen in a fixed range.
9. The display device according to claim 1,
wherein the sensor drive unit provides a predetermined standby period between a point of time when the output values of the optical sensors are changed to an extent where the drive condition of the optical sensors is to be changed and a point of time when the drive condition of the optical sensors is actually changed.
10. The display device according to claim 9, further comprising a hold unit configured to hold the statistical amount during the predetermined standby period.

* * * * *